United States Patent
Muilenburg et al.

(10) Patent No.: US 7,870,253 B2
(45) Date of Patent: Jan. 11, 2011

(54) SYSTEMS AND METHODS FOR AGGREGATING USER PROFILE INFORMATION IN A NETWORK OF AFFILIATED WEBSITES

(75) Inventors: Matt Muilenburg, Lake Forest Park, WA (US); Stefan Piesche, Maple Valley, WA (US)

(73) Assignee: The Cobalt Group, Inc., Seattle, WA (US)

( * ) Notice: Subject to any disclaimer, the term of this patent is extended or adjusted under 35 U.S.C. 154(b) by 317 days.

(21) Appl. No.: 12/243,855

(22) Filed: Oct. 1, 2008

(65) Prior Publication Data

US 2010/0082660 A1    Apr. 1, 2010

(51) Int. Cl.
*G06F 15/173*    (2006.01)
(52) U.S. Cl. ..................................................... 709/224
(58) Field of Classification Search ......... 709/220–224; 705/14.6, 14.66
See application file for complete search history.

(56) References Cited

U.S. PATENT DOCUMENTS

| | | | | |
|---|---|---|---|---|
| 5,694,595 A * | 12/1997 | Jacobs et al. | ....................... | 1/1 |
| 5,790,785 A * | 8/1998 | Klug et al. | ..................... | 726/11 |
| 6,496,855 B1 * | 12/2002 | Hunt et al. | .................. | 709/217 |
| 6,944,677 B1 * | 9/2005 | Zhao | .......................... | 709/244 |
| 6,981,028 B1 * | 12/2005 | Rawat et al. | ................ | 709/217 |
| 7,240,125 B2 * | 7/2007 | Fleming | ..................... | 709/246 |
| 7,246,263 B2 * | 7/2007 | Skingle | ....................... | 714/18 |
| 7,281,029 B2 * | 10/2007 | Rawat | ....................... | 709/204 |
| 7,548,985 B2 * | 6/2009 | Guigui | ....................... | 709/231 |
| 7,593,925 B2 * | 9/2009 | Cadiz et al. | ........................ | 1/1 |

* cited by examiner

*Primary Examiner*—Krisna Lim
(74) *Attorney, Agent, or Firm*—John R. Thompson; Stoel Rives LLP

(57) ABSTRACT

A plurality of affiliated network of websites may be configured to log user interactions thereon. The respective logs may comprise user identification information to allow a profile aggregation service to correlate user interactions across the plurality of websites and to generate respective user profiles, which may be used to configure the websites. A context aware platform (CAP) website may be configured to provide web services for entities in a business hierarchy. The CAP website may capable of presenting content in one of a plurality of operational modes associated with a geographical granularity of the franchise hierarchy. In addition, the CAP website may be configurable according to a user profile generated using user interactions across a plurality of websites and/or on the CAP website.

42 Claims, 23 Drawing Sheets

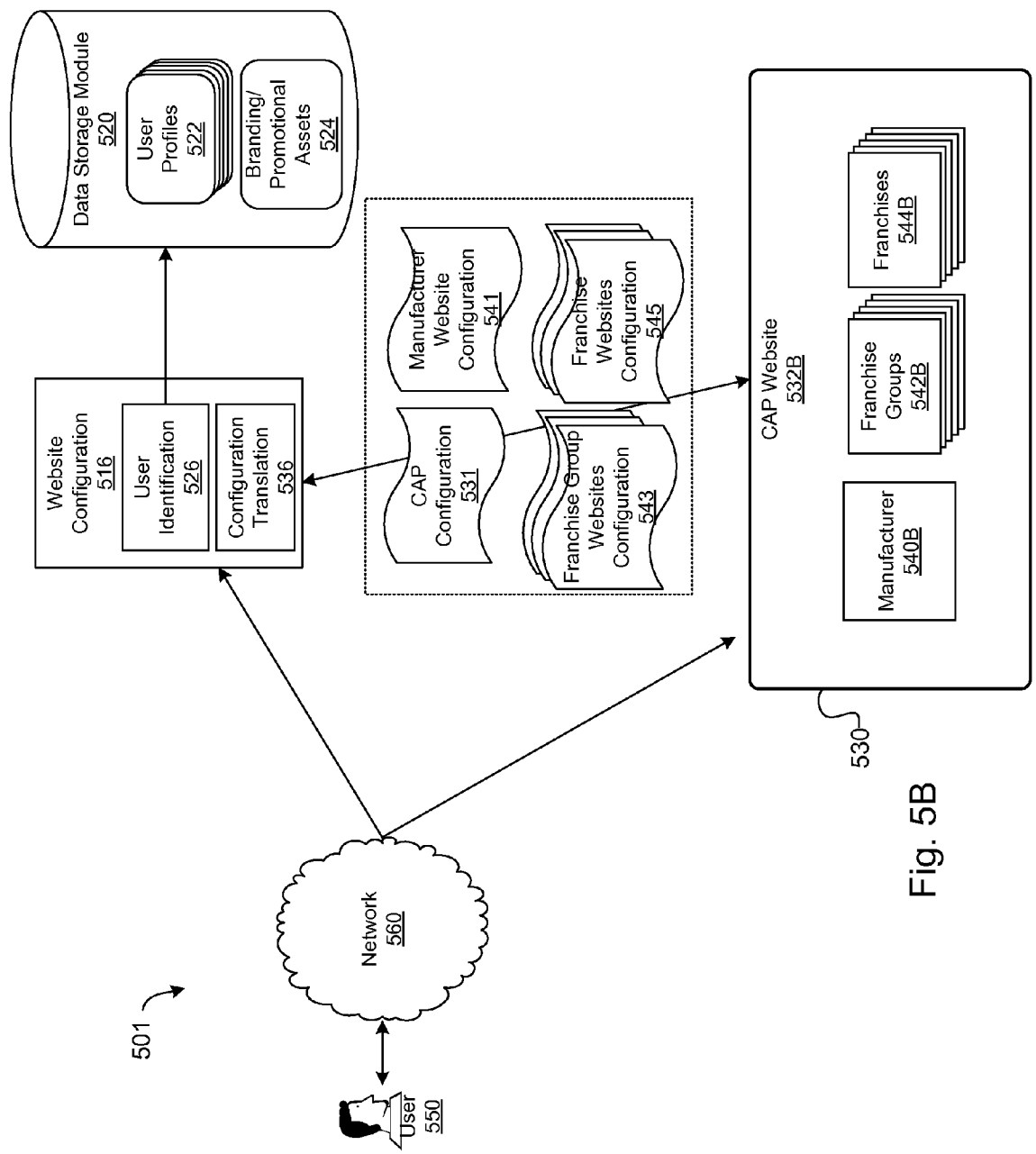

ically any number of tiers and/or hierarchical franchise business structures (e.g., multi-tiered, flat, or the like) could be leveraged under the teachings of this disclosure.

SYSTEMS AND METHODS FOR AGGREGATING USER PROFILE INFORMATION IN A NETWORK OF AFFILIATED WEBSITES

TECHNICAL FIELD

This disclosure relates to systems and methods for customizing a website and, in particular, to systems and methods for aggregating user profile information across one or more websites in a network of affiliated websites, using the user profile information to configure the one or more affiliated websites, and configuring a website to present content relevant to a particular geographic granularity and/or business relationship of a business hierarchy.

BRIEF DESCRIPTION OF THE DRAWINGS

Additional aspects and advantages will be apparent from the following detailed description of preferred embodiments, which proceeds with reference to the accompanying drawings, in which:

FIG. 5B is a block diagram of another embodiment of a system for configuring a website capable of operating in one of a plurality of operational modes using one or more user profiles;

DETAILED DESCRIPTION OF PREFERRED EMBODIMENTS

Websites and web services (collectively "websites") published on communications networks, such as the Internet have become important marketing tools and/or sales fronts for a wide variety of products. In many cases, users considering an important purchase may begin their research at such websites and may spend a considerable amount of time researching their purchases using one or more websites and, in an increasing number of cases, may complete major purchases completely online.

One way in which marketing and/or sales front websites (collectively "marketing websites") may be more effective is by customizing the content displayed on the marketing website for particular visitors. This disclosure provides several ways in which a marketing website may be dynamically configured for a particular user. For example, the marketing website may be part of a network of marketing websites (e.g., websites having shared business interests, marketing interests, or the like) and/or may be configurable to operate in one of a plurality of operational modes. Such sites may aggregate user activity on the respective websites (or while operating in their various operational modes). The user activity information may be used to customize the website according to the observed preferences and/or interests of particular users.

Numerous business structures naturally lend themselves to marketing structures comprising a plurality of affiliated websites and/or a website configured to operate in one of a plurality of operational modes. One example of such a structure is a franchise hierarchical business structure. A business hierarchy may be leveraged to obtain user interaction data, which may then be used to customize one or more websites of the business hierarchy.

Figure 1A:
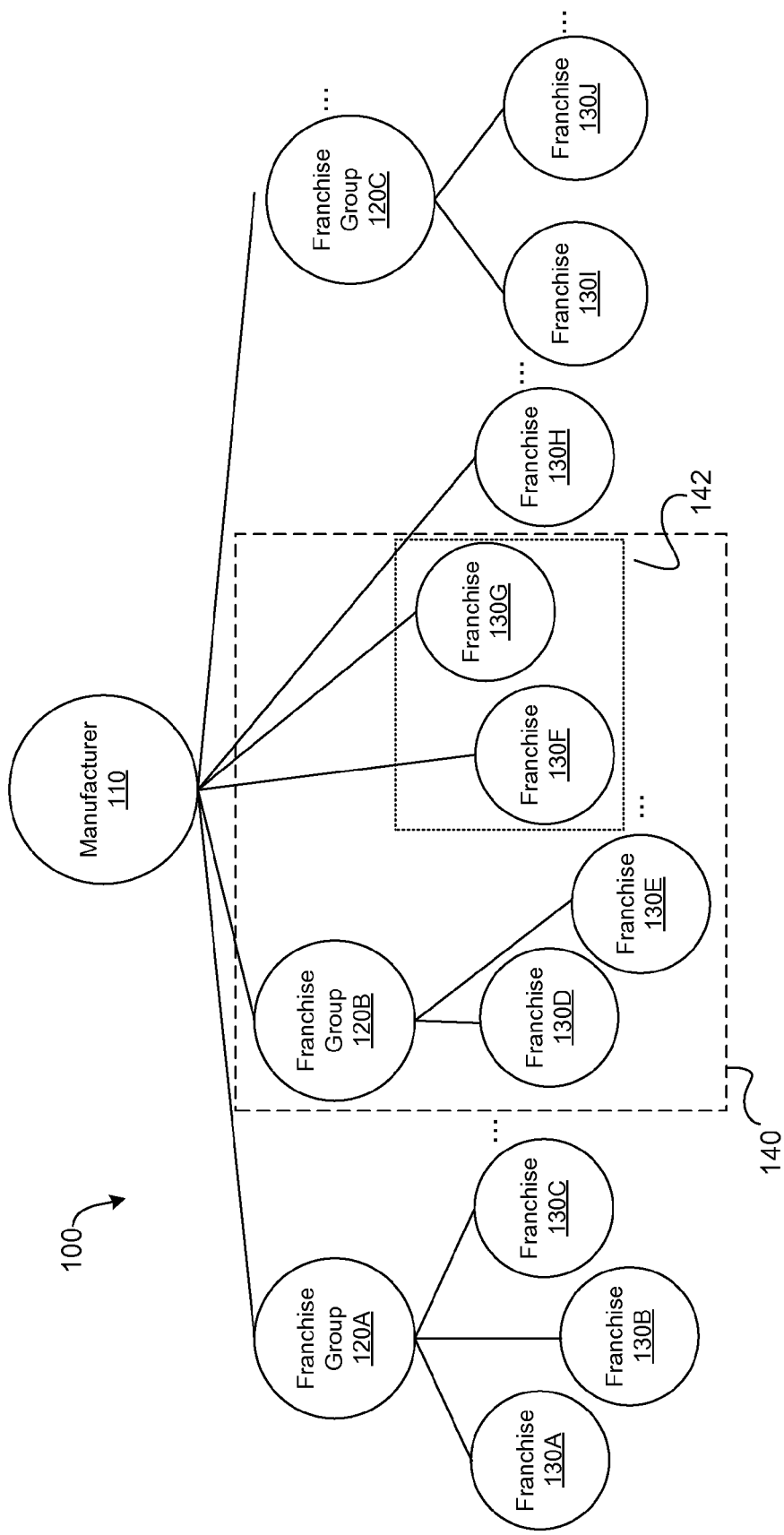
FIG. 1A depicts one embodiment of a business hierarchy.

FIG. 1A depicts one embodiment of a business hierarchy, which, in the FIG. 1A example, comprises a franchise business hierarchy 100. Although FIG. 1A shows a three-tier franchise business hierarchy 100, one skilled in the art would recognize that virtually any number of tiers and/or hierarchical franchise business structures (e.g., multi-tiered, flat, or the like) could be leveraged under the teachings of this disclosure.

In FIG. 1A, a manufacturer 110 may be at the head of the franchise business hierarchy 100. Where the hierarchy 100 is directed to the sale of product (e.g., vehicles), the manufacturer 110 may be a vehicle manufacturer, such as General Motors®, Ford®, or the like. In other embodiments, the manufacturer 110 may represent a service provider, such as a accounting services provider, a cleaning services provider, or the like. One or more franchise groups 120A-C may be linked to the manufacturer 110. The franchise groups 120A-C may represent regional associations and/or groups of franchises 130A-J (e.g., the franchises 130 under a particular group 120 may be commonly owned and/or controlled).

The business hierarchy 100 may comprise a plurality of franchises 130A-J, which sell, support, and/or provide services produced and/or branded by the manufacturer 110 to the public. Alternatively, or in addition, the franchises 130A-J may provide services under the direction and/or control of the manufacturer 110 (e.g., vehicle maintenance services, cleaning services, clerical services, or the like). As shown in FIG. 1, one or more franchises may be members of a particular franchise group: franchises 130A-C are members of franchise group 120A; franchises 130D-E are members of franchise group 120B, and franchises 130I-J are members or franchise group 120C. Alternatively, one or more franchises may be independent of any particular franchise group 120 (e.g., not owned or controlled by a franchise group 120): franchises 130F-H are such franchises.

One or more of the franchises 130 grouped according to particular geographic regions, such as franchise region 140. The franchise region 140 may represent a geographic, financial, or other type of region within the business hierarchy 100. One or more franchises fall within the region 140. For example, the region 140 may comprise vehicle franchises (dealerships) within a relatively large region, such as the Pacific Northwest of the United States. FIG. 1A shows franchises 130D-130G within franchise region 140. Although FIG. 1A shows only a single franchise region 140, one skilled in the art would recognize that any number of franchise regions 140 of any particular geographic granularity could be used under the teachings of this disclosure.

The franchises of FIG. 1A may be grouped according to more finely geographically grained groupings. On example of such a grouping is local group 142. The local group 142 may comprise franchises within a particular geographic location. The geographic location defining the local group 142 may be more finely grained geographically than the geographic granularity of the region 140. The particular geographic granularity used for the region groupings 140 and/or local groupings 142 may depend upon the nature of the business hierarchy 100. For example, for closely spaced franchises (e.g., franchises that are relatively dense within a particular area), the regions 140 and/or local groupings 142 may be relatively small. Alternatively, in locations where the franchises are more widely spaced, the regions 140 and/or local groupings 142 may be similarly more widely spaced.

As discussed above, the business hierarchy 100 may be segmented at various geographic granularity levels (e.g., regional 140 and/or local 142 levels). In addition, also as discussed above, the business hierarchy 100 may be segmented at various business relationship levels (e.g., franchise groups 120A-C) or a combination of these (e.g., groupings based on the nature of the business hierarchy and a particular geographic granularity). One skilled in the art would recognize that other groupings of the business hierarchy 100 are possible. Such groupings could be determined based on a particular geographic granularity within the business hierarchy 100 and/or may be related to business relationship (or interrelationships) between franchise groups 120 and/or franchisees 130. As such, this disclosure should not be read as limited to any as limited to any particular business hierarchy 100 grouping mechanism.

As discussed above, each of the franchises 130A-J and/or franchise groups 120A-C may publish respective marketing websites. Alternatively, or in addition, one or more websites, such as a context aware platform (CAP) website (discussed below), may provide web services for one or more of the franchise groups 120A-C and/or franchises 130A-J. As will be discussed below, the CAP website may be configurable to operate in one of a plurality of operational modes and each of the operational modes may correspond to a particular geographic granularity (e.g., regional grouping 140 and/or local grouping 142) and/or business relationship within the business hierarchy 100.

The one or more of the websites associated with the entities in the hierarchy 100 may monitor usage of the respective franchise websites to develop profiles of the users who access the websites. However, since each individual franchise marketing website may reach a relatively small number of customers, such information may be of little value. Moreover, since a particular user may spend time at many different websites (e.g., at a marketing website published by the manufacturer 110, one or more franchise groups 120A-120B, one or more dealers 130) the information gathered at any one website may be of limited value (e.g., provide an incomplete picture of the user's activity).

In addition, there may be organizational and technical hurdles to obtaining user profile information from the marketing and/or sales front websites of the manufacturer 110, franchise groups 120, and/or franchises 130. For example, each of the franchise groups 120 and/or franchises 130 may in essence "compete" with one another for sales of the products and/or services provided by the manufacturer 110. Accordingly, the franchise groups 120 and/or franchises 130 may be reticent to share user information with one another. Moreover, since each franchise group 120 and/or franchise 130 may each publish its respective website, there may be no common data format and/or other mechanism for sharing and/or correlating user behavior information.

Marketing and/or selling products in a franchise business model via the Internet may present unique challenges. For example, many of the franchise groups 120 and/or franchises 130 may be competitors (e.g., compete with one another in the sale of the products and/or services offered by the manufacturer 110). In addition to being hesitant to share user behavior and/or profile information with one another, the websites of the franchise groups 120A-120B and/or franchises 130A-130J may compete with one another for search engine exposure, search ranking, or the like. As discussed above, one of the ways a website may drive traffic is by purchasing keywords (e.g., Google AdWords®), such that a link to the website may be presented when users of the particular search engine search for terms relevant to the products and/or services offered by the manufacturer 110. However, where there are multiple entities (e.g., manufacturer 110, franchise groups 120, and/or franchises 130) competing for the same set of keywords, the availability of prime keywords may be exhausted and/or the cost of the keywords may be driven unnecessarily high (e.g., through bidding or the like).

In addition, where there are multiple websites (e.g., websites published by franchise groups 120 and/or franchises 130) marketing the same set of products or services, the consistency of message may be lost. For example, the manufacturer 110 may have periodic nation-wide promotions. The manufacturer 110 may want each of its franchise websites (e.g., websites published by the franchise groups 120 and franchises 130) to provide consistent branding and promotional material. However, if the franchise groups 120 and/or franchise 130 websites are independently published, this may be impossible or impractical, particularly where the manufacturer 110 has a large number of franchisees (vehicle manufacturers may have many thousands of franchisees 120-130).

The systems and methods disclosed herein may overcome many of the problems inherent in marketing and/or selling products in a business hierarchy. In addition, the system and methods disclosed herein may leverage the websites published by the franchise groups 120 and/or franchises 130 (as well as other, third-party websites) to aggregate profile information about visitors to any of the websites published by the manufacturer 110, franchise groups 120, and/or franchises 130. The aggregated data may be used to customize the content presented to the user at these websites. In addition, the systems and methods disclosed herein provide a CAP website (or other module) to manage search engine interaction for the manufacturer 110, franchise group 120, and/or franchise 130 websites. This may prevent unnecessary bidding up of advertising keywords. In addition, the CAP may manage the configuration of the websites (e.g., the websites published by the manufacturer 110, franchise groups 120, and/or franchise 130) according to the user profile of the particular user accessing the website and/or any promotional material and/or branding assets provided by the manufacturer 110.

Figure 1B:
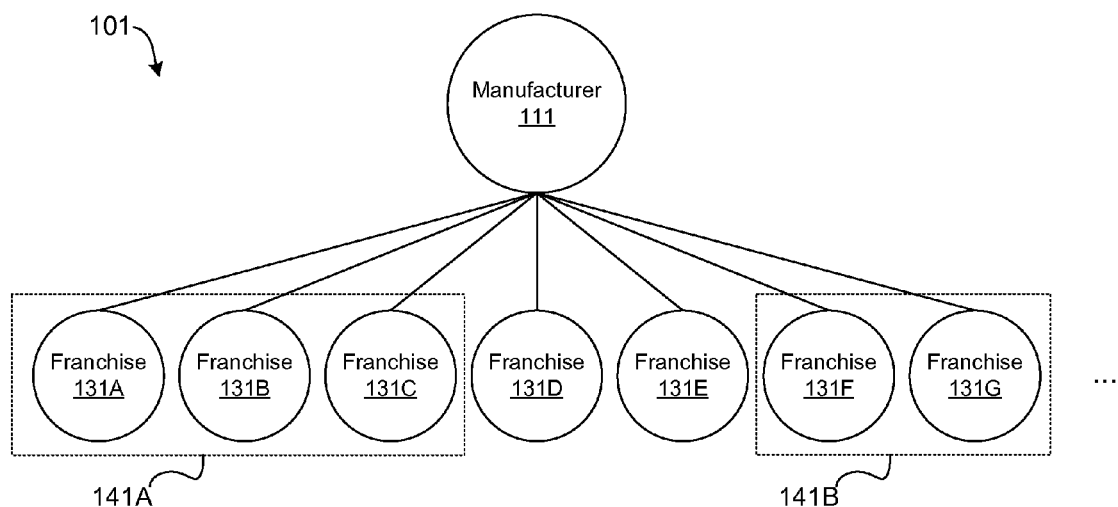
FIG. 1B depicts another embodiment of a business hierarchy.

FIG. 1B shows another embodiment of a business hierarchy 101. In the FIG. 1B example, a plurality of businesses 131A-131G may provide products and/or services from a manufacturer 111. As such, as above, the businesses 131A-131G be franchises of the manufacturer 111. The franchises 131A-131G may be formed into one or more groups 141A-141B. The groups 141A-141B may correspond to a business relationship between the businesses 131A-131G, such as an advertising association. As such, the businesses comprising the groups 141A-141B may share a common media market and/or advertising campaign (e.g., advertising demographic, etc.).

Figure 1C:
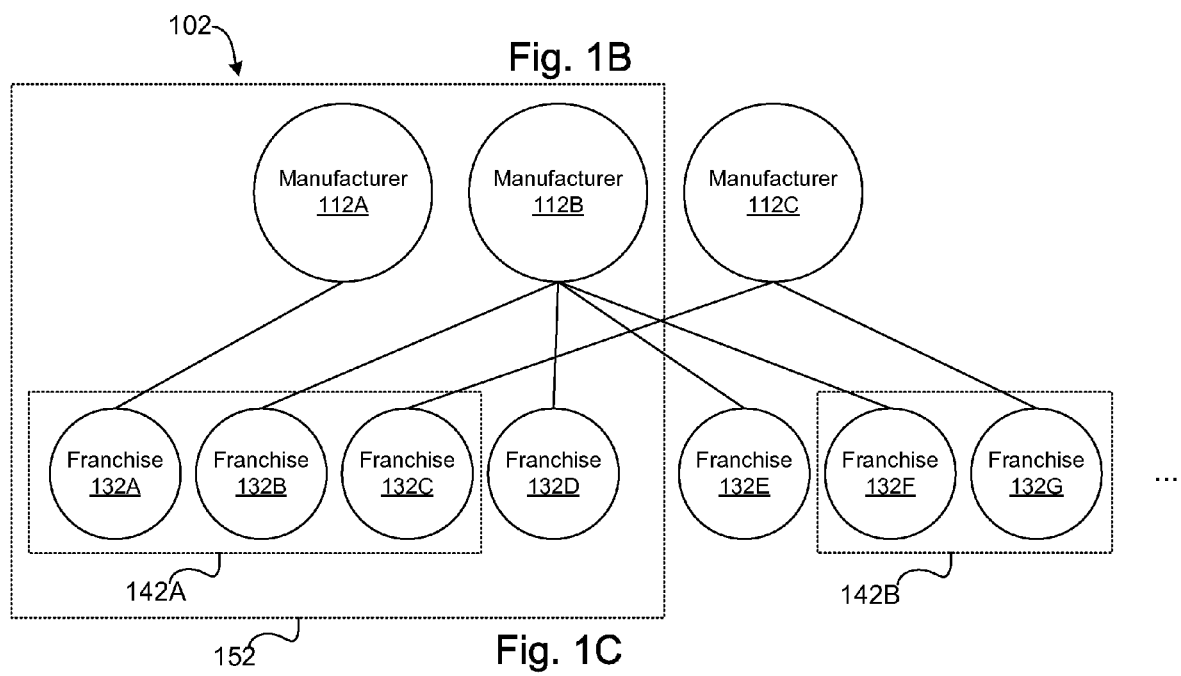
FIG. 1C depicts another embodiment of a business hierarchy.

FIG. 1C shows another example 102 of a business hierarchy 102. The FIG. 1C example comprises a plurality of businesses 132A-132G under one of a plurality of different manufacturers and/or service providers 112A-112C. Accordingly the businesses 132A-132G may comprise franchises of one or more of the manufacturers and/or service providers 112A-112C.

The businesses 132A-132G may comprise one or more groups 142A-142B, which may represent groups of commonly owned and/or commonly controlled businesses 132A-132G. Therefore, the businesses 132A-132G within a particular group 142A-142B may include franchises of different manufacturers 112A-112C. For example, the group 142A includes a franchise 132A of manufacturer 112A, a franchise 132B of manufacturer 112B, and a franchise 132C of manufacturer 112C. Similarly, the group 142B includes a franchise 132F of manufacturer 112B and a franchise 132G of manufacturer 112C.

FIG. 1C also shows an example of an industry group 152, which may comprise one or more manufacturers 112A-112C, one or more franchise groups 142A-142B, and/or one or more franchises 132A-132G. The industry group 152 of FIG. 1C includes manufacturers 112A and 112B, franchise group 142A, and franchises 132A-132D.

The industry group 152 may include business entities (businesses, distributors, franchise groups, franchises, and the like) having a common industry focus and/or cooperative marketing campaign. In the automotive context, multiple manufacturers 112A-112C (and their associated franchisees 132A-132G), may form an industry group directed to the adoption of a type of vehicle fuel (e.g., hydrogen, electricity, flex-fuel, or the like). The members of the industry group (e.g., the industry group 152) may share in the advertising and/or promotional costs related to the marketing campaign. At the same time, the assets used to promote industry focus and/or cooperative marketing campaign may direct users to the constituent members of the group 152.

Although this disclosure describes several different embodiments of business hierarchies, the disclosure should not be read as limited to any particular business hierarchy type. Moreover, the disclosure should not be read as limited to only business-based hierarchical structures. For example, in some embodiments, the systems and methods disclosed herein may be adaptable for use in other structures. For instance, a particular manufacturer (e.g., manufacturer 111 of FIGS. 1A-1C) may have a number of different, parallel marketing directives. The marketing directives may be adapted to appeal to a particular type of customer (e.g., user). In these embodiments, the website(s) of the manufacturer, franchise groups, and/or franchises may be configured to highlight one or more of the marketing directives according to a selected operational mode of the website. To select an appropriate operational mode, the website may compare user profiling information to the target demographic and/or user interests served by the various marketing directives.

Figure 2A:
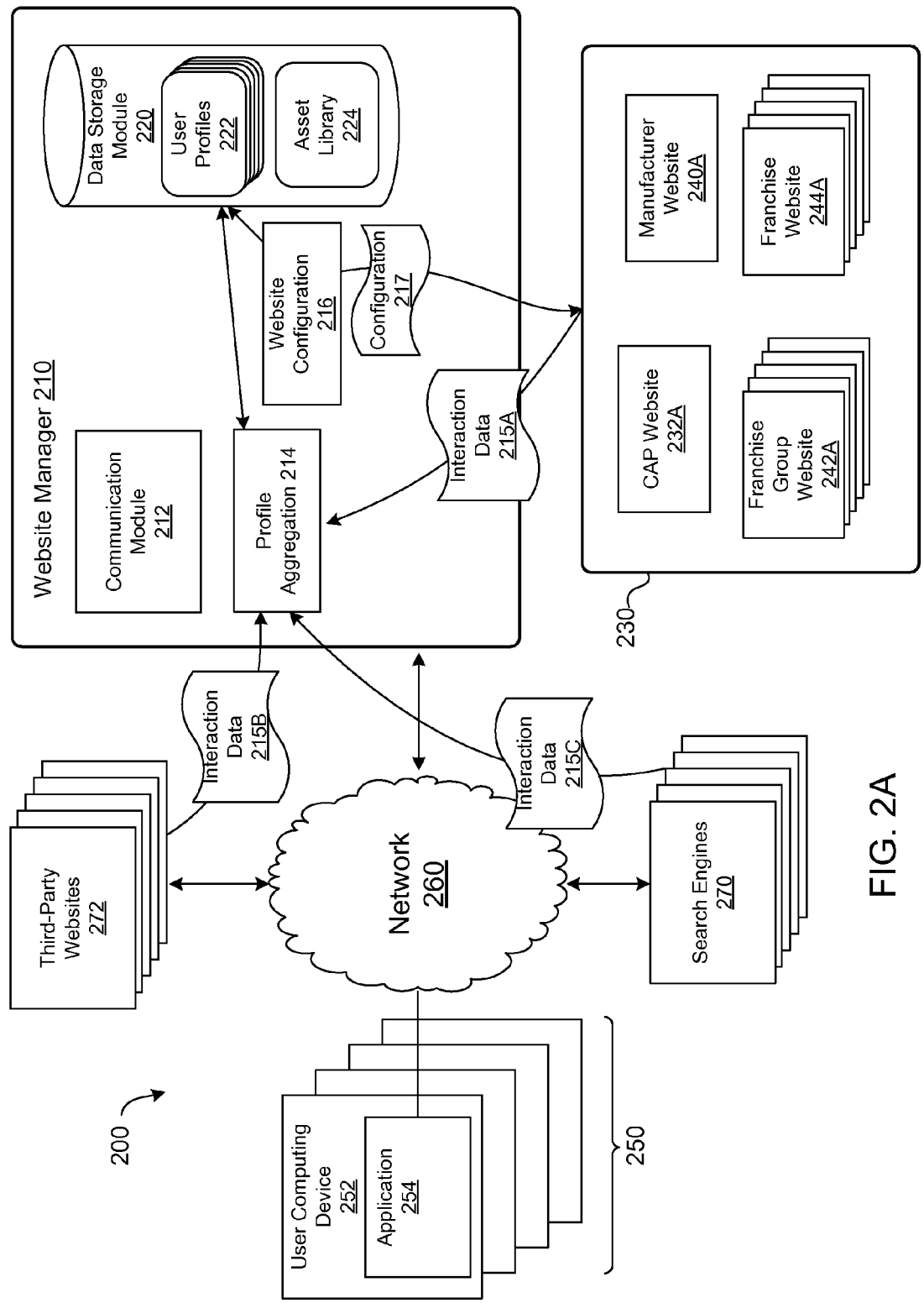
FIG. 2A is a block diagram of a system for aggregating user interactions with a plurality of websites to thereby generate one or more user profiles.

FIG. 2A shows one embodiment of a system 200 for aggregating user behavior and/or profile information. System 200 comprises a website manager 210, which may be used to, inter alia, aggregate user profile and behavior information into one or more user profiles 222.

The website manager 210 comprises a communication module 212 to communicatively couple the website manager 210 to a network 260, which may, in turn, communicatively couple the website manager 210 to one or more users 250 and/or a plurality of context aware websites 230. In the FIG. 2A embodiment, the website manager 210 context aware websites 230 include a CAP website 232A, a manufacturer website 240A, one or more franchise group website 242A, and/or one or more franchise websites 244A. The network 260 may comprise any communications network known in the art including, but not limited to: a Transmission Control Protocol/Internet Protocol network (TC/PIP) network, the Internet, a local area network (LAN), a wide area network (WAN), a virtual private network (PVN), a telephone network, such as a PSTN network, a wireless network, a combination of the above, or the like.

The website manager may be implemented as a plurality of computer-readable instructions stored on a storage media, such as data storage module 220. As discussed below, the data storage module 220 may comprise any data storage means known in the art, including volatile and/or non-volatile memory, optical data storage means (e.g., CD, DVD, and the like), fixed disc (e.g., hard disc), removable disc, flash memory, data tape, or the like. The computer-readable instructions may be configured to be executed by one or more computing devices (not shown), such as a server, a server cluster, or the like. The server(s), may each comprise and/or be communicatively coupled to a processor, memory, data storage media, one or more input/output interfaces (e.g., display monitor, keyboard, mouse, and the like), one or more communications interfaces, and the like.

The website manager 210 may comprise and/or be communicatively coupled to a context aware platform (CAP) website 232A. The CAP website 232A may comprise (e.g., be hosted on) a webserver (not shown), such as Microsoft Internet Information Server®, Apache®, or the like. The CAP website 232A may be implemented as computer readable instructions configured to be executed by a computing device (not shown) and/or webserver host (not shown). The CAP website 232A may be implemented on the same computing device(s) on which the website manager 210 is implemented. In other embodiments, the CAP website 232A and/or host webserver of the CAP website 232A may comprise separate computing devices (not shown). The computing device(s) used to implement the CAP website 232A and/or the host webserver of the CAP website 232A may comprise and/or be communicatively coupled to a processor, memory, data storage media, one or more input/output interfaces (e.g., display monitor, keyboard, mouse, and the like), one or more communications interfaces, and the like.

The CAP website 232A may provide web content to the one or more users 250 via the network 260. The nature of the content provided by the CAP website 232A is discussed below in conjunction with FIGS. 7-9.

The users 250 may access the website manager 210, and the context aware websites 230, including the CAP website 232A, a manufacturer website 240A, one or more franchise group websites 242A, and/or one or more franchise websites 244A via the network 260 using respective computing devices 252. The computing devices 252 may comprise personal computers, cellular telephones, personal digital assistants (PDA), smart phones, or any other device capable of communicating over the network 260 (e.g., using Hypertext Transfer Protocol (HTTP) or another protocol).

The computing devices 252 may comprise an application 254 capable of rendering content generated by one or more of the context aware websites 230. Accordingly, the application 254 may comprise a web browser, such as Microsoft Internet Explorer®, Mozilla Firefox®, Apple Safari®, or the like. The application 254 may be capable of submitting data to the context aware websites 230 via the network 260 (e.g., using an HTTP POST or other mechanism).

The website manager 210 may comprise (e.g., host) or otherwise manage the context aware websites 230. However, this is only one possible arrangement. In other embodiments, the website manager 210 may be communicatively coupled to the context aware websites 230 over a network 260, a private network or a virtual private network, through a DMZ, or the like. As such, this disclosure should not be read as limited to any particular arrangement of website manager 210, the context aware websites 230, and/or any particular network topology.

In some embodiments, the website manager 210 may be configured to provide marketing and/or sales web services to a seller of a product or service, such as a manufacturer and its franchisees (e.g., an automobile manufacturer and its dealer network). Accordingly, the manufacturer website 240A, the franchise group websites 242A, and/or franchise websites 244A may provide marketing and sales information relating to the vehicles available from a particular manufacturer (e.g., manufacturer 110 of FIG. 1). As will be discussed below, the users 250 may access the context aware websites 230 via network 260, which may present marketing and/or sales information to the users 250.

As will be discussed below, the website manager 210 may receive incoming links from search engines 270 and other marketing channels (e.g., banner advertising, sponsored links, and the like). The website manager 210 may determine a destination website for the incoming users 250 using the CAP website 232A.

For example, the CAP website 232A may direct the users 250, the manufacturer website 240A, a franchise group website 242A, and/or a franchise website 244A. In this embodiment, the manufacturer website 240A, franchise group website 242A, and/or franchise website 244A may be managed individually (e.g., by the manufacturer, franchise groups, and franchises, respectively). In this embodiment, the website manager 210 may allow the various websites to share user profile information and/or receive configuration information 217 from the website manager 210.

Figure 2B:
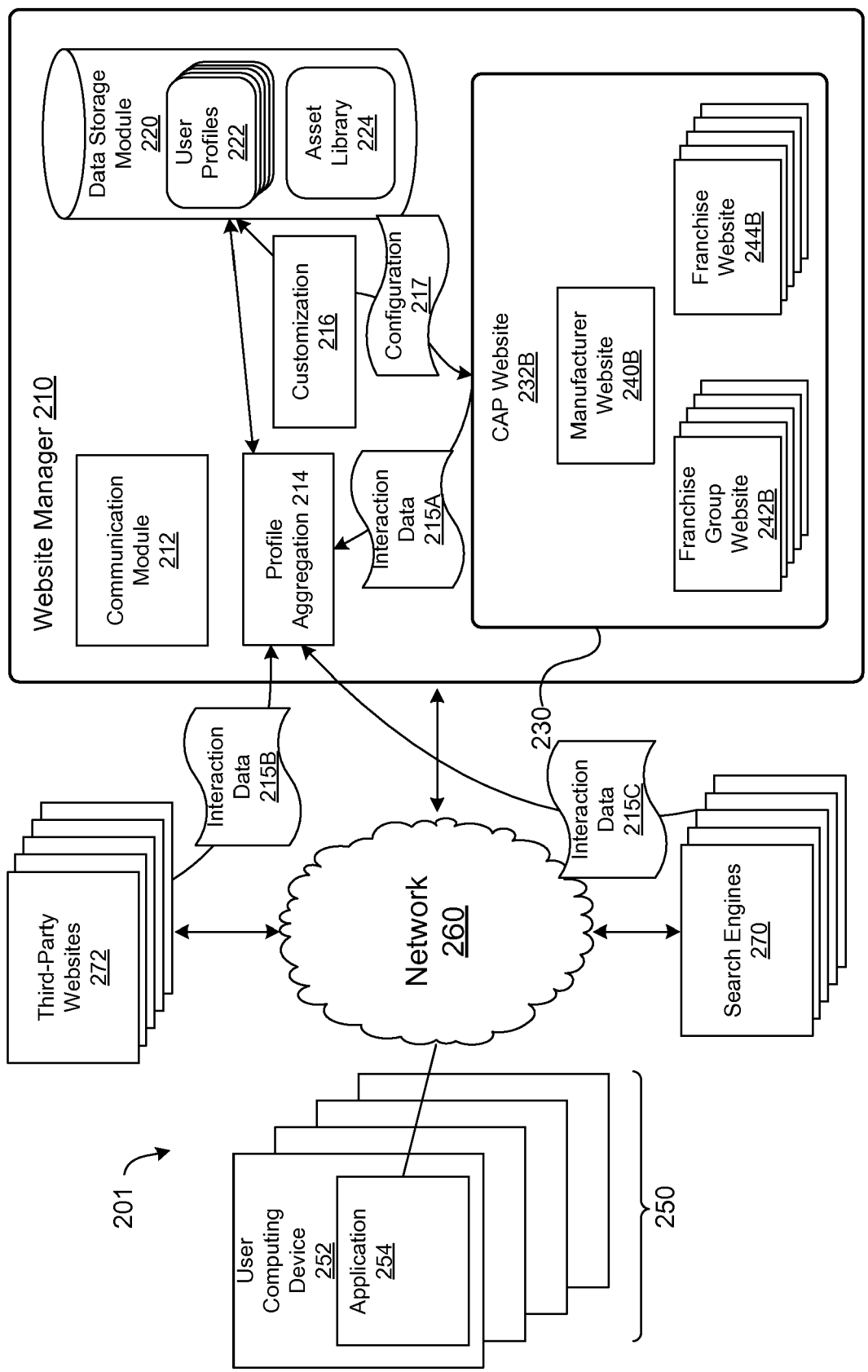
FIG. 2B is a block diagram of a system for aggregating user interactions with a plurality of websites to thereby generate one or more user profiles.

Alternatively, or in addition, as shown in FIG. 2B, a CAP website 232B may provide the web services for the manufacturer 240B, franchise groups 242B, and/or franchises 244B. In this case, the CAP website 232B may be configured to operate in one of a plurality of operational modes. The operational modes may be related to a geographic granularity of the franchise business model and/or may be related to a business relationship within the franchise business model. In other embodiments, the operational modes may relate to a user profile of a visitor to the website. For example, a website may be configurable to use one of a plurality of marketing-directive related themes (e.g., a "green vehicles" theme, a "work vehicles" theme, or the like). In this embodiment, the plurality of operational modes may refer to one of the plurality of marketing-directive related available on the website.

The CAP website 232B may be configured to display content related to one or more of the manufacturer 240B, franchise group 242B, and/or franchise 244B or combinations thereof depending upon its operational mode. Moreover, in this embodiment, the manufacturer 232B, franchise groups 240B, and/or franchises 244B may not be required to publish individual websites. Rather, the CAP website 232B and/or the website manager 210 may be configured to obtain relevant information (e.g., using a data aggregation or integration module (not shown)) from the manufacturer 240B, franchise groups 242B, and/or franchises 244B for presentation of the CAP website 232B. Embodiments of such a CAP website 232B are described below in conjunction with FIGS. 7-9.

In some embodiments, the website manager 210 of FIGS. 2A and 2B may be configured to provide marketing and/or sales web services to the manufacture and/or provider of products or services (e.g., to an automobile manufacturer and its dealer network). Accordingly, the manufacturer website 240A, the franchise group websites 242A, and/or the franchise websites 244A may provide marketing and sales information relating to the vehicles available from the manufacturer.

In the automotive example discussed above, the manufacturer website 240A may provide general information relating to the vehicles produced by the manufacturer (e.g., features, available options, etc.). The manufacturer website 240A may also provide promotional information and/or offers that apply to the entire market area of the manufacturer (e.g., special financing rates available through the manufacturer). The franchise group websites 242A may provide information relating to a particular group of franchisees (e.g., dealers). These websites 242A may provide region-specific promotional information (e.g., rebates available to those living in western states). In addition, the franchise group websites 242A may provide promotional and/or inventory information relating to a particular franchise group (e.g., provide inventory information for the franchises (dealers) in the franchise group). Similarly, the franchise websites 244A may provide franchise-specific promotional and inventory information. As will be discussed below, the CAP website 232A and/or 232B may aggregate the information available on each of the context aware websites 230 (or directly through the manufacturer website 240B, franchise group website(s) 242B, and/or franchises website(s) 244B) into a single, configurable portal CAP website 232A,B. As discussed above, the CAP website 232A,B may be configured to display content in one of a plurality of different operational modes according to a preference and/or a user profile 222 of a particular user 250.

In FIGS. 2A and 2B, the website manager 210 comprises a profile aggregation module 214 to build a user profile 222 for the users 250 who access the context aware websites 230. The context aware websites 230 may detect the content accessed by a particular user 250 (e.g., detect the WebPages or other resources accessed by a particular user 250). For example, in a system directed to automobile marketing, the detected activities may relate to whether a particular user 250 accessed information about particular vehicle models and/or vehicle technologies, such as Sports Utility Vehicles (SUV), hybrid drive systems, or the like. The context aware websites 230 may be configured to transmit one or more interaction data records 215A (e.g., records of which users 250 access what content on the respective websites 232A-232B, 240A, 242A, and/or 244A) to profile aggregation module 214 via the communication module 212 of the website manager 210.

The profile aggregation module 214 is configured to parse the interaction data records 215A to determine user behavior and derive user profile information therefrom. The log information 215A may comprise user identification data to allow the profile aggregation module 214 to link user activity in the interaction data records 215A to a particular user 250. The user identification data may allow the profile aggregation module 214 to track user activity across the context aware websites 230 (e.g., on websites 232A-232B, 240A,B, 242A, B, and/or 244A,B). Accordingly, a particular user's activity on the manufacturer website 240A may be correlated with that user's activity on the CAP website 232A-232B, on one or more of the franchise group websites 242A,B, and/or on one or more of the franchise websites 244A,B, and so on. In this way, the profile aggregation module 214 may generate profile of the particular user 250. This may be especially true where there are a large number of franchise groups 242A and/or franchises 244A. Similarly, user interactions in the CAP website 232A-232B under various different operational modes (e.g., national, regional, group, local, hyper-local) may be correlated.

The profile aggregation module 214 may correlate user activity on the context aware websites 230 and parse out activities relevant to the marketing and/or sale of products to the particular user 250. The profile aggregation module 214 may generate user profiles 222 for each of the users based on the log information 215A. The user profiles 222 may be stored in a data storage module 220 which may comprise any data storage and/or management system known in the art including, but not limited to: a database, such as a Structured Query Language (SQL) database or an eXtensible Markup Language (XML) database; a directory, such as an x.509 directory or a Lightweight Directory Access Protocol (LDAP) directory; a file system, a storage area network (SAN); or the like.

The profile aggregation module 214 may be configured to update the user profiles 222 responsive to activity by one or more users 250 on the context aware websites 230 and/or (as will be discussed below) search engines 270 and/or third-party websites 272. The aggregation of user behavior and/or preference information into respective user profiles 222 may be possible since the manufacturer website 240A, the franchise group websites 242A, the franchise websites 244A, and/or any third-party websites are configured to transmit interaction data (e.g., embodied as one or more interaction data records) to the profile aggregation module 214 via the network 260 and/or website manager 210 in a predetermined format (e.g., in XML, formatted text, or the like). As will be discussed below, the user profile information may be used by the website manager 210 and/or the websites 240A, 242A, and 244A to dynamically configure the websites according to the profile 222 of the particular user 250 visiting the respective context aware websites 230. In this way, the marketing and sales front websites (e.g., the website manager 210, manufacturer website 240A, franchise group websites 242A, and/or the franchise websites 244A) may present content relevant to the user 250 in a manner appealing to the user 250.

The nature of the user profiles 222 generated by the profile aggregation module 214 may depend upon the type of product and/or service marketed and/or sold through the context aware websites 230. For example, in the vehicle marketing and sales example discussed above, the context aware websites 230 may allow users 250 to configure and price particular vehicle models (e.g., an SUV) with various options (e.g., four-wheel drive, a hybrid engine, or the like). The options selected by the user may be included in the interaction data records 215A generated by the context aware website 230 that is transmitted to and processed by the profile aggregation module 214. The profile aggregation module 214 may generate a user profile 222 for the particular user 250 indicating the user's interest in the vehicle and/or technology type.

Virtually any user activity and/or interaction on the website manager 210 and/or the context aware websites 23, the search engine(s) 270, and/or third-party websites 272 may be included in the interaction data records 215A-215C and used by the profile aggregation module 214 to generate the user profiles 222. Again, in the vehicle marketing and sales context, such information may include, but is not limited to: user color preferences, engine type preferences, interior preferences (e.g., cloth versus leather, seating configuration, etc.), vehicle capacity preferences, vehicle type preferences, vehicle emissions preferences, fuel efficiency preferences and the like.

In addition to building user-specific profile information, the interaction data records 215A (and the resulting user profiles 222) may include information relating to the user's interaction with an interface (e.g., layout and/or other components) of the respective context aware websites 230. For instance, one or more of the context aware websites 230 may detect that when a user 250 reaches a particular page (e.g., a vehicle configuration page), he/she does not interact with the page as expected (e.g., does not configure a vehicle). This may indicate that the user 250 is unable to operate the page and/or the design of the page is not appropriate for the user 250. This information may be included in a user profile 222 for use in configuring the context aware websites 230 accordingly.

Similarly, one or more of the context aware websites 230 may provide interactive application content such as an Adobe Flash®, Shockwave®, Ajax, or the like. The user's interaction with these components may be included in the log information 215A to determine the efficacy of these components in presenting the products and/or services of the manufacturer. For example, one or more of the context aware websites 230 may provide a Flash® component providing access to a vehicle inventory. The interaction data records 215A may indicate that a particular user 250 is unable to operate the component (e.g., users do not follow any of the links provided by the component, etc.). Similarly, the interaction data records 215A may indicate that some users 250 are more comfortable with traditional controls (e.g., static HTML) as opposed to interfaces comprising dynamic components (e.g., Flash®, or the like).

As discussed above, the nature of the information captured by the website manager 210 and/or the context aware websites 230 may be adapted according to the product and/or service marketed and/or sold by the manufacturer. The information captured by the context aware websites 230 may comprise any user behavior and/or profile information known in the art. The user profile 222 may include information that is not directly related to the particular product and/or service marketed and/or sold by the manufacturer. For example, demographic information, such as income level, marital status, family size, locale, home ownership status, and the like may be logged and included in the profiles 222. In addition, information relating to the political, philosophical, and/or lifestyle preferences of the users 250 may be logged and aggregated in the user profiles 222.

In addition to receiving interaction data records 215A relating to user activity on the context aware websites 230, interaction data records 215B may be received from one or more third-party websites 272. In some embodiments, the third-party websites 272 may be configured to provide the interaction data records 215B to the profile aggregation module 214 in a pre-determined format the profile aggregation module 214 is configured to parse. Alternatively, or in addition, the profile aggregation module 214 may comprise one or more translation modules (not shown) to translate the interaction data records 215B received from the respective third-party websites 272 into an appropriate format.

The interaction data records 215B received from the third party websites may be correlated to particular user profiles 222. Any means for correlating user activity data known in the art may be used in the log information 215B including, but not limited to: browser cookies, cross-domain image tagging, scripting technologies (e.g., Javascript® or the like), IP addressing, Media Access Code (MAC) addressing, login information (e.g., user name/password), email address, or the like. As such, this disclosure should not be read as limited to any particular user tracking technique and/or technology.

The third-party websites 272 may comprise content related to the particular product and/or service marketed and/or sold by the manufacturer. For example, in the automotive context, the third-party websites 272 may include an automobile research site such as Edmonds.com®, Yahoo!® Autos, or the like. In this case, the interaction data records 215B may comprise the content accessed by a particular user 250 on the particular third-party site 272 (e.g., vehicles researched, options selected, etc.). Such information may be obtained via a cross-marketing relationship between the manufacturer and the third-party site 272. Alternatively, or in addition, banner ads presented on the third-party site 272 may be configured to provide interaction data records 215B to the website manager 210 (e.g., indicating that a particular user accessed particular content on the third-party site).

In some embodiments, one or more of the third-party sites 272 may be unrelated to the particular product and/or service sold by the manufacturer. Rather, the one or more third-party websites 272 may be related to particular political, points-of-view, and/or lifestyle preferences. In this case, the interaction data records 215B may indicate the particular political, point-of-view, and/or lifestyle preferences of a particular user 250. For example, the interaction data records 215B may indicate that a particular user 250 visits websites directed to environmental issues. This information could be obtained by placing banner ads on the websites directed to such issues and/or by establishing a relationship with the third-party, environmental website 272 whereby the website 272 would transmit interaction data records 215B to the website manager 210. As described above, the profile aggregation module 214 of the website may include such information in the user profile 222 of the particular user 250.

Users 250 may be driven to particular marketing and/or sales front websites 232A-232B, 240A, 242A, and/or 244A via numerous channels. One of the more common channels is a search engine 270. For instance, a user may search for a particular product and/or service using a search engine 270, which may return a results page generated by inter alia, comparing the search terms provided by the user 250 to an index of the search engine 270. In some cases, a search engine 270 may return a link to the manufacturer site 240A, a franchise group website 242A, and/or a franchise website 244A as a search result. Alternatively, or in addition, a link to the CAP website 232B may be returned, which may present content relevant to the manufacturer 240, one or more franchise groups 242B, and/or franchises 244B. If the user 250 selects the search result associated with one of the context aware websites 230 (e.g., website 232A-232B, 240A, 242A, and/or 244A), the terms and other data submitted to the search engine 270 (e.g., geographical information, other searches performed, or the like) may be transmitted to the context aware website 230 as search engine interaction data records 215C. The interaction data records 215C may be embodied as Uniform Resource Locator (URL) parameters, a cookie, or the like. As discussed above, the profile aggregation module 214 of the website manager 210 may be configured to add search engine logging data to the user profile 222 of the particular user 250. The search engines 270 may be configured to provide the interaction data records 215C in a format the profile aggregation module 214 is capable of parsing and/or the profile aggregation module 214 may comprise one or more translation modules (not shown) capable of translating the interaction data records 215C into suitable format.

As discussed above, the search engine 270 may present one or more so-called sponsored links along with its search results page. One or more of the sponsored links may direct the user to one of the context aware websites 230 managed by the website manager 210. Incoming sponsored links may comprise user behavior and/or profile logging data 215C that may be used by the profile aggregation module 214 to generate and/or update the user profiles 222. Such information may include, but is not limited to: the search term(s) that generated the sponsored link, the other searches performed by the user (e.g., the user's search history), or the like.

The website manager 210 may comprise a website configuration module 216 to dynamically configure the respective context aware websites 230. The website configuration module 216 may be communicatively coupled to the data storage module 220, which may comprise an asset library 224, which may comprise, inter alia, branding and promotional assets for presentation on one or more of the context aware websites 230. The asset library 224 may comprise web content displayable on the context aware websites 230, which include, but is not limited to: graphics, video, audio, web page layout and design assets (e.g., cascading style sheets (CSS), font types and sizes, and the like), dynamic content (e.g., Flash®, Shockwave®, and the like), text content, web content (e.g., web pages, etc.), and the like.

The asset library 224 may comprise assets defining one or more marketing and/or promotional directives of the manufacturer, franchise groups, and/or franchises. For example, a vehicle manufacturer may have periodic promotional and/or branding directives (e.g., the vehicle manufacturer may sponsor Olympic coverage). Accordingly, the asset library 224 may comprise assets (e.g., graphics, text, video, and the like) relating to the vehicle manufacturer's sponsorship. The website configuration module 216 may be configured to include the appropriate branding and/or promotional assets in the asset library 224 to each of the context aware websites 230. In this way, the context aware websites 230 may have consistent branding displayed thereon.

The asset library 224 may comprise a plurality of parallel marketing directives associated with the manufacturer and/or the franchisees of the manufacturer. As used herein, a parallel marketing directive may refer to one of a plurality of marketing directives each of which may be simultaneously used by any one of the context aware websites 230.

For example, a vehicle manufacturer may have an "efficient" vehicle marketing directive highlighting the manufacturer's fuel efficient vehicles. The vehicle manufacturer may have parallel marketing directives directed to other market segments, such as "green" vehicles, SUV vehicles, work vehicles (e.g., trucks and the like), family vehicles, and so on. The marketing directives may comprise look-and-feel and branding assets highlighting vehicles consistent with the particular marketing directive. For example, the "green" vehicle directive may cause each of the context aware websites 230 to be displayed with a "green" background, and cause information relating to "green" vehicles available from the manufacturer to be displayed. In the franchise group websites 242A and/or franchise websites 244, the directive may cause "green" vehicle inventory available at the particular franchises to be prominently displayed. In contrast, a directive directed to SUVs may cause different background assets (e.g., photos of SUVs or the like) to be displayed and may cause a different set of vehicles to be featured. In some embodiments, multiple, compatible directives may be simultaneously applied to the context aware websites 230. For instance, a "family" marketing directive may be combined with the "efficient" vehicle marketing directive to highlight efficient, family-sized vehicles available from the manufacturer.

As discussed above, behavior modeling of the log data 215A-C and/or in the user profiles 222 may indicate when particular users 250 are ready to purchase a particular product or service. The modeling may comprise detecting the frequency of a particular user's 250 visits to the context aware websites 230, the searches performed by the particular user 250 on the one or more search engines 270, activity on one or more third party websites 272 (e.g., investigation of financing, in-depth research, etc.), or the like. Alternatively, or in addition, a third party service (not shown), such as a marketing firm, behavioral modeling firm, or the like may be employed to determine user 250 ripeness. Information relating to the users 250 "ripeness" (e.g., an estimate of whether the users 250 are ready to make a purchase) may be included in the respective user profiles 222.

The asset library 224 may comprise various assets that may be applied to the context aware websites 230 according to a particular user's 250 ripeness as reflected in his/her respective user profile 222. For example, the asset library 224 may feature prominent financing and/or promotional offers, which may appeal to a user 250 who is deemed to be on the verge of making a purchase. Alternatively, a user 250 who is early in the buying process may be presented with more research-oriented promotional materials. The website configuration module 216 may be configured to select appropriate branding and/or promotional assets from the asset library 224 according to each user's 250 ripeness as indicated in the user's 250 respective user profile 222.

As discussed above, the user profiles 222 may include user preference information. The preference information may be directly related to the product and/or service offered by the manufacturer (e.g., the user's 250 preferred vehicle color and/or optional). Some preference information may not be directly related to the product and/or service offered by the manufacturer 240B. Such preference information may include, but is not limited to: political preferences, philosophy, world-view, cultural preferences, point-of-view preferences, and the like. The website configuration module 216 may include content relevant and/or directed to one or more of the user preferences in a particular user profile 222. For example, a user profile 222 may indicate that a particular user 250 is interested in environmental issues. As such, the website configuration module 216 may configure one or more of the context aware websites 230 to display assets relating to environmental issues (assets available from the asset library 224 or some other source).

Similarly, also as discussed above, a user profile 222 may indicate that a particular user 250 has a preference for a particular product or service (or configuration thereof) offered by the manufacturer 240B. For example, a user profile 222 may indicate a particular user's 250 preference for vehicles having a blue color, cloth seating, and equipped with a navigation and DVD entertainment system. Accordingly, the website configuration module 216 may cause the context aware websites 230 to display vehicles and/or vehicle inventory according to the user's 250 preferences.

As discussed above, the website configuration module 216 may configure the context aware websites 230 responsive to a particular user profile 222. In addition, the website configuration module 216 may configure the context aware websites 230 differently responsive to the same user profile 222. For example, a particular user profile 222 may indicate a user's preference for blue SUVs with DVD entertainment systems. The website configuration module 216 may configure the manufacturer websites 240 to display the manufacturer's SUVs in a blue color. In addition, the manufacturer website 240 may be configured to highlight the DVD entertainment systems available in such vehicles. Similarly, a vehicle configurator on the manufacturer website may be pre-populated according to the preferences reflected in the user profile 222. The franchise group websites 242A and/or franchise websites 244A may be configured differently. For example, the website configuration module 216 may configure a franchise group website 242A and/or franchise website 244A to feature actual vehicle inventory available from the respective franchises matching the user profile 222 (e.g., blue SUVs having DVD entertainment systems). As will be discussed below, the CAP website 232 may be configured to operate in a particular operational mode corresponding to a particular geographic granularity within the business hierarchy (e.g., national, regional, group, local, and/or hyper-local). In each of the various operational modes, the CAP website 232 may be configured to display different content to a particular user 250.

The website configuration module 216 may configure the context aware websites 230 using configuration data 217. The configuration data 217 may comprise any web configuration data known in the art including, but not limited to: XML configuration data, such as CSS, HTML, or the like; graphical content, video content, audio content, text content, or the like. The configuration data may be transmitted to the context aware websites 230 via any means known in the art including, but not limited to: as one or more URL parameters, as HTTP header data, via backchannel communication between the website configuration module 216 and the context aware websites 230; via browser software (e.g., via a cookie or the like), via HTTP redirection (e.g., HTTP POST), or the like.

Figure 3A:
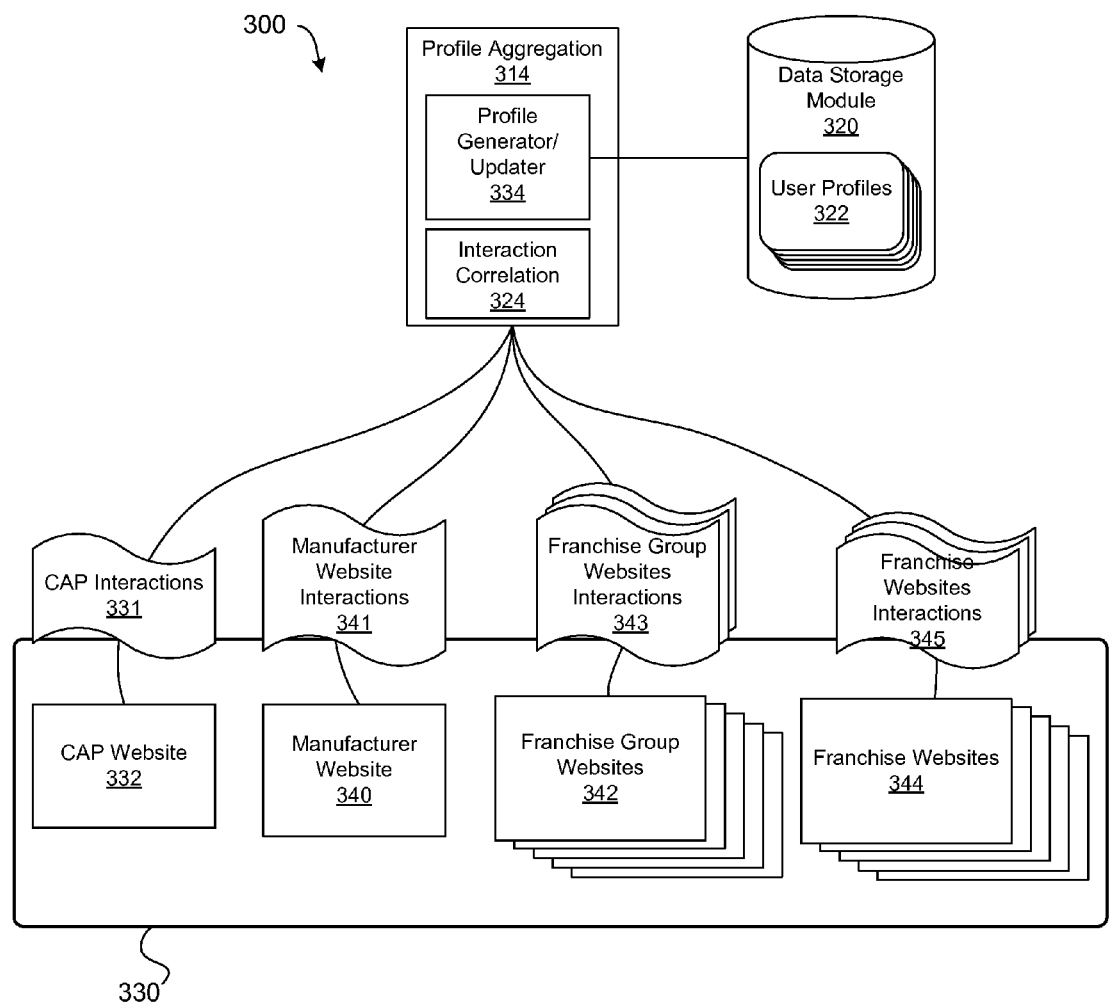
FIG. 3A is a block diagram of one embodiment of a system for aggregating user interaction data into one or more user profiles.

FIG. 3A is a block diagram of one embodiment of a system 300 for aggregating user behavior and/or profile information within a network of affiliated websites 330. As discussed above, the network of affiliated websites 330 may comprise websites affiliated in a business hierarchy (e.g., the franchise hierarchy illustrated in FIG. 1). In system 300, the network of affiliated websites 330 comprises a CAP website 332 (the operation of which is described below in conjunction with FIGS. 7-9). In addition, the system 300 may comprise a manufacturer website 340, a plurality of franchise group websites 342, and/or a plurality of franchise websites 344.

Each of the websites in the group of affiliated websites 330 (e.g., websites 332, 340, 342, and 344) may be configured to monitor, record, and transmit user interactions with the respective websites. The interaction data records may comprise user activity on the respective websites 332, 340, 342, and/or 344 and/or may comprise information provided by the one or more users of the websites 332, 340, 342, and/or 344 (e.g., information entered via a form, poll, or the like on the respective website).

The constituents (websites 332, 340, 342, and 344) of the network of affiliated websites 330 may be configured to transmit interaction data records (logs 331, 341, 343, and 345) to a profile aggregation module 314. The profile aggregation module 314 may be provided as remote service (e.g., a web service) accessible over a network, such as the Internet via an RMI and/or a remote object access interface, such as SOAP or the like.

The interaction data records 331, 341, 343, and/or 344 may comprise identification information to allow a recipient of the interaction data records (e.g., profile aggregation module 314) to correlate user interactions between multiple websites 332, 340, 342, and/or 344. For example, a particular user (User A) may access several of the websites (332, 340, 342, and/or 344) in the network of affiliated websites 330. The interaction data records generated by each of the websites (332, 340, 342, and/or 344) may assign a unique identifier to User A using any user tracking means known in the art (e.g., cookie, MAC, IP address, or the like). Accordingly, User A's activity on each of the websites 332, 340, 342, and/or 344 may be correlated within the network of affiliated websites 330, and the resulting user profile 322 may reflect User A's activity across all of the websites 332, 340, 342, and/or 344 in the network 330.

The profile aggregation module 314 may receive the interaction data records 331, 341, 343, and/or 345 via a communication module (not shown) coupled to a network (not shown). An interaction correlation module 324 may be used to aggregate interaction data records about particular users in the interaction data records 331, 341, 343, and/or 345 using the user identifier information in the respective interaction data records (e.g., cookie information and the like).

The interaction correlation module 342 may correlate user activity across the multiple websites (332, 340, 342, and 344) in the network of affiliated websites 330. The interaction correlation module may correlate user activity across the multiple affiliate websites 330 so that a particular user's interaction with each of the websites 332, 340, 342, and/or 344 may be aggregated.

The correlated user profile information may be processed by a profile generator/updater 334. The profile generator/updater 334 may generate and/or update user profiles for each of the user interactions tracked by the interaction data records 331, 341, 343, and/or 345. The profile generator/updater 334 may determine whether a user profile 322 already exists for a particular user. This may be done by comparing (e.g., searching for) the user identifier information in existing user profiles 322 using the user identifying information in the correlated interaction data records. If a match is found, the respective user profile 322 may be obtained and updated; otherwise, a new user profile may be generated.

The user profile generator/updater 334 may create user profiles 322 for each of the users in the correlated interaction data records. As discussed above, the user profiles 322 may comprise user behavior and/or profile information known in the art including, but not limited to: information relevant to the particular product and/or service offered by the network of affiliate websites; information that is not directly relevant to the particular product and/or service offered by the network of affiliate websites; user preference information; user demographic information; and the like.

The user profiles 322 generated by the profile generator/updater module 334 may be stored in a data storage module 320, which may comprise any data storage and/or management means known in the art.

Although not shown in FIG. 3A, the profile aggregation module 314 may receive interaction data records from other, third-party websites (not shown), such as search engines, product review and rating websites, and the like. The interaction data records received from such third-party sites may be processed by the interaction correlation module 324 to allow the profile generator/updater module 324 to assign the interaction data records to a particular user profile 322.

Figure 3B:
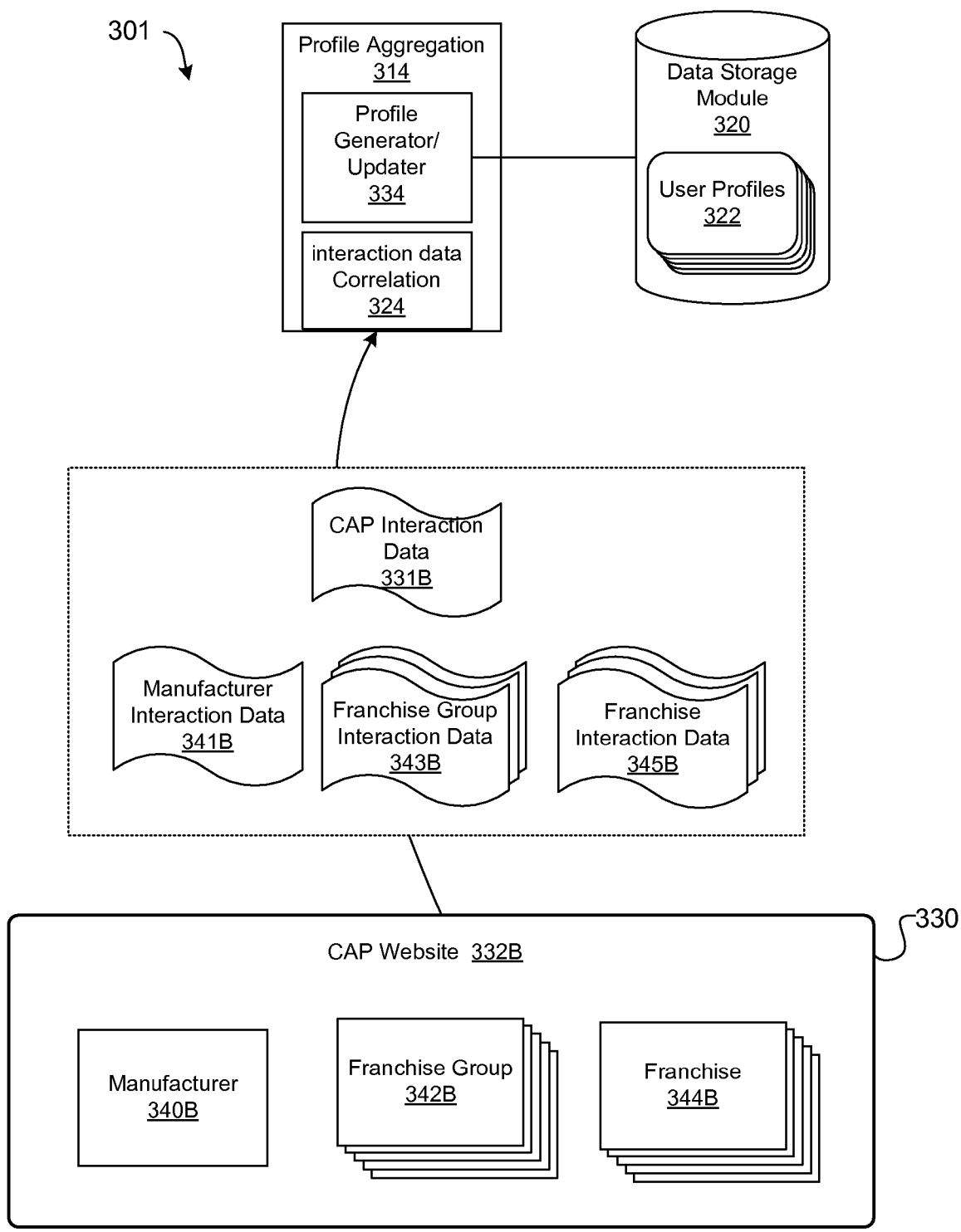
FIG. 3B is a block diagram of an embodiment of a system for aggregating user interaction data into one or more user profiles.

FIG. 3B is a dataflow block diagram of another embodiment of a system 301 for aggregating user behavior and/or profile information. In the FIG. 3B embodiment, the network of affiliate websites may be provided by a configurable CAP website 332B. The CAP website may be configured to operate in different operational modes corresponding to particular geographic granularities and/or business relationships within a business hierarchy. Such operational modes may include, but are not limited to: a national mode; a regional mode; a local mode; a group mode; and a hyper-local mode. These modes are described below in conjunction with FIGS. 7-9.

As will be discussed below, in its various operational modes, the CAP website 332B may be configured to present content from a manufacturer 340B, one or more franchise groups 342B, and/or one or more franchises 344B. Accordingly, the CAP website 332B may be communicatively coupled to one or more systems (e.g., database, inventory systems, or the like) of the manufacturer 340B, franchise groups 342B, and/or franchises 344B.

The CAP website 332B may be configured to transmit interaction data records relating to user activity on the CAP website 332B in each of its operational modes (while providing content relating to one or more of the manufacturer 340B, franchise groups 342B, and/or franchises 344B). The interaction data records may be obtained and/or transmitted substantially as described above. Although in FIG. 3B the interaction data records 331B, 341B, 343B, and 345B are depicted separately, the configuration data could be comprised as a single set of CAP interaction data records (not shown), which may be adapted to comprise interaction data of the CAP website 332B operating in any it is operational modes (e.g., national, regional, local, hyper-local, and so on).

Similarly, although FIGS. 3A and 3B depict the websites (e.g., CAP website 332A and 332B and so on) as separate from the profile aggregation module 314 and/or the data storage module 320, one of skill in the art would recognize that the websites, profile aggregation module 314, and/or data storage module 320 could be implemented on a common computing platform and/or within a common co-location hosting facility. Accordingly, this disclosure should not be read as limited to any particular network and/or implementation topology.

Figure 4:
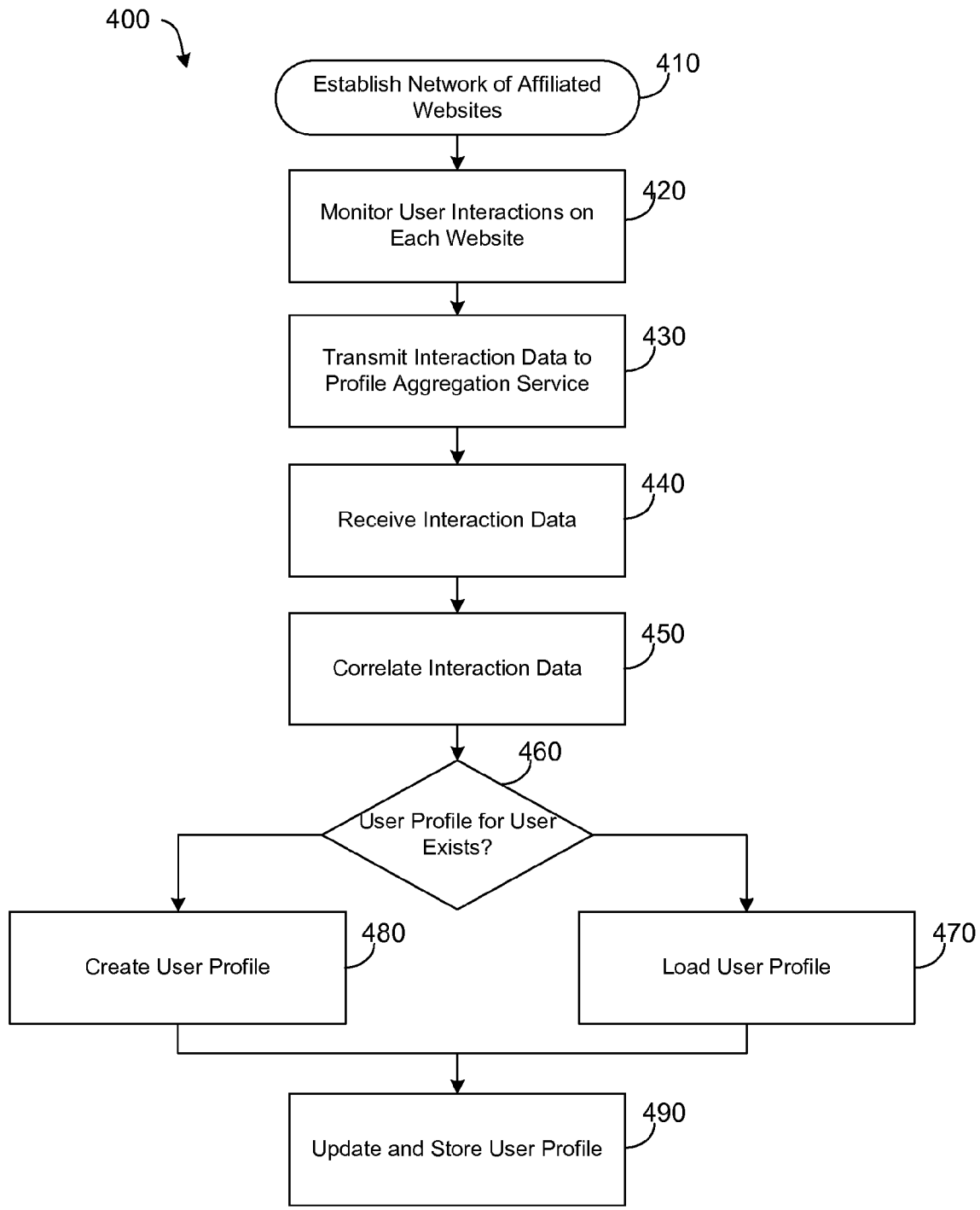
FIG. 4 is a flow diagram of one embodiment of a method for aggregating user profile information.

FIG. 4 is a flow diagram of one embodiment of a method 400 for aggregating user profile information in a network of affiliated websites. At step 410, a network of affiliated websites may be established. As discussed above, the websites may be affiliated in a business hierarchy (e.g., the business hierarchy illustrated in FIG. 1).

At step 420, each of the affiliated sites may be configured to monitor user interactions and/or gather user interaction data at the respective website. As discussed above, these user interactions may comprise the web content accessed by various users, the nature of the user interaction (e.g., a product, such as a vehicle, configured using a configurator on the websites and/or inventory searched for), product preferences of the user (e.g., colors and/or options selected by the user), and the like. Similarly, the interaction data records may comprise information provided by the user to the website (e.g., in a questionnaire, form, poll, or the like).

The interaction data records may comprise user identification information. The identification information may allow each interaction data record to be associated with particular users and to correlate user activity across multiple websites in the affiliate network. For example, a particular user (user A) may visit a number of websites in the network of affiliated websites established at step 410 (e.g., a manufacturer website 240A and one or more franchise group websites 242A and/or franchise websites 244A). The user identification information in the interaction data record may allow for these various user interactions to be correlated with one another.

At step 430, the websites may transmit their interaction data records to a profile aggregation service. The transmitting of step 430 may be continuous (e.g., interaction data records may be transmitted as it is obtained) and/or periodic (e.g., multiple interaction data records may be transmitted in batches). The interaction data may be transmitted over a secure and/or encrypted communications channel, such as Secure Sockets Layer (SSL), Secure HTTP (HTTPS), or the like. At step 440, the profile aggregation service may receive interaction data records from one or more websites. Receiving the interaction data records may comprise authenticating the interaction data records to prevent injection of bad and/or malicious data into the profile aggregation service. Such authentication information may comprise a digital signature or the like and may be provided by the communication infrastructure used to transmit the interaction data records (e.g., mutually authenticated SSL).

At step 450, the user identifier information in the interaction data records received at step 440 may be used to correlate the interaction data records received from the various affiliated websites. In this way, user profile and/or behavior information across multiple websites may be aggregated into a single user profile.

At step 460, method 400 may determine whether a user profile associated with a particular identifier in the interaction data record already exists. This may comprise searching a data storage system (e.g., a database, directory, or the like) for a particular user identifier. In this way, user interactions with the network of affiliated websites may be tracked over time (e.g., the user profile may reflect user interactions with the affiliated websites over time). If a user profile for the particular user identifier is found, the flow may continue to step 470 where the user profile may be loaded; otherwise, the flow may continue to step 480 where a new user profile may be created.

At step 490, the user profile generated at step 480 or obtained at step 470 may be updated to reflect the user behavior and/or profile information in the interaction data records received at step 440. As discussed above, this may include, but is not limited to: updating user preferences related to the product and/or service offered by the network of affiliated websites (e.g., preferred vehicle type, color, options, or the like); updating user preferences that are not directly related to the product and/or service offered by the network of affiliated websites (e.g., political, point-of-view, interest, demographics, etc.); updating information relating to the user's "ripeness" to make a purchase; and so on. After creating and/or updating each of the user profiles correlated at step 450, the profiles may be stored in a data storage system (e.g., database, directory, or the like).

Referring again to FIGS. 2A and 2B, the website configuration module 216 may dynamically configure the context aware websites 230 responsive to a user profile 222 of a particular user 250. As discussed above, the configuration may comprise applying one or more branding and promotional assets from the asset library 224 to one or more of the context aware websites 230. For example, the website configuration module 216 may dynamically configure a particular website 232A-232B, 240A, 242A, and/or 244A for a user 250 whose user profile 222 indicates that he/she has exclusively accessed SUV vehicles in past visits to the websites 232A-232B, 240A, 242A, and/or 244A. Similarly, the website configuration module 216 may dynamically configure one or more of the context aware websites 230 to have a "green" look-and-feed for a user 250 whose user profile 222 indicates an affinity for "green" vehicles (e.g., based on past visits to the context aware websites 230, to search engine 270, and/or to third-party websites 272).

The asset library 224 may further comprise look-and-feel assets, such as layout data (e.g., cascading style sheet (CSS) assets, layout graphics, or the like), page layouts (e.g., frame layouts), website components (e.g., forms, Flash® applications, Shockwave® applications, or the like). The look-and-feel assets of the asset library 224 may be applied to one of more of the context aware websites 230 to provide those websites with a consistent look-and-feel. As described below, the website configuration module 216 may select websites components from the asset library 224 according to a user profile 222 of a particular user 225.

In some embodiments, the asset library 224 may comprise one or more replacement look-and-feel interfaces. For example, the asset library 224 may comprise a plurality of vehicle configurator interfaces (e.g., interfaces that allow a user to "build up" a vehicle into a particular configuration. The interfaces may include a Flash® vehicle configurator, an AJAX configurator, and a FORM based configurator. As would be understood by one skilled in the art, a website may be implemented using any number of technologies and/or components. The website configuration module 216 may determine which of the available interfaces should be presented on a particular context aware website 230 based on the user profile 222 of the particular user 250. For example, the user profile 222 of a particular user 250 may indicate that the user has not successfully configured a vehicle using a Flash® based vehicle configuration interface. As such, the website configuration module 216 may cause the context aware website 230 (e.g., website 232A-B, 240A-B, 242A-B, and/or 244A-B) to display an alternative vehicle configuration component, such as a vehicle configuration component implemented, such as HTML, AJAX, or the like. Alternatively, the user profile 222 may indicate a preference for AJAX interfaces, as such, an AJAX interface may be displayed.

Figure 5A:
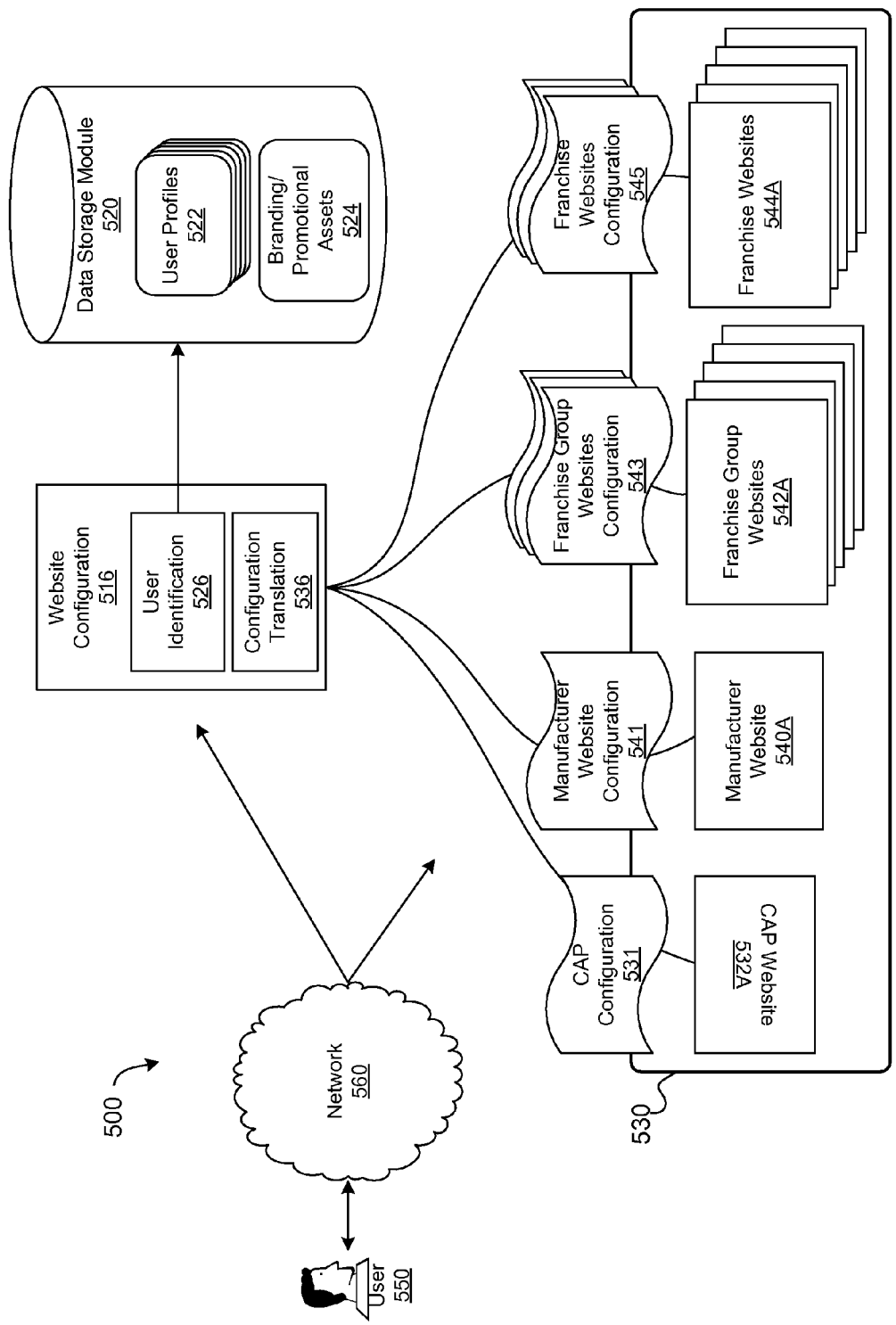
FIG. 5A is a block diagram of one embodiment of a system for configuring a plurality of websites using one or more user profiles.

FIG. 5A is a block diagram of one embodiment of a system 500 for configuring a website using user profile information. A website configuration module 516 may be used to configure a network of affiliated websites 530. The network of affiliated websites 530 may comprise websites affiliated in a business relationship, such as the business hierarchy as depicted in FIG. 1. In this embodiment, the network of affiliated websites may comprise a CAP website 532, a manufacturer website 540, a plurality of franchise group websites 542, and/or a plurality of franchise websites 544.

The website configuration module 516 may be communicatively coupled to a data storage module 520 comprising a plurality of user profiles 522 and an asset library 524. The user profiles 522 may comprise user behavior and/or profile information that the website configuration module 516 may leverage to dynamically configure one or more of the affiliated websites 530. As discussed above, the asset library 524 may comprise web and other content including, but not limited to: graphics, video, audio, layout directives (e.g., CSS or the like), interfaces, marketing and promotional directives, and so on.

A user 550 may access one or more of the affiliated websites 530 via a network 560. The user 550 may access the one or more of the affiliated websites 530 using a computing device (not shown) having web browsing software (not shown) thereon. The user 550 may access the affiliated site 530 directly and/or through a portal website, such as a CAP website (e.g., website 532A) and/or a forward proxy. The operation of the CAP website 532A and/or 532B is described in additional detail below. See FIGS. 7-9.

Access to the network of affiliated websites 530 (e.g., the CAP website 532A, the manufacturer website 540A, a franchise group website 542A, and/or franchise websites 544A) may be made through the website configuration module 516 (as a forward proxy). Alternatively, the website configuration module 516 may be communicatively coupled to the websites 530. Accordingly, as a user 550 accesses the websites 530, the website configuration module 516 may configure the website using configuration data 531, 541, 543, and/or 545. If the user 550 accesses an affiliate website 530 directly, the website may transmit a configuration request to the website configuration module 516 requesting configuration data (e.g., data 531, 541, 543, and/or 545). Alternatively, if the request is passed through the website configuration module 516, the configuration data 531, 541, 543, and/or 545 may be provided automatically as the request is routed to the appropriate affiliate website 530 (e.g., website 532, 540, 542, and/or 544).

The website configuration module 516 may comprise a user identification module 526, which is configured to obtain user identifying information from a user 550 request. The identification information may be any user identification and/or tracking data known in the art including, but not limited to: a browser cookie; IP address; MAC address; credential; or the like. In some embodiments, the user identification module 526 may obtain the identification information from an HTTP request of the user 550 (e.g., as a URL parameter, HTTP header, cookie, or the like).

The user identification module 526 may use the identification information to lookup a user profile 522 of the particular user 550. The lookup may comprise converting the user identifier into another form (e.g., a hash of the identifier or the like). If no user profile 522 is found for the user 520, the website configuration module 516 may return default or new user configuration data (531, 541, 543, and/or 545) to the affiliate website 530.

If a user profile 522 for the user 550 is found, the website configuration module 516 may use the user profile 522 to configure the affiliate website 550 according to the preferences of the user 550. As discussed above, the user profile may comprise user preferences information. The preferences may be directly or indirectly related to the products and/or service promoted and sold by one or more of the affiliate websites 530. The website configuration module 516 may use this information to configure the one or more websites 530 to display information relevant to user preferences in the profile 522. As discussed above, the manufacturer may develop one or more marketing initiatives directed to particular market segments (e.g., eco-friendly products, etc.). The website configuration module 516 may employ the user preference information in the user profile 522 used to select appropriate marketing initiatives to apply to the affiliate websites 530.

The user profile 522 may also include usability information, which may comprise behavioral feedback on the user 550 indicating which interfaces the user 550 is comfortable using (e.g., form versus Flash® based applications and the like). Accordingly, the website configuration module 516 may determine the interfaces and options available on a particular affiliate website 530, depending upon usability information in the user profile 522.

Similarly, the user profile 522 may also indicate the "ripeness" of the particular user 550, which may indicate where the user 550 is in the buying process (e.g., from preliminary research stage to ready to make a purchasing decision). The website configuration module 516 may configure the affiliate websites 530 according to the user's 550 point in the buying process. For example, the website configuration module 516 may configure the one or more affiliate websites 530 to display information relating to current purchase offers (e.g., financing, rebates, and the like) to a user 550 whose profile 522 indicates he/she is ready to make a purchasing decision. Alternatively, the website configuration module 516 may cause the websites 530 to display content directed to initial research and investigation.

As discussed above, the website configuration module 516 may generate a website configuration according to a user profile 522 of a particular user 550 attempting to access one of the affiliated websites 530. The configuration may relate to one or more user preferences, useable (or other types of behavioral modeling), and/or the "ripeness" of the user. The configuration generated by the website configuration module 516 may also be based upon the particular affiliate website 530 the user 250 is attempting to access (e.g., CAP website 532A, manufacturer website 540A, franchise group website 542A, and/or a particular franchise website 544A). For example, a user who has indicated a preference for a particular model of a blue SUV may be shown a configuration page for the vehicle on the manufacturer website 540A (with the appropriate color and/or selections already made). Alternatively, when the same user visits a franchise website 544A, the configuration module 516 may instruct the website 544A to display the franchise's inventory of vehicles matching (as closely as possible) the user's preferences. Similarly, a "ripe" user 550 visiting the manufacturer website 540A may be presented with nationwide offers available from the manufacturer (e.g., financing offers, rebates, and the like). When the same user 550 visits a franchise group website 542A, the website configuration module 516 may configure the website 542A to display any franchise-specific offers along with the manufacturer's offers.

Using the user profile information 522 obtained by the user identification module 526, the website configuration module 516 may generate website configuration data to configure one or more of the affiliate websites 530. The configuration information may vary depending upon the nature of the affiliate website 530 (e.g., may vary between the CAP website 532A, m4anufacturer website 540A, franchise group websites 542A, and/or franchise websites 544A). The configuration data (531, 541, 543, and/or 545) may also vary based on the implementation technology of the particular website (532A, 540A, 542A, and/or 544A). For example, the affiliate websites 530 may be implemented using different technologies (e.g., one or more of the websites 530 may be implemented using Microsoft Application Server Pages® (ASP), whereas others may be implemented using PHP and/or Java Server Pages). A translation module 536 may translate the website configuration generated by the website configuration module 516 into a format appropriate to the particular website (532A, 540A, 542A, and/or 544A).

FIG. 5B is a data flow block diagram of another embodiment of a system 501 for configuring a website. In the FIG. 5B embodiment, the network of affiliate websites may be provided by a configurable CAP website 532B. The CAP website 532B may be configured to operate in one of a plurality of operational modes. The operational modes may correspond to a geographic granularity and/or business relationship in a business hierarchy. Such modes may include, but are not limited to: a national mode; a regional mode; a group mode; a local mode; and a hyper-local mode. These modes are described below in conjunction with FIGS. 7-9.

In the various operational modes, the CAP website 532B may be configured to provide content from a manufacturer 540B, one or more franchise groups 542B, and/or one or more franchises 544B. Accordingly, the CAP website 532B may be communicatively coupled to one or more systems (e.g., database, inventory system, or the like) of the manufacturer 540B, franchise groups 542B, and/or franchises 544B using a data aggregation module discussed below (not shown).

The CAP website 532B may be configured by the configuration module 516 substantially as described above. However, in the FIG. 5B embodiment, the CAP website configuration 531B, manufacturer website configuration 541B, franchise group website configuration 543B, and/or franchise website configuration 54B5 may be received by the CAP website 532B to configure the CAP website 532B in one or more of its operational modes (e.g., national, local, and so on). Although in FIG. 5B the configuration data 531, 541, 543, and 545 is depicted separately, the configuration data could be comprised as a single CAP configuration (not shown), which may be adapted by the website configuration module 516 according to the operational mode of the CAP website 532B.

Similarly, as discussed above, although FIGS. 5A and 5B depict the websites (e.g., CAP website 532A and 532B and so on) as separate from the website configuration module 516 and data storage module 520, one of skill in the art would recognize that the websites, configuration module 516 and/or data storage 520 could be implemented on a common computing platform and/or within a common co-location hosting facility. Accordingly, this disclosure should not be read as limited to any particular network and/or implementation topology.

Figure 5C:
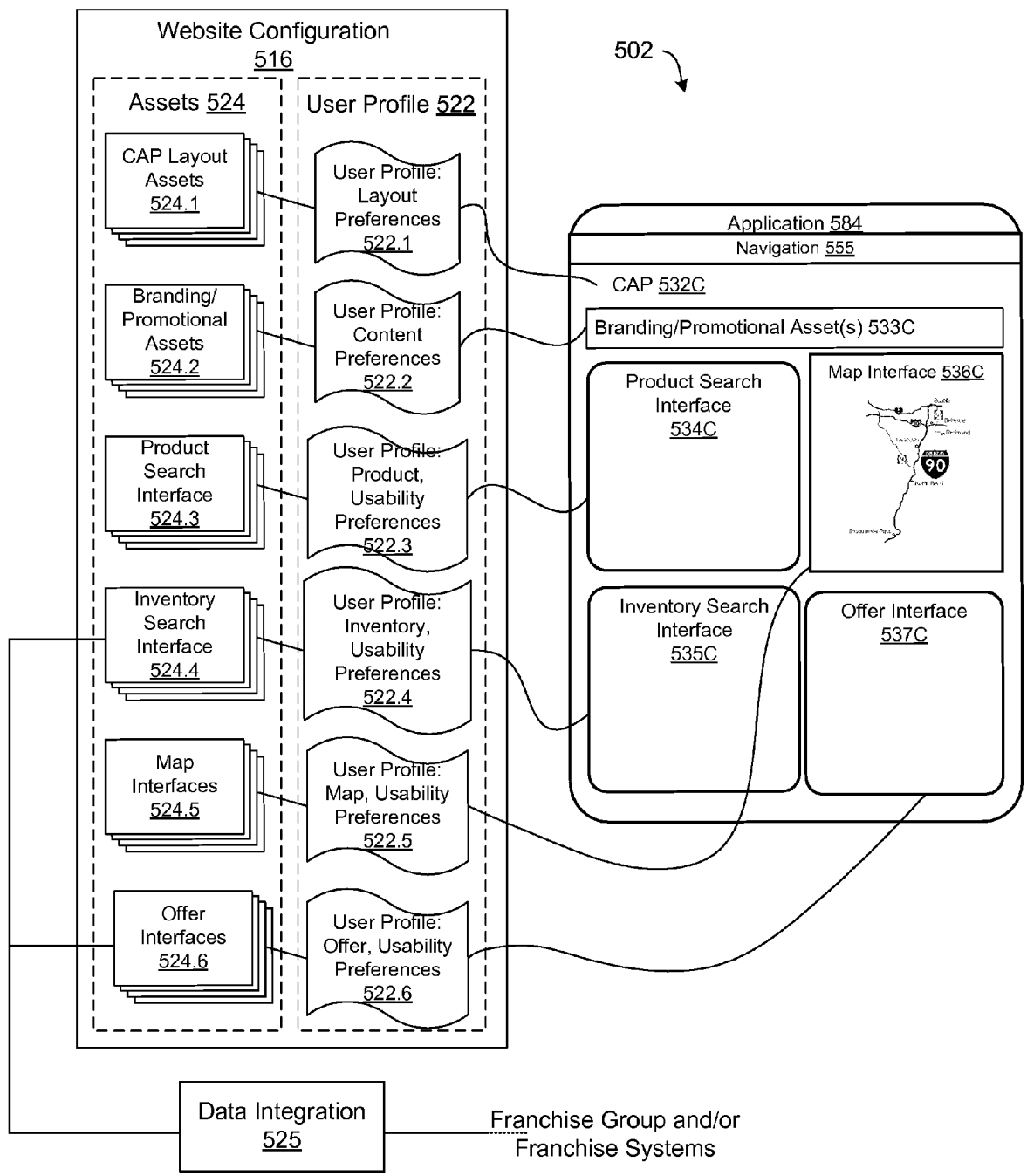
FIG. 5C is a data flow block diagram of one embodiment of a website interface customized using a website configuration module.

FIG. 5C is data flow block diagram of one embodiment of a website interface 502 customized using a website configuration module (e.g., website configuration module 516 of FIGS. 5A and 5B). A website 532C (such as the CAP website 532B.2 depicted in FIG. 5B) may be displayed by an application 584, which may comprise web browser software, such as Microsoft Internet Explorer®, Mozilla Firefox®, Apple Safari®, or the like. The web browser application 584 may comprise a navigation component 555 to allow a user of the application 584 to navigate within various websites and/or services available on a network, such as the Internet (not shown) or another communications network.

The CAP website 532C may be configured by a website configuration module 516. The website configuration module 516 may have access to an asset library 524, which may include, but is not limited to: layout assets 524.1, branding and promotional assets 524.2, product search interface assets 524.3, inventory search assets 524.4, map assets 524.5, offer assets 524.6, and the like.

In addition, the website configuration module 516 may have access to a user profile 522 of a user accessing the CAP website 532C. The user profile 522 may include, but is not limited to: web interface layout usability preferences 522.1; content preferences 522.2; product search interface preferences 522.3; inventory interface preferences 522.4; map interface preferences 522.5; offer interface preferences 522.6; and the like. Although a particular set of user preferences 522.1-6 are described herein, one skilled in the art would recognize that any number of user profile 522 information could be used under the teachings of this disclosure. Moreover, the user preferences 522 may be adapted to according to the particular set of interfaces and/or content provided by a website.

The website configuration module 516 may determine a layout for the CAP website 532C. The assets 524 may comprise a plurality of website layout assets embodied as CSS files, fonts, graphics, and the like. The website configuration module 516 may access user profile information 522.1 relating to the user's preferences regarding layout. As discussed above, such profile information may be obtained by the user's other interactions with the CAP website 532C and/or other websites within a particular network of affiliated and/or third-party websites (e.g., websites configured to share user profile information). The website configuration module 516 may employ the layout preferences information 522.1 in the user profile 522 to select and/or customize the available CAP layout assets 524.1 accordingly and to apply the assets 524.1 to the CAP website 532C.

The website configuration module 516 may select and/or customize branding and/or promotional assets 524.2 for display on the website 532C according to user preference information 522.2. Although the branding and/or promotional assets 533C are shown as a banner on the CAP website 532C.1, one skilled in the art would recognize that the branding/promotional assets 533C could be displayed on the website CAP 532C.1 using any layout mechanism known in the art.

The website 532C.1 may include one or more interfaces (e.g., interfaces 532.2-6) adapted to provide information relating to a particular manufacturer's products and/or services. The interfaces provided on the website 532C.1 may be adapted according to the use of the website 532C.1. For example, the CAP website 532C.1 may be adapted to provide information about sellers (e.g., dealers) of vehicles provided by a particular manufacturer. In this embodiment, a product search interface 534C may be provided to allow users to search and/or customize vehicles available from the manufacturer. The interface 534C may be selected from one or more available product search interfaces 524.3. As discussed above, a user profile 522 may indicate that a user prefers certain interface types, such as HTML FORMs Flash® interfaces, or the like. The particular product search interface 534C displayed on the CAP website 532C may be selected according to the user preference provided in the user profile 522.3. In addition, the interface may be pre-populated according to the product preferences 522.3 of the user, which may indicate the user's preferred vehicle type, vehicle options, and the like.

Where the CAP website 532C is used to provide information relating to one or more franchisees, such as vehicle dealers of an automobile manufacturer, the CAP website 532C.1 may comprise an inventory search interface 535C. The inventory search interface 535C may provide access to actual inventory of one or more of the franchise groups and/or franchises. As described above, the particular interface provided on the CAP website 532C.1 may be selected and/or pre-populated according to the user preferences 522.4.

In addition, the inventory search interface 535C may comprise inventory data from the franchise groups and/or franchises to be searched. This data may be obtained by the website configuration module 516 and/or may be obtained by the CAP website 532C.1. In some embodiments, a data integration module 525 may be used to access the inventory systems (not shown), of the manufacturer, relevant franchise groups and/or franchises. In this way, the inventory search interface 535C may provide up-to-date inventory information.

A map interface 536C may be provided, which, as discussed above, may be customized according to user preferences 522.5. If the user profile 522 indicates a location of the user, the map interface 536C may be so initialized.

An offer interface 537C may provide one or more offers relating to the manufacturer's products. The offer interface 537C may be selected and/or customized according to user preferences. User-demographic and/or other user profile information 522.6 may be used to determine eligibility for one or more promotions.

In addition, the offer interface 537C may comprise offers from one or more franchise groups of franchises. In some embodiments, the offer data displayed in the offer interface 537C may be obtained by the website configuration module 516 and/or the CAP website 532C via the data integration module 525, which may be communicatively coupled to the systems of the franchise groups and/or franchises (not shown).

Figure 6:
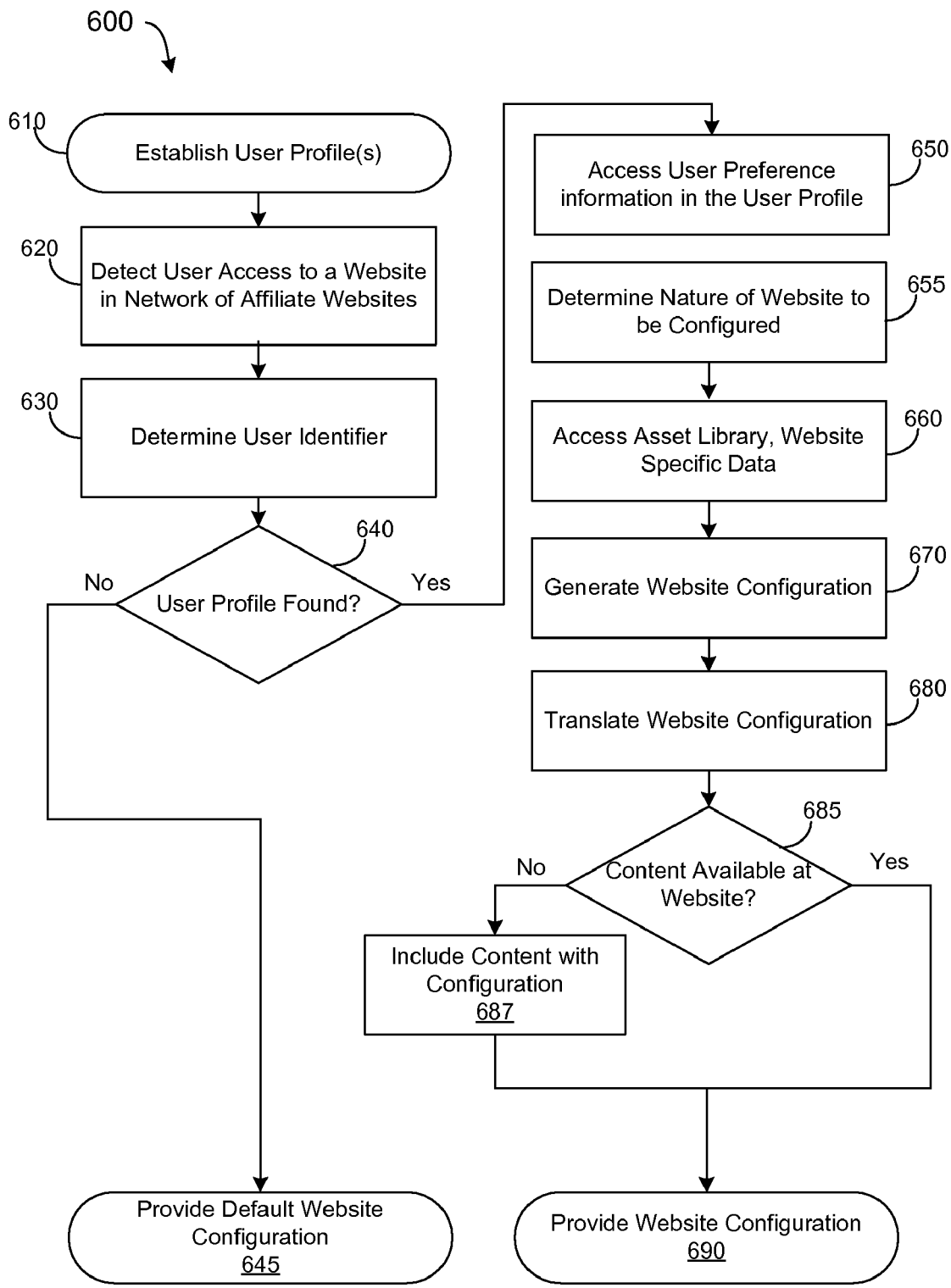
FIG. 6 is a flow diagram of one embodiment of a method for configuring a website using one or more user profiles.

FIG. 6 is a flow diagram of one embodiment of a method 600 for configuring a website using user profile information. As discussed above, one or more affiliated websites may be affiliated according to a business relationship, such as the business hierarchy depicted in FIG. 1. In other embodiments, the affiliated websites may be provided by one or more context aware websites, such as the context aware websites 230, 330, and/or 530 discussed above.

At step 610, one or more user profiles of users visiting one or more of the websites in the network of affiliated websites may be generated. The user profiles may be generated substantially as described above in conjunction with FIG. 4 (e.g., by aggregating the interaction data records obtained at one or more affiliate websites, correlating the interaction data with particular users, processing the interaction data into a user profile, and storing the resulting user profiles). However, any user profile generation means known in the art could be used at step 610.

At step 620, method 600 may attempt to access one of the websites in the network of affiliated websites (e.g., a website configured by the method 600). For example, as described above, this may comprise accessing any of the manufacturer website, franchise group website, franchise website, and/or CAP website. The detection of step 620 may be direct; the method 600 may run on the website itself, on a forward proxy of the website, and/or on a portal communicatively coupled to the website. As such, the method 600 may detect such access by monitoring incoming HTTP requests to the website. Alternatively, the method 600 may be communicatively coupled to the website (e.g., via HTTP, a back channel communication link, or the like). In this case, the website may inform the method 600 of the user's access at step 620 via a backchannel communication and/or HTTP redirect.

At step 630, a user identifier of the user accessing the website may be obtained. Method 600 may use any means known in the art to identify and/or track users on the Internet including, but not limited to: a cookie, a session key, a username and password, a PIN, a digital certificate, or the like.

At step 640, a user profile having the identifier obtained at step 630 may be loaded. If a user profile is found, the flow may continue to step 650; otherwise, the flow may terminate at step 645 where a default website configuration may be provided.

At step 650, the user profile may be accessed to determine one or more user preferences in the user profile. The user preferences accessed at step 650 may include, but are not limited to: user behavioral and/or usability preferences of the user; content preferences of the user; product preferences of the user; user locale; user "ripeness" (e.g., readiness to make a purchase); and the like.

At step 655, the nature of the website to be configured may be determined. As discussed above, the nature of the website requested by the user may affect the content displayed thereon. The nature of the website may relate to whether the website is published by a manufacturer, franchise group, and/or individual franchise. Alternatively, or in addition, where the website is capable of operating in various operational modes according to a geographic granularity and/or business relationship within a particular business hierarchy, the particular operational mode of the website may be may be assessed at step 655 (e.g., national mode, regional mode, group mode, local mode, and/or hyper-local mode).

The nature of the website and/or the operational mode of the website may be used to configure the content and/or components displayed thereon. For example, if the website is directed to an individual franchise (or is a website configured to operate in hyper-local mode), the method 600 may obtain real-time product inventory and/or availability from the franchise for possible inclusion of such information on the configured website. In addition, the content selected for inclusion in the website, such as promotions, offers, and the like, may be selected according to the particular franchise (e.g., offers, promotions, and the like available from the particular franchise).

The determining of step 655 may be performed in various ways. As described above, method 600 may be implemented as a component of the website and/or on a forward proxy or other module communicatively coupled to the website. In this case, the nature of the website may be hard-coded into the method 600 and/or may be provided in a lookup table. Alternatively, or in addition, the website may identify its type and/or operational mode when issuing configuration requests to the method 600. Alternatively or in addition, the operational mode of a website capable of operating in various operational modes, such as the CAP website described above, may be determined by the method 600 at step 655 in accordance with the contents of the user profile and/or the nature of the user request.

At step 660, method 600 may access an asset library and/or asset index. The asset library may comprise layout, theme, graphical, video, text, and other content available for use on the website identified at step 655. In some embodiments, the assets may be managed as an index (e.g., the assets may not be directly available to the method 600, but a description and/or index of the assets may be available). The assets may be stored on the website and/or may be stored remotely by the website (e.g., managed by a web content management service). If stored remotely (e.g., on a website content management service or the like), the content may be downloadable by the website (in configuration data produced at step 670). In addition, the content may comprise real-time inventory and/ or offer information from the manufacturer, franchise group, and/or franchise associated with the website.

At step 670, a website configuration may be generated based on the assets obtained at step 660 and the user preferences accessed at step 650. As discussed above, generating the website configuration may comprise applying global branding and/or promotional content to the website; selecting content to display on the website; and/or selecting and/or adapting content based on the "ripeness" of the user.

At step 680, the website configuration may be translated according to the implementation technology of the website. As discussed above, websites may be developed using any number of different implementation technologies (e.g., ASP, JSP, PHP, and so on). At step 680, the configuration may be adapted according to the implementation technology of the particular website to be configured.

At step 685, the method 600 may determine whether the content configured at step 670-680 is available at the website. If the content is not yet available on the website (e.g., method 600 and/or the content access at step 660 are implemented as separate services), the flow may continue to step 687 where the content may be included in the website configuration and/or transmitted to the website; otherwise, the flow may continue to step 690.

At step 690, the configuration may be transmitted to the website. As discussed above, in some embodiments, method 600 may run in conjunction with the website to be configured. In such embodiments, the configuration may be applied to the user's session on the website. In other embodiments, the website may dynamically receive the configuration and apply it as it is received. Alternatively, or in addition, the configuration information may direct the website to obtain the content from a web content management service. When the website obtains the assets, the website may cache the user configuration to speed up subsequent accesses by the user. In addition, as discussed above, the transmission at step 690 may comprise transmitting content accessed at step 660 to the website and/or instructing the website to obtain the assets and/or instruct the website to obtain the assets (e.g., via a back channel or other direct communication means). The website may cache the content so that it need not be re-transmitted for subsequent requests.

Referring back to FIG. 1, as discussed above, marketing and/or selling products in a business hierarchy model via the Internet poses unique challenges. For instances, many of the franchise groups 120 and/or franchises 130 may be competitors (e.g., compete with one another for sales of the products and/or services offered by the manufacturer 110). The systems and methods for user profile aggregation and/or website customization may be used to allow the franchise groups 120 and franchises 130 to share and aggregate user profile information and to apply common branding and promotional themes to their respective websites.

In addition, a CAP (Context Aware Platform) website may be provided to simplify search engine interaction, aggregate content from the websites published by the franchise groups 120 and/or franchises 130, and/or present a customizable portal to the customers of the manufacturer 110, franchise groups 120, and/or franchise 130.

In addition, as described above, a particular business hierarchy may be segmented according to a geographical granularity associated with the organization (e.g., regional, local, and the like). Similarly, the franchise group may be segmented according to business relationships within the hierarchy (e.g., manufacturer, franchise groups, etc.). The CAP website 332B may be configured to operate in one of a plurality of modes. The modes may be selected according to the geographical and/or business relationship segments discussed above.

Figure 7:
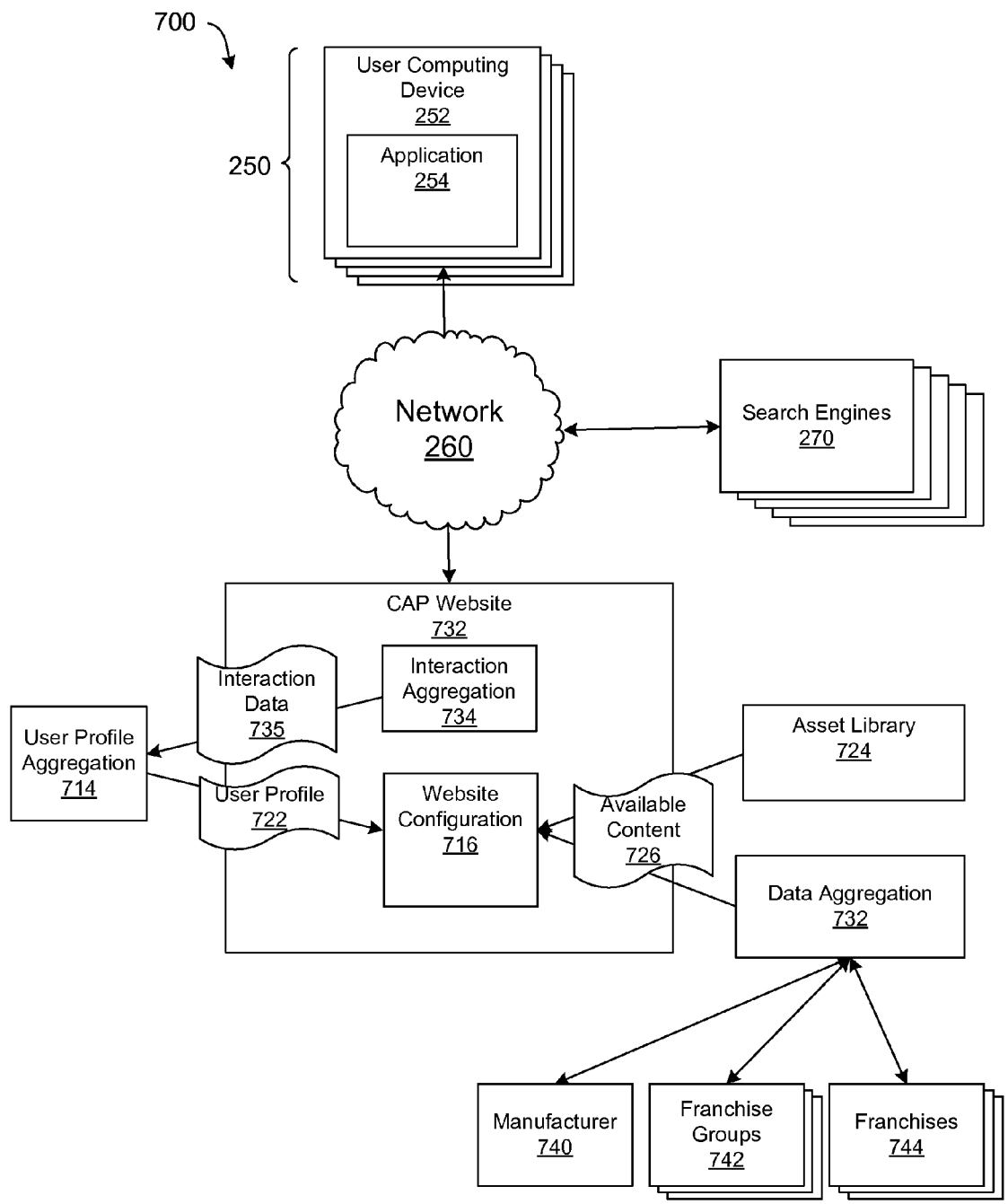
FIG. 7 is a block diagram of one embodiment of a system for providing a context aware platform (CAP) website.

FIG. 7 is a block diagram of one embodiment of system 700 comprising a CAP website 732. The website 732 may comprise one or more server computers (not shown), comprising and/or communicatively coupled to a processor, memory, data storage media, one or more input/output devices (e.g., keyboard, mouse, etc.), one or more communications interfaces, and the like. The CAP website 732 may be embodied as instructions stored on a computer readable storage media (not shown), such as a hard disc, memory, or the like.

As discussed above in conjunction with FIGS. 2A and 2B, one or more users 250 may be communicatively coupled to the network 260 via respective computing devices 252, which may comprise any computing device known in the art including, but not limited to: a personal computer, a portable computer, a smart phone, a PDA, or the like. The computing devices 252 may comprise a respective application 254 capable of displaying content received from web services, such as HTTP content and the like.

The users 250 may be communicatively coupled to a CAP website 732, which may be configured to provide marketing and/or sales front services for a manufacturer 740, one or more franchise groups 742 of the manufacturer 740, and/or one or more franchises 744. Although not shown in FIG. 7, the CAP website 732 may be implemented on one or more server computers (not shown) having respective communications interfaces (not shown). In some embodiments, the CAP website 732 may be provided as an application running on a webserver (not shown), such as Microsoft IIS®, Apache®, or the like. Moreover, the CAP website 732 may be implemented using any web implementation technology known in the art including ASP, JSP, Java Servlets, Enterprise Javabeans, AJAX, or the like.

The CAP website 732 may comprise an interaction aggregation module 734 to aggregate user interaction data 735 corresponding to user 250 activity on various websites. As described above, the interaction data collected by the interaction aggregation module 734 may relate to any user activity on the CAP website 732 including, but not limited to: content accessed by users 250; information inputted into the CAP website 732 by users 250; website components accessed and utilized by users 250; and the like.

The interaction aggregation module 734 may be configured to track the users 250 activity on multiple visits and/or activities on the CAP website 732. This tracking may be done by placing a cookie on a browser of the user (e.g., application 254); monitoring a session of the users 250; a login or other user-provided identifier; IP addressing; MAC addressing; hardware identifiers; or the like. The interaction aggregation module 734 may include the identifying information in the interaction data records 735 to allow user activities to be correlated with one another. For example, some or all of user A's activities on the CAP website 732 may be correlated with one another, even if the activities were to occur across multiple sessions and over time.

The interaction aggregation module 734 may transmit the interaction data records 735 to a user profile aggregation module 714, which may use the interaction data records 735 to establish one or more user profiles substantially as described above. Although FIG. 7 shows the user profile aggregation module 714 as a separate component outside of the CAP website 732, one skilled in the art would recognize that the user profile aggregation module 714 could be implemented as a component (e.g., application) on or in association with the CAP website 732. The transmission of the interaction data records 735 may be instantaneous (e.g., transmitted as the user interaction occurs). This may allow the CAP profile aggregation interaction aggregation module 734 and/or user profile aggregation module 714 to quickly update user profile information 722. Alternatively, or in addition, some user interaction data 735 may be batched for periodic upload to the interaction aggregation module 734. Operation in this mode may reduce the network bandwidth requirements of the system 700.

As a user 250 accesses the CAP website 732, the CAP website 732 may invoke a website configuration module 716. As described above, the website configuration module 716 may be used to configure the CAP website 732 for the particular user 250 accessing the website 732. Where at least some interaction data 735 is transmitted to the interaction aggregation module 734 instantaneously (e.g. in "real-time"), the configuration module 716 may be configured to customize the CAP website 732 as the user interacts with the CAP website 732.

The website configuration module 716 may access a user identifier (discussed above) associated with the incoming request. This identifier may be transmitted to the user profile aggregation module 714, which may determine whether a user profile is associated with the provided identifier. If a user profile exists, the user profile 722 may be returned to the website configuration module 716, which may use the user profile 722 to configure the CAP website 732. If no user profile exists, the website configuration module 716 may be configured to provide a "default" website configuration to the user. In some cases, incoming user requests may include user preference information. For example, users 250 may access the CAP website 732 via a search engine 270 or other third-party website (not shown). Such inbound links may be generated by user-entered searched, sponsored links, banner advertising, or the like. The inbound links may comprise user preference information, such as the search terms used at the search engine 270, the nature of the banner advertising (not shown), or the like. The website configuration module 716 may leverage this information to determine an appropriate configuration for the CAP website 732 (e.g., an operational mode for the website 732) even in the absence of a user profile 722.

In order to configure the CAP website 732, the website configuration module 716 may determine an operational mode of the CAP website 732. As discussed above, the CAP website 732 may be configurable to operate in one of a plurality of operational modes, each of which may be associated with a geographic granularity of a business hierarchy and/or business relationship within the hierarchy. As such, the operational modes, may include, but are not limited to: a national operational mode, a regional operational mode, a group operational mode, a local operational mode, and a hyper-local operational mode. Each of the operational modes may provide information relevant to one or more of the manufacturer 740, franchise groups 742, and/or franchises 744. The operation of the CAP website 732 in each of these modes is discussed in detail below.

One embodiment of a method for determining an operational mode of the CAP website 732 is described below in conjunction with FIG. 8. As will be described below, the determination may be based on parameters provided in the request (e.g., URL parameters, search engine terms, or the like), and/or may be based on the user profile 722.

The website configuration module 716 may also access asset library 724, which may comprise a library and/or index of assets (e.g., web displayable content) available for display on the CAP website 732. The particular assets displayed on the CAP website 732 may be determined by the operational mode of the website and/or the user profile 722.

In addition, the website configuration module 716 may access a data aggregation module 732, which may be communicatively coupled to one or more systems of the manufacturer 740, one or more franchise groups 742, and/or one or more franchises 744 to obtain information therefrom (e.g., offers, promotions, inventory, and the like).

The website configuration module 716 may select from assets 726 available from the asset library 724 and the data aggregation module 732 to develop a website configuration. In some embodiments, the website configuration module 716 may be configured to filter the available content 726 according to the operational mode of the CAP website 732 and/or the user profile 722. For example, if website configuration module 716 determines the CAP website 732 is to operate in "local mode" and the user profile 722 indicates the user is interested in a particular product (e.g., hybrid vehicles), the website configuration module 716 may select branding and promotional assets from the asset library 724 related to hybrid vehicle offerings from the manufacturer 740 and may also display hybrid vehicle inventory available within a particular locale. Accordingly, the website configuration produced by the website configuration module 716 may be determined by the user profile 722 information of the particular user 250 accessing the CAP website 732, URL parameters or other information provided in the user request, and/or the assets and real-time information provided by the data aggregation module 732.

Figure 8:
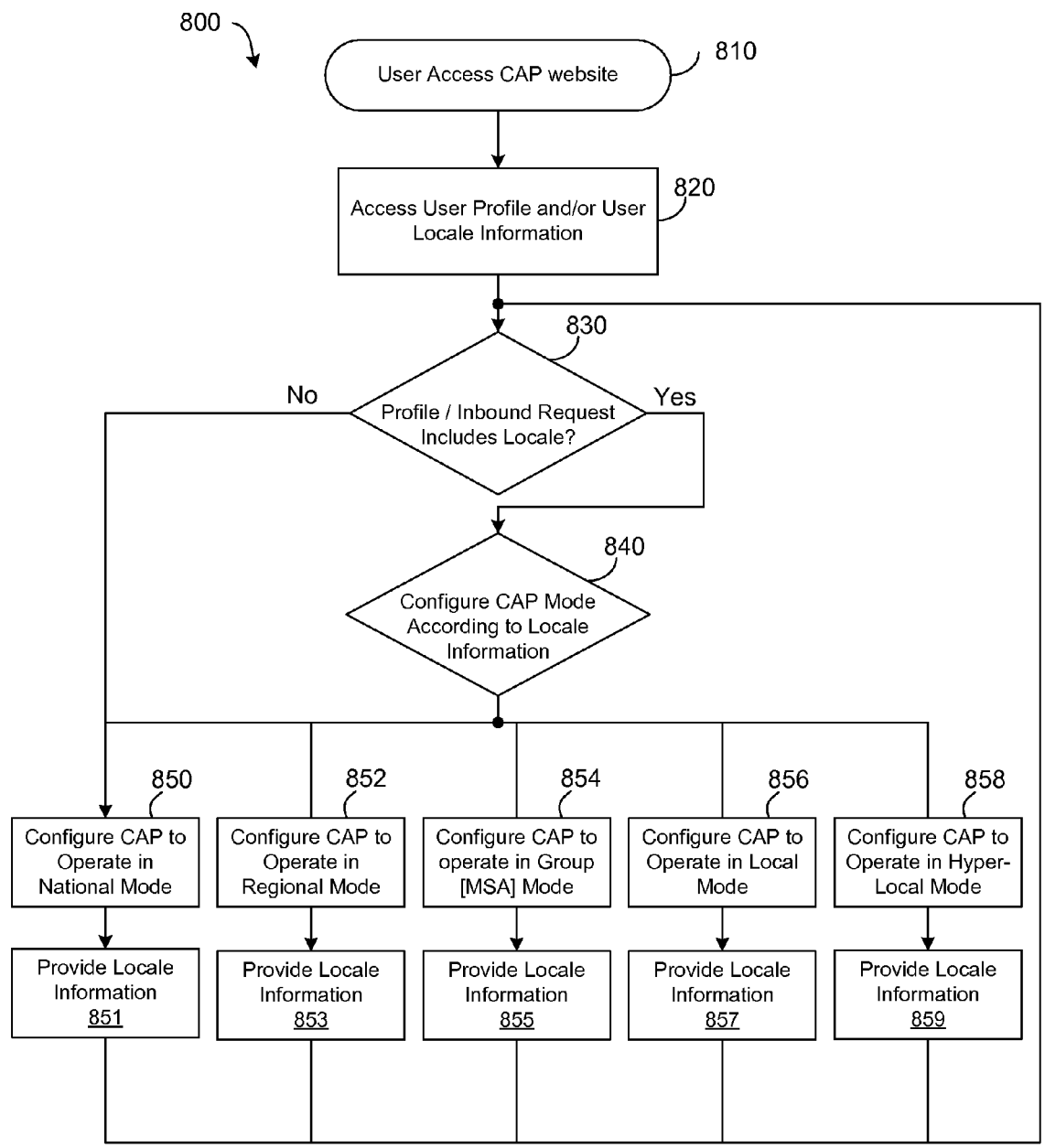
FIG. 8 is a flow diagram of a process for selecting an operational mode of a CAP website.

FIG. 8 is a flow diagram of one embodiment of a process 800 for selecting an operational mode of a CAP website (e.g., website 232 of FIG. 2). At step 810, a user may access the CAP website or one of the websites in a network of affiliated websites (e.g., websites 240A, 242A, and/or 244A of FIG. 2A). The access may be via an inbound HTTP link comprising an HTTP request or the like (e.g., from a search engine, banner advertisement, third-party site, blog, online marketing campaign, email, or the like).

At step 820, a user profile or other user session data associated with the user may be obtained. As discussed above, this may comprise obtaining a user identifier associated with the request (e.g., a cookie or the like), and/or may comprise reading information from the HTTP request itself (e.g., a URL parameter, header, or the like). In addition, locale information may be provided via a third-party referring site, such as a search engine. For example, the user may search for products and/or services in a particular locale (e.g., "Seattle Cadillac"). This may cause the CAP website to be displayed as a search result and/or as a sponsored link. The terms used to generate the link (e.g., "Seattle Cadillac") may be obtained at step 820.

At step 830, the user profile or other information related to the inbound request may be processed to determine whether a locale of the user may be determined. If the locale cannot be determined, the flow may continue to step 850, where the CAP website may be configured to operate in a "national" mode. If a locale can be determined, the flow may continue to step 840.

At step 840, the CAP of the locale information may be determined and used to select between a plurality of operational modes. As discussed above, each of the plurality of operational modes may correspond to a geographical granularity of a business hierarchy and/or business relationships with the hierarchy. In the FIG. 8 embodiment, the operational modes may comprise a national mode (a mode covering large or entire market area of a manufacturer franchise network), a regional mode (a mode covering particular regions within the manufacturer's franchise network), local mode (a local area of franchises), group mode (a mode covering business relationships within the franchise network), and/or hyper-local mode (a mode covering a particular franchise). If the locale information is extremely broad (e.g., United States), the flow may continue to step 850, where the CAP website may be configured to operate in national mode.

Where the locale information is more detailed, specifying, for example, a particular region and/or state, the flow may continue to step 852, where the CAP website may be configured to operate in regional mode.

If the user profile and/or locale information indicates a particular area and, in addition, specifies a particular franchise group in that area, the flow may continue to step 854 where the CAP website may be configured to operate in group mode [MSA].

If the locale information is more detailed (e.g., of a particular state or metropolitan area), the flow may continue to step 856, where the CAP website may be configured to operate in local mode.

If the user profile and/or locale indicates a particular franchise, or is in an area where only a single franchise exists, the flow may continue to step 858 where the CAP website may be configured to operate in hyper-local mode.

At step 850, the CAP website may be configured to operate in national mode. In national mode, the CAP website may be configured to display information relating to the manufacturer's products and/or services. The information may be applicable to all of the manufacturer's market areas or a particular large market area (e.g., available at all of the manufacturer's franchises in a particular country or continent). One embodiment of a CAP interface in national mode is provided in FIG. 9A.

In national mode, the CAP website may provide an input wherein a user may provide additional location information. The location information may be in the form of a zip code, country and/or state name, or the like. At step 851, a user may provide locale information via an input provided on the CAP website. Upon receipt of this information, the flow may return to step 850, where the CAP may be reconfigured to operate in another mode according to the locale information provided. Although not shown in FIG. 8, the user locale input may be stored in a user profile associated with the user (e.g., as described above in conjunction with FIGS. 3-4), such that for future accesses, the CAP may be appropriately configured.

At step 852, the CAP website may be configured to operate in regional mode. In regional mode, the CAP website may display information relating to the manufacturer's products and/or services available in a particular region (e.g., the CAP website may also be configured to display promotional material and/or offers relevant to the particular region identified at step 840). In addition, the CAP may provide a map or other input interface displaying franchise groups and/or individual franchises within the region. One embodiment of a CAP interface in regional mode is provided in FIG. 9B.

As discussed above, the regional mode CAP website may provide information specific to a particular region. In one embodiment, this may include, but is not limited to: a product search interface, an inventory search interface, and/or an offer interface. Examples of such interfaces are described below in conjunction with FIG. 9A-E. The interfaces comprise information aggregated from the franchise groups and/or franchises within the region and may link to particular franchise groups and/or franchises. For example, an inventory search interface may be used to select product inventory available at a particular franchise. Similarly, an offer interface may display offers that are available to customers in the region and/or from a particular franchise group. Accordingly, the CAP website may be communicatively coupled to the franchise groups and/or franchises so as to be able to make the inventory and/or promotional information of the respective franchise groups and/or franchises available through the CAP web interface.

At step 853, a user may select one of the interfaces linked to a particular franchise group, franchise and/or may indicate he/she wishes to "zoom out." This may cause the flow to continue to step 840, where the CAP website may be configured to operate in a different mode (e.g., in national mode, group mode and/or hyper-local mode).

At step 854, the CAP website may be configured to operate in group [MSA] mode. In group mode, the CAP website may display information relating to the manufacturer's products. The CAP may also be configured to display interfaces providing access to products, inventory, and/or offers available from the franchises of the particular franchise groups. Accordingly, as discussed above, the CAP website may be communicatively coupled to the franchise groups so as to be able to make the franchise group inventory and/or promotional information available via the CAP website. One embodiment of a CAP web interface in group mode is provided below in conjunction with FIG. 9C.

At step 855, a user may select one of the interfaces linked to a particular franchise in the franchise group (e.g., a link to a particular franchise, inventory available through a particular franchise, or the like). This may cause the flow to continue to step 840, where the CAP website may be configured to operate in a different mode (e.g., in national, regional, group, and/or hyper-local mode).

At step 856, the CAP website may be configured to operate in local mode. In local mode, the CAP website may display information related to franchise groups and/or franchises in a particular location. This may comprise any content relevant to the products and/or services offered by the entities within the particular locale, such as financing, offers, inventory, and the like. One embodiment of a CAP web interface configured to operate in local mode is provided in FIG. 9D.

At step 857, the user may indicate he/she wishes to investigate a particular franchise and/or franchise group in the locale. Alternatively, the user may indicate he/she wishes to "zoom out" the mode to national or regional mode. This may cause the flow to return to step 840 where the CAP website may be configured to operate in a different mode.

At step 858, the CAP website may be configured to operate in hyper-local mode. In hyper-local mode, the CAP website may display information specific to a particular franchise. This may comprise any content relevant to the products and/or services offered through the franchise, such as financing offers, service offers, inventory, franchise specific promotional material, and the like. One embodiment of a CAP web interface configured to operate in hyper-local mode is provided in FIG. 9E.

Figure 9A:
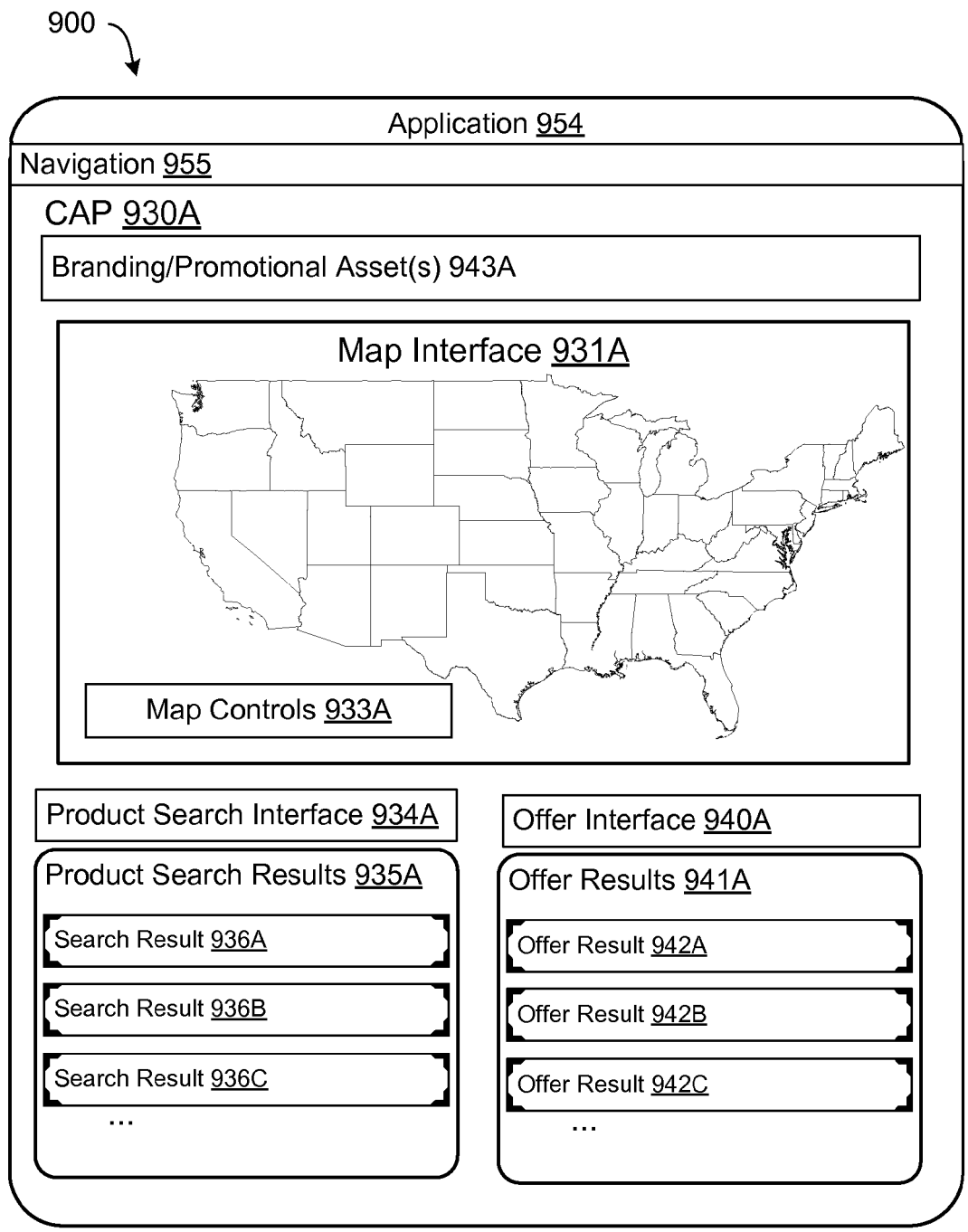
FIG. 9A depicts one embodiment of a CAP web interface configured to operate in an operational mode corresponding to a national geographic granularity of a business hierarchy.

FIG. 9A depicts one embodiment 900 of a local CAP web interface 930A configured to operate in an operational mode corresponding to a national geographic granularity of a business hierarchy. Accordingly, CAP interface 930A may be generated at step 850 of FIG. 8.

The CAP interface 930A may be displayed in an application 954, which may comprise web browser software, such as Microsoft Internet Explorer®, Mozilla Firefox®, Apple Safari®, or the like. The web browser application 954 may comprise a navigation component 955 to allow a user of the application 954 to navigate within various websites and/or services available on a network, such as the Internet (not shown) or other communications network.

The CAP interface 930A may comprise (e.g., display) branding/promotional assets 943A. Although the branding/promotional assets 943A are depicted as a "header" on the CAP interface 930A, one skilled in the art that any layout known in the art could be used. As discussed above, the branding/promotional assets 943A presented on the CAP interface 930A may be dynamically selected according to a user profile (not shown) by a website configuration module (not shown).

The CAP interface 930A may comprise a map interface 931A. The map interface 931A may comprise map controls 933A to allow a user of the interface 931A to select an area displayed therein. The area displayed in the map interface 931A may correspond to the particular market region served by the manufacturer (e.g., the continental United States, North America, or the like). In some embodiments, the map interface 931A may be selectable (e.g., elements on the interface, such as states or the like). In this case, a user may select a particular location and/or region within the map interface 931A to refine his/her location. This may cause the CAP interface 930A to be reconfigured to operate in regional, local, or hyper-local mode, as described above in conjunction with step 840 of FIG. 8.

The area displayed in the map interface 931A may be dynamically configured by a website configuration module (not shown) according to a user profile (not shown). Alternatively, or in addition, where the initial area displayed in the map may be determined by search parameters (assuming the user accessed the CAP interface 930A via a search engine) and/or the user's locale as determined by his/her IP address or other local-specific data (e.g., coordinate and/or address data communicated directly to the CAP interface 930A as, for example, a URL parameter or the like).

A product search interface 934A may be provided on the CAP interface 930A. The product search interface 934A may provide search capabilities to allow users to search for products and/or services offered by a manufacturer. The product search interface 934A may comprise controls (not show) to allow a user to search for a particular product and/or service type. As discussed above, a website configuration module (not shown) may pre-populate the product search interface 934A with user preferences according to a user profile. For example, if a user had indicated a preference for a particular vehicle type (e.g., hybrid vehicle), having a particular passenger carrying capacity, the product search interface 934A may be pre-populated accordingly. In addition, a website configuration module (not shown) may be used to select an appropriate interface type 934A (e.g., Flash®, form-based, AJAX, or the like) for the user according the user usability/behavior preferences in the user profile.

The CAP interface 930A may comprise an offer interface 940A, which may provide access to offers or other promotions available from the manufacturer, such as financing offers, rebate offers, and the like. Such offers may be displayed and/or searched in the offer interface 940A. The offer interface 940A may include an address, region, zip code, or other input (not shown) to allow a user to search for offers available in a particular region and/or location. Responsive to providing such location information, the CAP interface 930A may be reconfigured to operate in regional, local, or hyper-local mode, as described above in conjunction with FIG. 8.

In addition, a manufacturer may provide for offers specific to a particular customer type, such as college graduates, military personnel, or the like. The offer interface 940A may be used to search for such offers. If user profile information is available, a website configuration module (not shown) may be used to pre-populate the offer interface 940A with user demographic or other information. In addition, the website configuration module (not shown) may be used to select a version of the offer interface 940A according to the usability/behavioral preferences in the user's profile (not shown).

As discussed above, the nature (e.g., implementation technology, look-and-feel, and the like) of CAP interface 930A, including the map interface 931A, product search interface 934A, and/or offer interface 940A may be determined by a website configuration module (not shown). As such, although FIG. 9A depicts a particular layout for the CAP interface 930A, the interface 930A could be provided using any layout and/or web components known in the art.

Figure 9B:
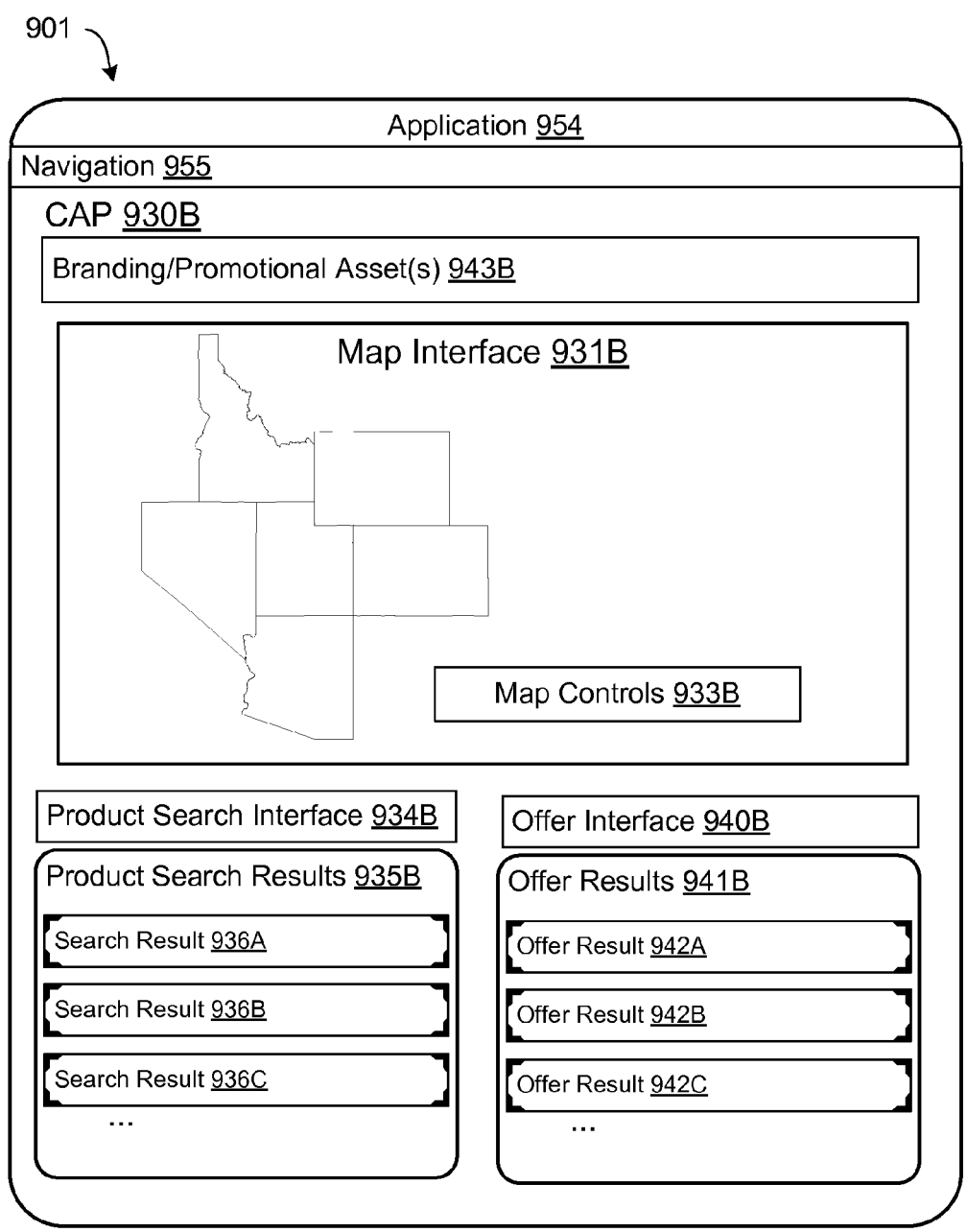
FIG. 9B depicts one embodiment of a CAP web interface configured to operate in an operational mode corresponding to a regional geographic granularity of a business hierarchy.

FIG. 9B is an illustration of one embodiment of a CAP web interface 930B configured to operate in an operational mode corresponding to a regional geographical granularity of a business hierarchy. Accordingly, CAP interface 930B may be generated at step 852 of FIG. 8.

As described above, the CAP interface 930B may be displayed in an application 954, which may comprise web browser software, such as Microsoft Internet Explorer®, Mozilla Firefox®, or the like. The CAP interface 930B may comprise (e.g., display) branding/promotional assets 943B, which may be configured according to a user profile of the user of the CAP interface 930B.

The CAP interface 930B may comprise a map interface 931B, which may comprise map controls 933B. The area displayed in the map interface 931B may correspond to the particular region selected by the user (e.g., the intermountain west). In some embodiments, the map interface 931B may be selectable (e.g., elements on the interface, such as states or the like may be selected by the user). In this case, a user may select a particular location within the map interface 931B to refine his/her location. This may cause the CAP interface 930B to be reconfigured to operate in local and/or hyper-local mode as described above in conjunction with step 840 of FIG. 8.

The area displayed in the map interface 931B may be dynamically configured by a website configuration module (not shown) according to a user profile (not shown). Alternatively, or in addition, where the initial area displayed in the map may be determined by search parameters (assuming the user accessed the CAP interface 930B via a search engine) and/or the user's locale as determined by his/her IP address or other local-specific data (e.g., coordinate and/or address data communicated directly to the CAP interface 930B as, for example, a URL parameter or the like).

A product search interface 934B may be provided on the CAP interface 930B. The product search interface 934B may provide search capabilities to allow users to search for products and/or services offered by the manufacturer that are available within the region displayed in the map interface 931B. The product search interface 934B may comprise controls (not show) to allow a user to search for a particular product and/or service type. As discussed above, a website configuration module (not shown) may pre-populate the product search interface 934B with user preferences according to a user profile. In addition, a website configuration module (not shown) may be used to select an appropriate implementation technology.

The CAP interface 930B may comprise an offer interface 940B, which may provide access to offers or other promotions available in a particular region (e.g., the region displayed in the map interface 931B. For instance, a manufacturer may provide region-specific offers in addition to standard, nationwide offers (e.g., region-specific financing offers, rebate offers, and the like). Both types of offers may be displayed and/or searched in the offer interface 940B. The offer interface 940B may also include an address, region, zip code, or other input (not shown) to allow a user to search for offers available in a particular location. Responsive to providing such location information, the CAP interface 930B may be reconfigured to operate in local and/or hyper-local mode as described in FIG. 8.

If user profile information is available, a website configuration module (not shown) may be used to pre-populate the offer interface 940B with user demographic or other information. In addition, the website configuration module (not shown) may be used to select a version of the offer interface 940B according to the usability/behavioral preferences in the user's profile (not shown).

As discussed above, the nature (e.g., implementation technology, look-and-feel, and the like) of CAP interface 930B, including the map interface 931B, product search interface 934B, and/or offer interface 940B may be determined and/or otherwise customized by a website configuration module (not shown). As such, although FIG. 9B depicts a particular layout for the CAP interface 930B, the interface 930B could be provided using any layout and/or web components known in the art.

Figure 9C:
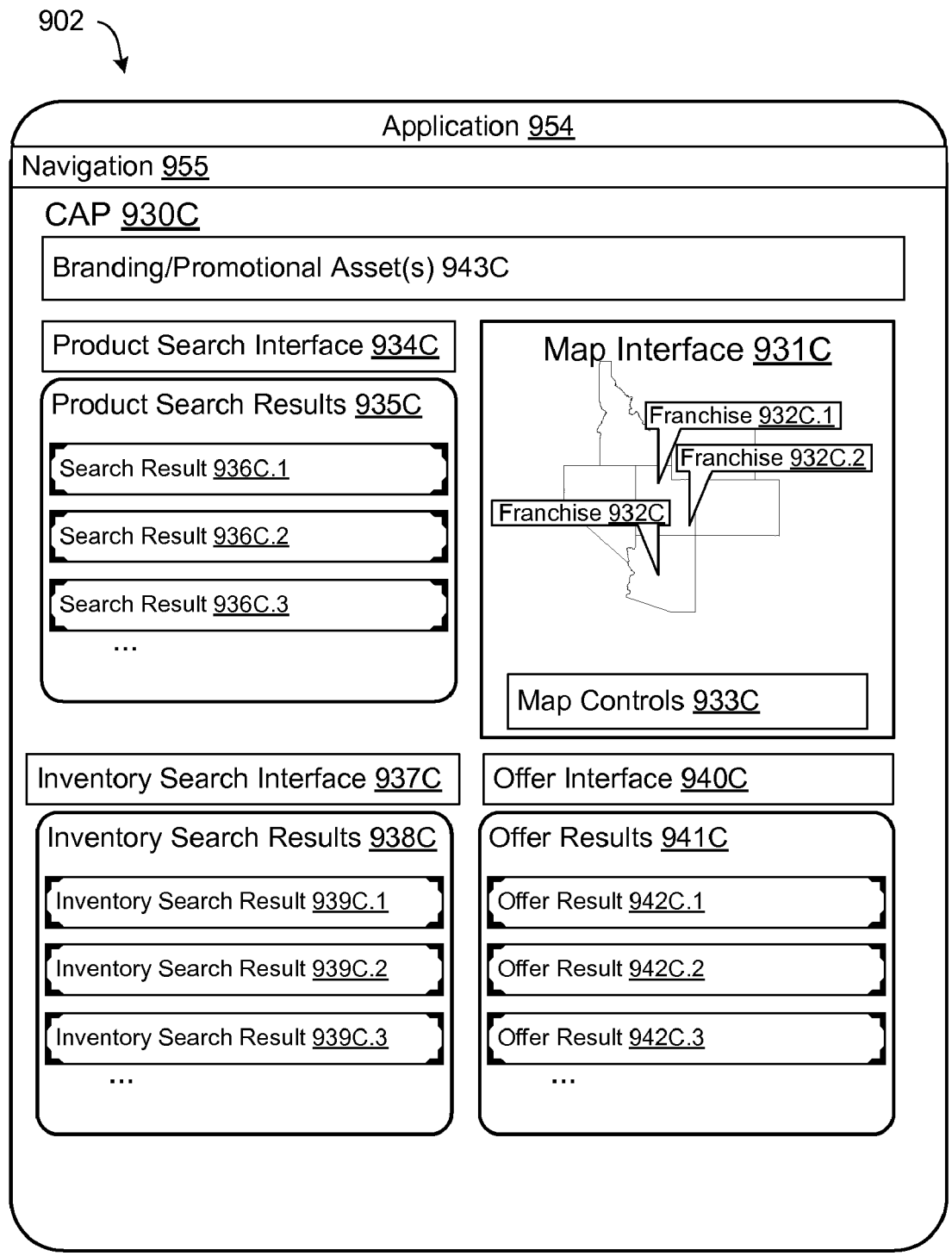
FIG. 9C depicts one embodiment of a CAP web interface configured to operate in an operational mode corresponding to a group granularity of a business hierarchy.

FIG. 9C is an illustration of one embodiment of a local CAP web interface 930C configured to operate in an operational mode corresponding to a group granularity of a business hierarchy. As such, the operational mode depicted in FIG. 9C may correspond to a group business relationship within a business hierarchy. Accordingly, the CAP interface 930C may be generated at step 854 of FIG. 8.

The CAP interface 930C may comprise (e.g., display) branding/promotional assets 943C, which may be selected according to a user profile of the particular user accessing the interface 931C. In addition, the branding/promotional assets 943C may be customized according to the particular region displayed in the group map interface 931C discussed below.

The group map interface 931C may comprise map controls 933C to allow a user of the interface to view an area covered by the particular franchise group. The controls 933C may include a zip code entry (not shown), an address entry (not shown), a zoom input (not shown) to change the scale of the group map interface 931C, or the like.

One or more franchise indicators 932C.1-3 may be displayed on the group map interface 931C. The franchise indicators 932C.1-3 may comprise a franchise within the particular franchise group. Selection of one of the indicators 932C.1-3 may direct the application 954 to a website of the particular franchise 932C.1-3 (e.g., reconfigure the CAP 930 to hyper-local mode as discussed above).

A product search interface 934C may provide search capabilities to allow users to search for products and/or services offered by a manufacturer and/or franchise group. As discussed above, the contents of the product search interface 934C may be configured according to a user profile of the user accessing the interface 930C.

The CAP interface 930C may comprise an inventory search interface 937C, which may provide search capabilities into the inventories of the franchises within the particular franchise group (e.g., the franchises 932C.1-3 displayed in the group map interface 931C). Unlike the search interface 934B described above, the inventory search interface 937 may display actual (e.g., physical) inventory available at one or more franchises (e.g., franchises 932C.1-3) in the franchise group. The inventory search interface 937C may be configured (e.g., pre-populated) by a website configuration module (not shown) according to a user profile. The inventory search results 938C may comprise one or more individual inventory search results 939C.1-3, which may comprise actual product available at a particular franchise 932C.1-3 in the franchise group. Selection of one of the inventory search results 939C.1-3 may direct the application 954 to a franchise website where the particular product and/or service is offered. Alternatively, or in addition, selection of one of the inventory search results 939C.1-3 may cause the CAP 930 interface to operate in hyper-local mode to display information relating to the particular, selected franchise. Similarly, selection of a search result 932C.1-3 may invoke other functionality, such as transmitting a message to the franchise comprising a price quote request, test drive request, or the like. The message may refer to the product search result 939D.1-3 selected by the user.

The inventory search results 938C may comprise inventory from each of the franchises in the franchise group. Accordingly, the CAP interface 930C (or some other data aggregation service) may be communicatively coupled with the inventory management systems of the franchises in the franchise group to obtain inventory information therefrom.

An offer interface 940C may allow users to search for offers or other promotions available in the franchises in the franchise group. As discussed above, one or more franchise groups and/or franchises may provide special offers specific to the respective franchise group and/or franchise. These offers may be provided via the offer interface 940C. In some embodiments, the offers available through the franchise group (e.g., the franchises displayed in the map interface 931C) may be available in the offer interface 940C.

As discussed above, a website configuration module (not shown) may pre-populate the offer interface 940C according to a user profile of the particular user accessing the CAP interface 930C. The offer interface 940C may display offers in a result interface 941C (e.g., results 942C.1-3) available through a particular franchise group. As describe above, selection of one of the offer results 942C.1-3 may cause the CAP website 930 to be reconfigured into hyper-local mode.

Figure 9D:
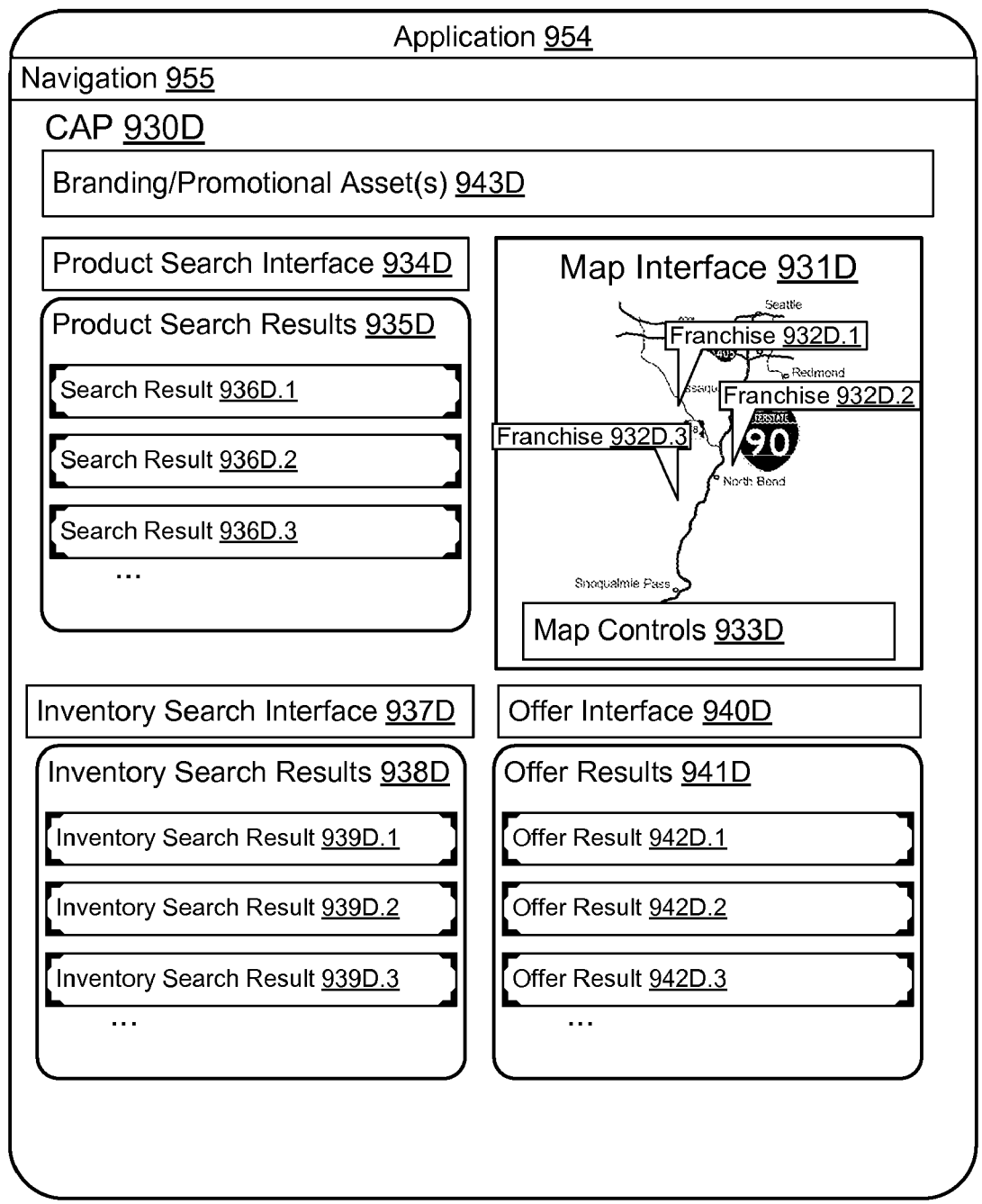
FIG. 9D depicts one embodiment of a CAP web interface configured to operate in an operational mode corresponding to a local geographic granularity of a business hierarchy.

FIG. 9D is an illustration of one embodiment of a local CAP web interface 930D configured to operate in an operational mode corresponding to a local geographic granularity of a business hierarchy. Accordingly, the CAP interface 930D may be generated at step 856 of FIG. 8.

The CAP interface 930D may comprise (e.g., display) branding/promotional assets 943D, which may be selected according to a user profile of the particular user accessing the interface 930D. In addition, the branding/promotional assets 943D may be customized according to the particular region displayed in the map interface 931D discussed below.

The map interface 931D may comprise map controls 933D to allow a user of the interface 930D to select an area displayed therein. The controls 933D may include a zip code entry (not shown), an address entry (not shown), a zoom input (not shown) to change the scale of the map interface 931D, or the like.

The area displayed in the map interface 931D may be dynamically configured by a website configuration module (not shown) according to a user profile (not shown). Alternatively, or in addition, the initial area displayed in the map may be determined by search parameters (assuming the user accessed the CAP interface 930D via a search engine) and/or the user's locale as determined by his/her IP address or other local-specific data (e.g., coordinate and/or address data communicated directly to the CAP interface 930D as, for example, a URL parameter or the like).

One or more franchise indicators 932D.1-3 falling within the map area may be displayed on the map interface 931D. The franchise indicators 932D.1-3 may correspond to particular franchise locations (e.g., franchises having a physical location, such as a storefront or service center at the respective indicator 932D.1-3). Selection of one of the indicators 932D.1-3 may direct the application 954 to a website of the particular franchise 932D.1-3 (e.g., reconfigure the CAP 930 to hyper-local mode as discussed above).

A product search interface 934D may provide search capabilities to allow users to search for products and/or services offered by a manufacturer within the local area displayed in the map interface 931D. As discussed above, the contents of the product search interface 934D may be configured according to a user profile of the user accessing the interface 930D.

The CAP interface 930D may comprise an inventory search interface 937D, which may provide for searching the inventories of one or more franchises within a particular locale (e.g., the franchises 932D.1-3 displayed in the map interface 931D). Unlike the search interface 934B described above, the inventory search interface 937 may display actual (e.g., physical) inventory available at one or more franchises (e.g., franchises 932D.1-3). The inventory search interface 937D may be configured (e.g., pre-populated) by a website configuration module (not shown) according to a user profile. The inventory search results 938D may comprise one or more individual inventory search results 939D.1-3, which may comprise actual product available at a particular franchise 932D.1-3. Selection of one of the inventory search results 939D.1-3 may direct the application 954 to a franchise website where the particular product and/or service is offered. Alternatively, or in addition, selection of one of the inventory search results 939D.1-3 may cause the CAP 930D interface to operate in hyper-local mode to display information relating to the particular, selected franchise. Similarly, selection of a search result 932D.1-3 may invoke other functionality, such as transmitting a message to the franchise, such as a price quote request, test drive request, or the like. The message may indicate the particular search result 939D.1-3 selected by the user.

The inventory search results 938D may comprise inventory from each of the franchises of the manufacturer within a particular locale. Accordingly, the CAP interface 930D (or some other data aggregation service) may be communicatively coupled with the inventory management systems of the franchises to obtain inventory information therefrom.

An offer interface 940D may allow uses to search for offers or other promotions available in a particular franchise area or region, customer type, or the like. Similarly, one or more franchise groups and/or franchises may provide special offers specific to the respective franchise group and/or franchise. These offers may be provided via the offer interface 940D. In some embodiments, the offers of the franchises displayed in the map interface 931D (e.g., franchises 932D.1-3) may be available in the offer interface 940D.

As discussed above, a website configuration module (not shown) may pre-populate the offer interface 940D according to a user profile of the particular user accessing the CAP interface 930D.

Figure 9E:
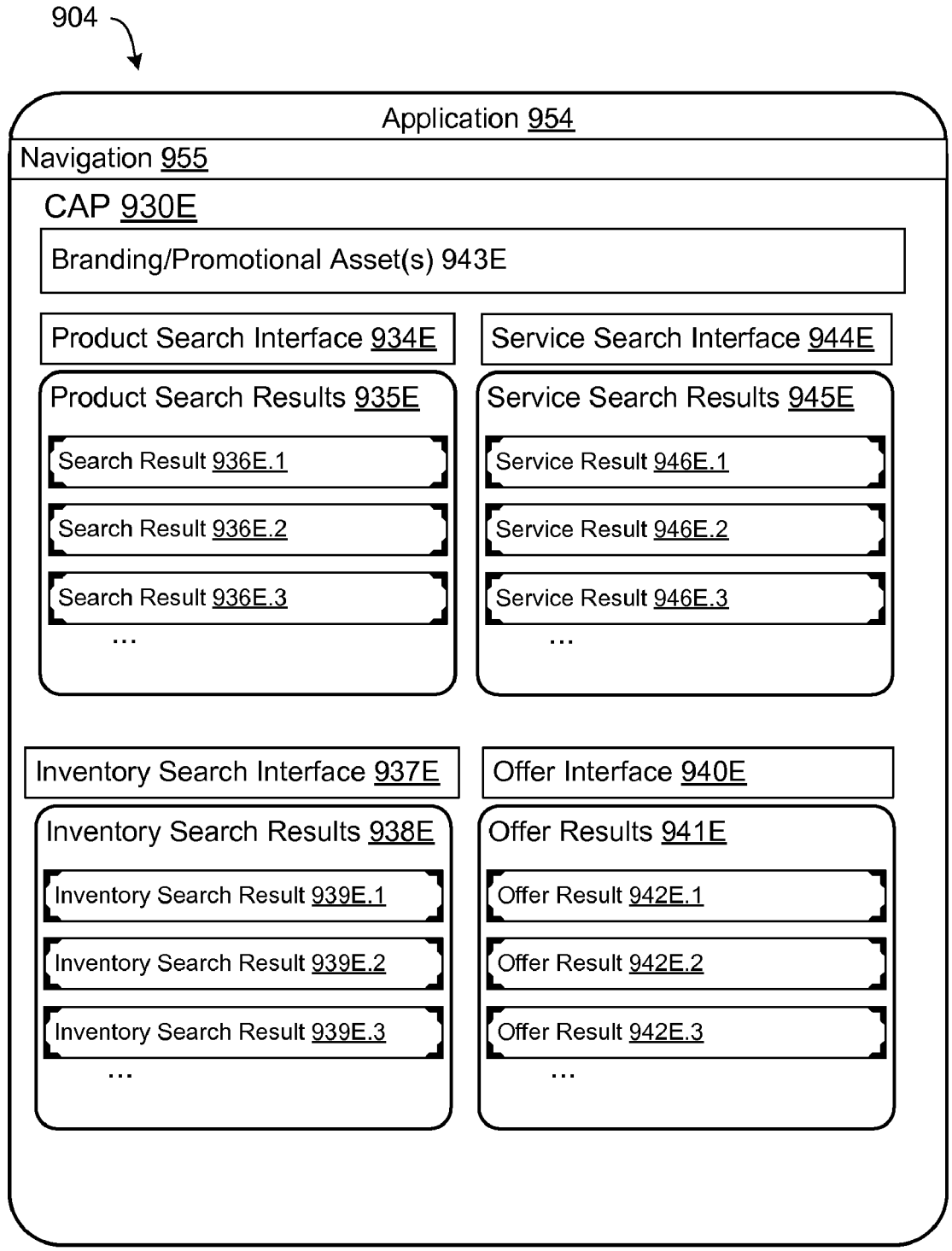
FIG. 9E depicts one embodiment of a CAP web interface configured to operate in an operational mode corresponding to a hyper-local (e.g., individual franchise) granularity of a business hierarchy.

FIG. 9E is an illustration of one embodiment of a local CAP web interface 930E configured to operate in an operational mode corresponding to a hyper-local (e.g., individual franchise) granularity of a business hierarchy. Accordingly, the CAP interface 930E may be generated at step 858 of FIG. 8.

The CAP interface 930E may comprise (e.g., display) branding/promotional assets 943E, which may be selected according to a user profile of the particular user accessing the interface 930E. In addition, the branding/promotional assets 943E may be customized according to the particular franchise to which the hyper-local interface 930E is directed (e.g., branding and promotional materials specific to the franchise).

The CAP interface 930E may comprise a product search interface 934E, which may provide search capabilities to allow users to search for products and/or services offered by a manufacturer of the particular franchise. As discussed above, the contents of the product search interface 934E may be configured according to a user profile of the user accessing the interface 930E.

The CAP interface 930E may comprise an inventory search interface 937E, which may provide search capabilities into the inventory of the particular franchise. Unlike the search interfaces 937B-D described above, the inventory search interface 937E may display actual (e.g., physical) inventory available in a single, particular franchise. The inventory search interface 937E may be configured (e.g., pre-populated) by a website configuration module (not shown) according to a user profile. The inventory search results 938E may comprise one or more individual inventory search results 939D.1-3, which may comprise actual product available at the particular franchise 932D.1-3.

The inventory search results 938E may comprise inventory of the particular franchise. Accordingly, the CAP interface 930E (or some other data aggregation service) may be communicatively coupled with the inventory management systems of the particular franchise to obtain inventory information therefrom.

An offer interface 940E may allow users to search for offers or other promotions available from the particular franchise. As discussed above, a website configuration module (not shown) may pre-populate the offer interface 940E according to a user profile of the particular user accessing the CAP interface 930E.

A service search interface 944E may allow users to search and/or access information about services (e.g., results 946E.1-3) offered by the particular franchise 944E. The search results 945E may comprise services available through the franchise and/or may comprise offers or other promotional materials available from a particular franchise.

Figure 10:
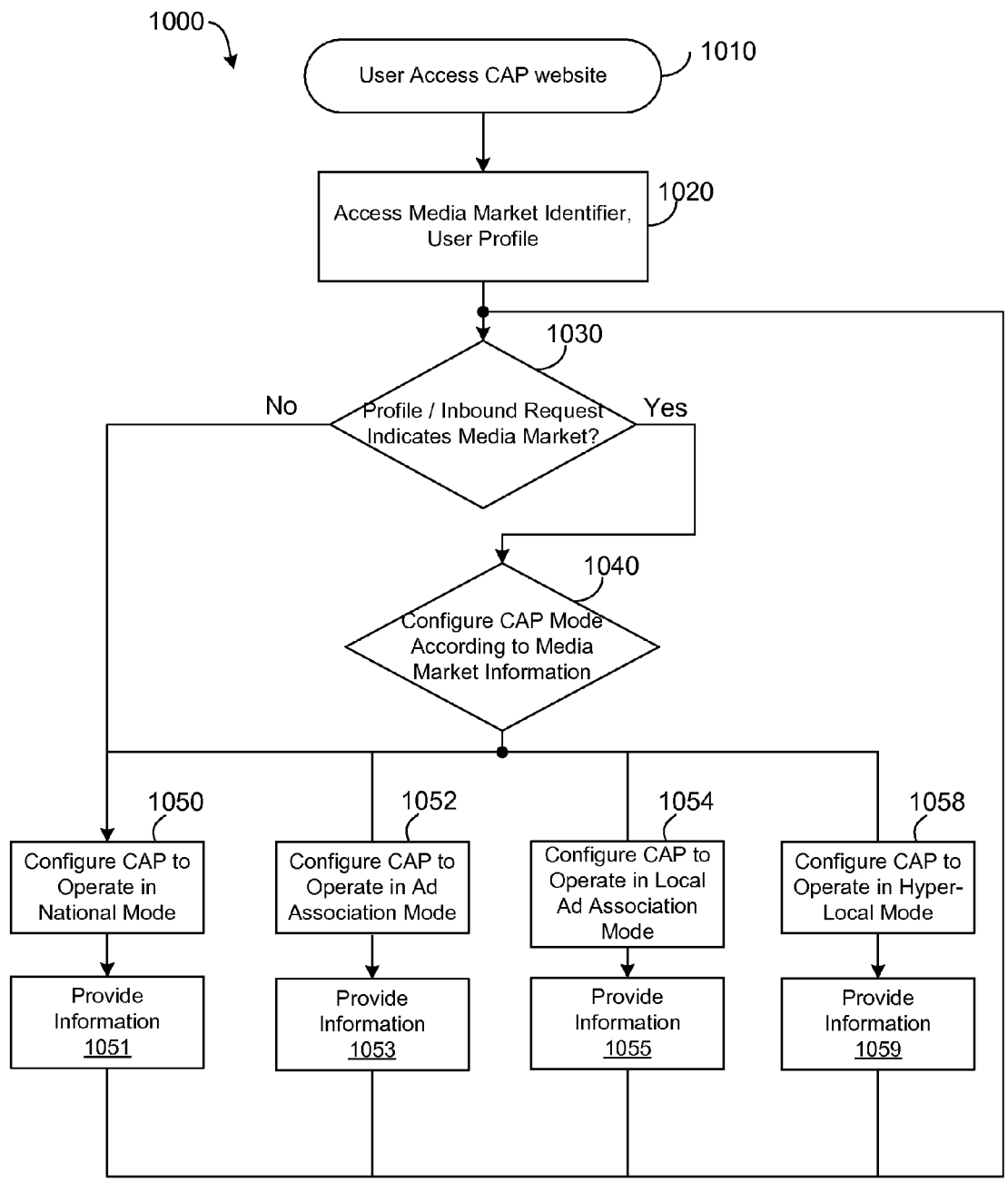
FIG. 10 is a flow diagram of a process for selecting an operational mode of a CAP website.

FIG. 10 is a flow diagram of one embodiment of a process 1000 for selecting an operational mode of a CAP website (e.g., website 232 of FIG. 2) in a business hierarchy including one or more advertising associations, each of which comprises one or more businesses, such as franchises of a manufacturer (e.g., as depicted in FIG. 1B).

At step 1010, a user may access the CAP website or one of the websites in a network of affiliated websites (e.g., websites 240A, 242A, and/or 244A of FIG. 2A). The access may be via an inbound HTTP link comprising an HTTP request or the like (e.g., from a search engine, a sponsored link, banner advertisement, third-party site, blog, online marketing campaign, email, or the like).

At step 1020, a user profile or other user session data associated with the user may be obtained. As discussed above, this may comprise obtaining a user identifier associated with the request (e.g., a cookie or the like), and/or may comprise reading information from the HTTP request itself (e.g., a URL parameter, header, or the like). This information may be used to identify a media market and/or advertising campaign associated with the user. This information may be provided via a third-party referring site, such as a search engine and/or banner advertising provider (e.g., embedded within the link which directed the user to the website). For example, the user may select a banner advertisement on a website, which may be configured to direct the user to the CAP website. An identifier associated with the banner advertisement and embedded within the inbound HTTP request may allow the CAP website to associate the referring banner with a particular advertising association (a group of businesses who agree to share advertising costs) and, as such, may be used to identify a media market and/or advertising campaign associated with the user.

At step 1030, the user profile or other information related to the inbound request may be processed to determine whether a media market of the user may be determined. If a particular media market and/or advertising campaign cannot be determined, the flow may continue to step 1050, where the CAP website may be configured to operate in a "national" mode, which as discussed above, may be configured to display information relevant to all of the businesses and/or advertising associations of the business hierarchy. If media market can be identified at step 1030, the flow may continue to step 1040.

At step 1040, the media market identification information may be used to select between a plurality of operational modes of the CAP website. As discussed above, each of the plurality of operational modes may correspond to a particular granularity of the business hierarchy and/or business relationships with the hierarchy. In the FIG. 10 embodiment, the operational modes may comprise a national mode (a mode covering all of the business entities of a particular manufacturer), an advertising association mode (a mode covering particular advertising associations within the business hierarchy), and/or a hyper-local mode (a mode covering a particular business entity within the hierarchy). If the media market information is relatively broad (e.g., all of the United States and/or advertising provided by a manufacturer), the flow may continue to step 1050, where the CAP website may be configured to operate in national mode.

Where the media market information is more detailed, the method 1000 may be capable of determining a particular media market and/or advertising campaign associated with the user. As discussed above in conjunction with FIG. 1B, groups of related business entities may agree to share advertising costs to advertise in particular venues and/or via particular channels. Similarly, businesses may agree to participate in a cooperative advertising campaign that may span multiple manufacturers and/or business groups. One example of such an association is described above in FIG. 1C. See element 152. The group(s) of businesses may agree to share the cost of presenting advertising on popular websites (e.g., CNN) and/or purchasing high-cost sponsored links on popular search engines. Similarly, groups of business entities may share a common promotion (e.g., 0% financing, employee pricing, etc.) and/or marketing directives (e.g., green automobiles, etc.).

At step 1040, the method 1000 may use the user profile information and/or media market identifying information (e.g., banner identifier, link identifier, or the like) obtained at step 1020 to configure the CAP website to operate in one of a plurality of operational modes.

If the media market identifier indicates an advertising campaign that is universal to all of the members of the business hierarchy (e.g., advertising by a manufacturer or the like), the flow may continue to step 1050 where the CAP may be configured to operate in a "national mode."

If the user profile and/or media market identifying information obtained at step 1020 is sufficient to identify a particular advertising association, the flow may continue at step 1052, where the CAP website may be configured to operate in "association mode."

If the user profile and/or media market identifying information obtained at step 1020 indicates a particular locale within an advertising association, the flow may continue at step 1054, where the CAP website may be configured to operate in "local association mode."

If user profile and/or media market identifying information obtained at step 1020 identifies a particular business (e.g., a particular franchise), the flow may continue at step 1058, where the CAP website may be configured to operate in "hyper-local mode."

At step 1050, the CAP website may be configured to operate in national mode. In national mode, the CAP website may be configured to display information relating to the manufacturer's products and/or services. In addition, the CAP website may be configured to display advertising information relevant to all of its respective media markets and/or marketing directives. One embodiment of a CAP interface in national mode is provided in FIG. 11A.

In national mode, the CAP website may provide an input wherein a user may provide additional media market information. The media market information may be in the form of banner advertising on the CAP website. The banner advertising may direct the user to advertising groups associated with the manufacturer and/or service provider. For example, a banner advertisement may indicate that some of the business entities are offering 0% financing on the manufacturer's products. Selection of the banner may allow the method 1000 to identify a media market of the user. Similarly, locale information (as discussed above in conjunction with FIGS. 8 and 9A-9E) may be used to identify a particular media market.

At step 1051, a user may provide media market information via an input provided on the CAP website. Upon receipt of this information, the flow may return to step 1050, where the CAP may be reconfigured to operate in another operational mode according to the media market information provided. Although not shown in FIG. 10, the media market information may be stored in a user profile associated with the user (e.g., as described above in conjunction with FIGS. 3-4), such that for future accesses, the CAP may be appropriately configured.

At step 1052, the CAP website may be configured to operate in an advertising association mode. In the advertising association, the CAP website may display information relating to one or more business entities comprising the advertising association (e.g., those business entities who have contributed to purchasing the advertising). In another example, an advertising association may comprise business entities offering a common promotion, offer, advertising campaign, or the like (e.g., 0% financing, employee pricing, green vehicles, and so on). The members of the advertising association may be those business entities that have agreed to offer the particular promotion or offer. In this case, the CAP website may display information relating to the particular promotion or offer and display indications of the business entities offering the particular promotion or offer. One embodiment of a CAP interface in advertising association mode is provided in FIG. 11B.

At step 1053, the user accessing the CAP website may provide additional media market and/or locale identifying information. In advertising association mode, the CAP website may allow a user to specify local information and/or navigate to more finely grained groupings within the advertising association (e.g., based on locale, offer or promotion details, or the like). Similarly, the CAP interface may display one or more controls to allow a user to "zoom out" to a broader operational mode (e.g., national mode). The method 1000 may receive this information at 1053 and the flow may continue to step 1040 where a new operational mode of the CAP website may be determined.

At step 1054, the CAP website may be configured to operate in a local advertising association mode. The local advertising association mode may be configured to display information relevant to one or more sub-groups within a particular advertising association. In the FIG. 10A embodiment, the sub-groups may be defined according to locale. However, in other embodiments, the sub-groups may be further defined according to variations of a particular offer and/or promotion offered by the advertising association, or the like. One embodiment of a CAP interface in advertising association local mode is provided in FIG. 11C.

At step 1055, the user accessing the CAP website may provide additional media market and/or locale identifying information. Responsive to this information, the flow may continue to step 1040, where a new operational mode of the CAP website may be determined.

At step 1058, the CAP website may be configured to operate in hyper-local mode. As described above in conjunction with FIGS. 8 and 9E, in hyper-local mode the CAP website may display information relevant to a particular business. The interface may comprise one or more inputs to allow the user to reconfigure the CAP website to operate in another one of the plurality of operational modes. Upon receiving such information at step 1059, the flow may continue at step 1040 where new operational mode of the CAP website may be determined.

Figure 11A:
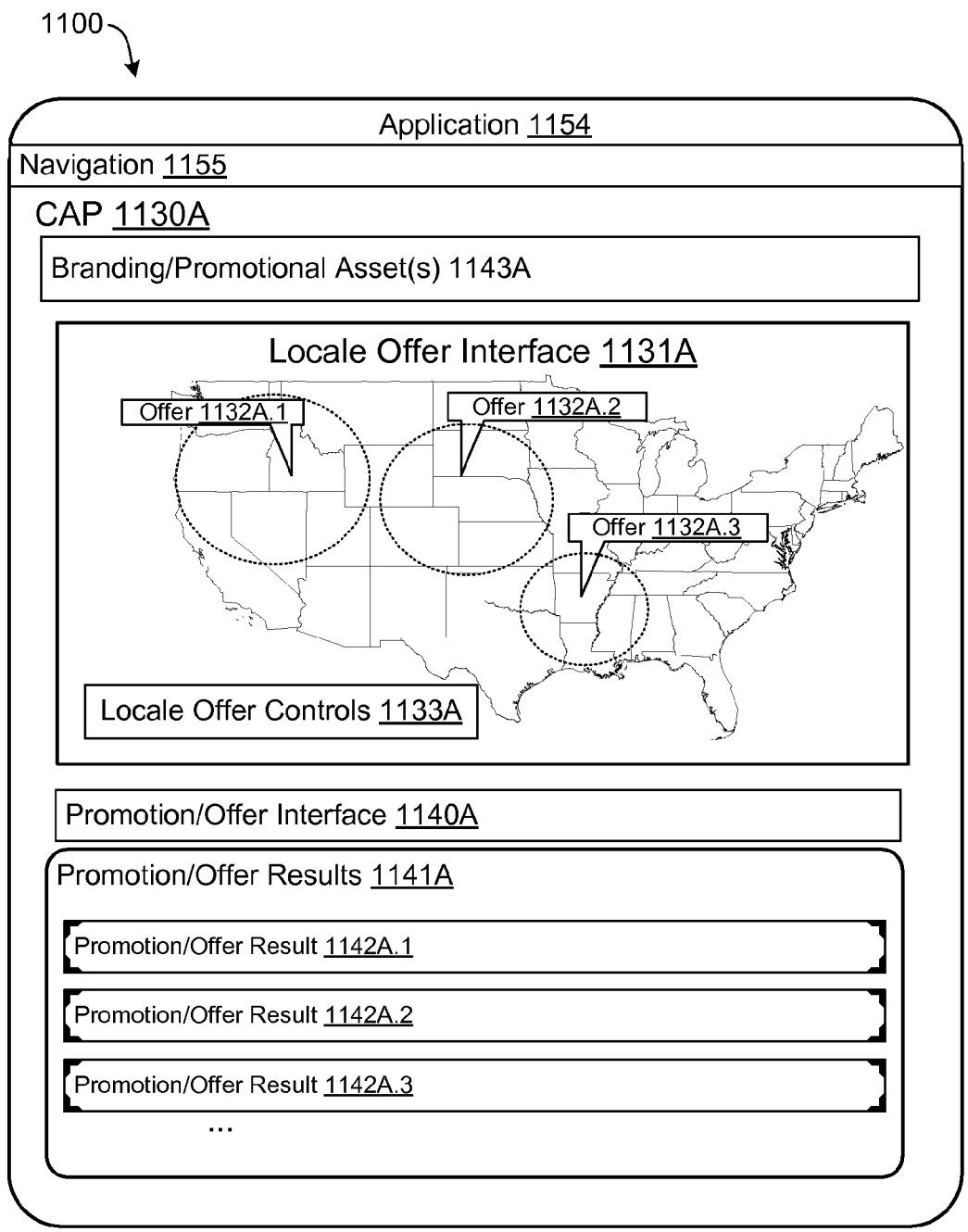
FIG. 11A depicts one embodiment of a CAP website interface configured to operate in an operational mode corresponding to operate in a national mode.

FIG. 11A is one embodiment of an CAP website interface configured to operate in national mode. As described above in conjunction with FIGS. 9A-9E, the interface 1100 may be presented in an application 1154, such as a web browser, comprising a navigation component 1155.

The CAP interface 1130A may include branding/promotional assets 1143A substantially as described above.

The CAP interface 1130A may comprise a Locale offer interface 1131A, which may display one or more locale specific offers 1132A.1-1132A.3 The locale specific offers 1132A.1-1132A.3 may indicate offers and/or promotions available in particular regions. The offers and/or promotions represented by the local specific offers 1132A.1-1132A.3 may be provided by one or more businesses with a business hierarchy. For example, the offer 1132A.1 may be a "employee pricing" offer available to customers within the pacific northwest. However, not all of the businesses (e.g., franchises) within the Pacific Northwest may participate in the offer. Accordingly, selection of the offer 1132A.1 may cause the CAP website to be reconfigured to operate in an advertising group mode (shown in FIG. 11B) which may display information about only those business who provide the offer.

Similarly, the offer area 1132A.1 may comprise businesses within a particular region (e.g., the Pacific Northwest) that have contributed resources to a particular advertising association. Accordingly, the advertising group mode display (shown in FIG. 11B) may display information about only those businesses who have contributed to the advertising association.

The CAP website 1130A may further comprise a promotion/offer interface 1140A, which may allow a user to search for promotions and/or offers available on products and/or services of a particular manufacturer. The results 1142A.1-1142A.3 of a user search may be displayed in a display area 1141A. Selection of one of the promotion/offer results 1142A.1-1142A.3 may cause the CAP website to be reconfigured to operate in another operational mode, such as the advertising association mode discussed above.

Figure 11B:
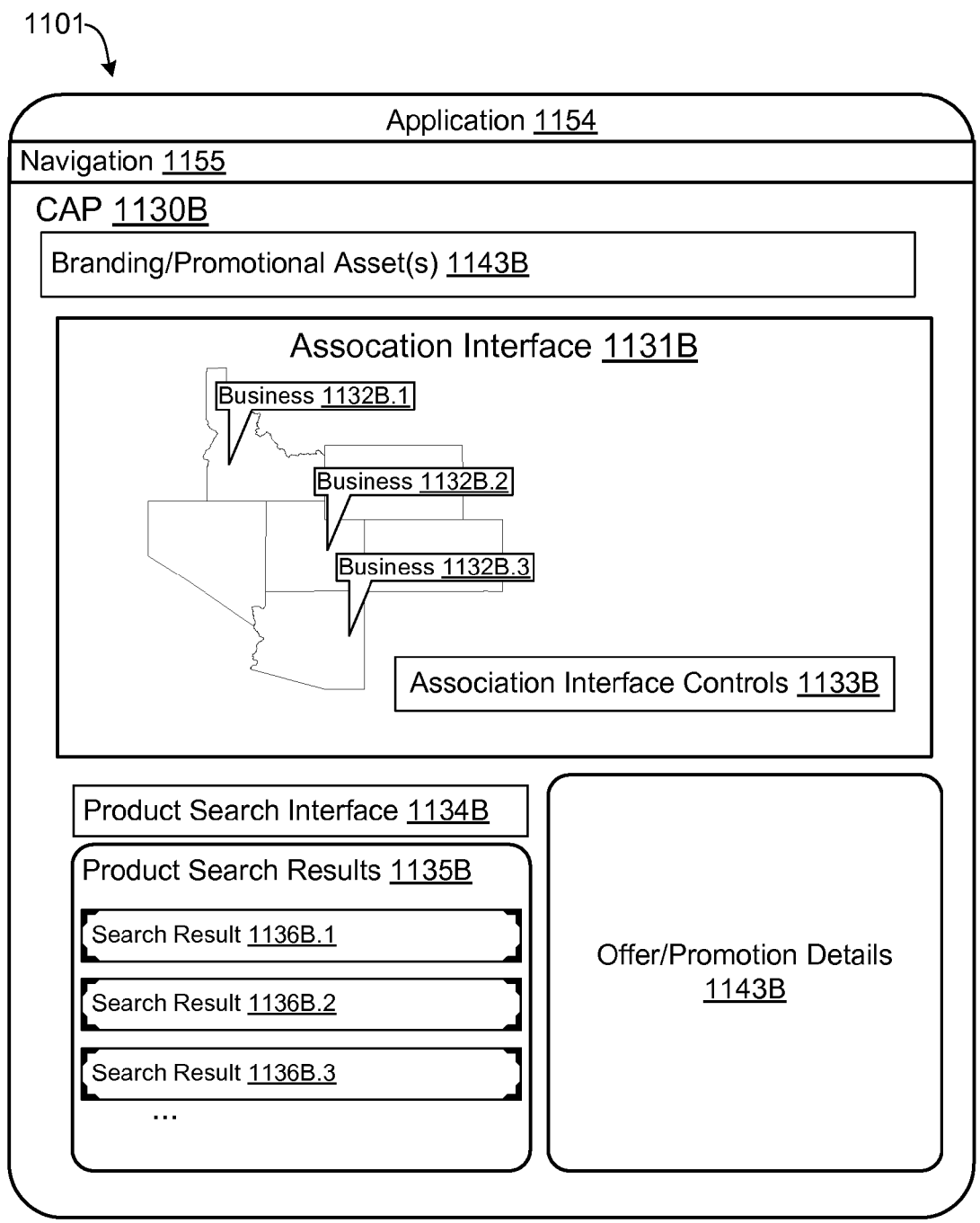
FIG. 11B depicts one embodiment of a CAP website interface configured to operate in an advertising association mode.

FIG. 11B shows one embodiment of an CAP website interface 1101 configured to operate in advertising association mode. As discussed above, the CAP interface 1101 may be presented in an application 1154, such as a web browser, which may comprise a navigation control 1155. The CAP interface 1130B may comprise branding/promotional assets 1143B.

The CAP interface 1130B may comprise an association interface 1131B, which may present one or more businesses 1132B.1-1132B.3 comprising an advertising association and/or one or more business 1132B.1-1132B.3 that participate in offering a particular offer or promotion. As shown in FIG. 11B, association interface 1131B may comprise a map interface to allow users to select one or more of the businesses 1132B.1-1132B.3 displayed thereon. Selection of any one of the businesses 1132B.1-132B.3 may cause the CAP website to be reconfigured to operate in the hyper-local mode discussed above. The association interface 1131B may comprise association interface controls 1133B, which may allow a user to control the map area displayed within the association interface 1131B (e.g., zoom in, zoom out, move, etc.).

The CAP interface 1130B may further comprise a product search interface 1134B, which may allow a user to search for products and/or services offered by the businesses 1132B.1-1132B.3. The product search interface 1134B may restrict the search to products and/or services available under the terms of a particular offer and/or promotion. For example, if the offer/promotion were a 0% vehicle financing offer, the product search results display 1135B may comprise only those search results 1136B.1-1136B.3 that are available for the 0% financing offer (e.g., only display those vehicles that may be purchased under the 0% financing offer). Similarly, where the interface 1130B is directed to an advertising association advertising "green vehicles." The product search results display 1135B may only display "green" vehicles as search results 1136B.1-1136B.3.

An offer/promotion details display 1143B may provide additional details and/or conditions relating to an offer or promotion highlighted in the CAP interface 1130. For example, where the CAP interface 1130B is directed an offer or promotion, the display 1143B may provide the terms and conditions of the promotion, such as which customers are eligible to take advantage of the promotion and/or which products or services are available under the offer or promotion. Where the CAP interface 1130B is directed to an advertising association, the display 1143B may comprise information relating to the advertising directive of the advertising association, such as describing the constituent business' 1132C.1-1132.3 commitment to "green" friendly products and services.

Figure 11C:
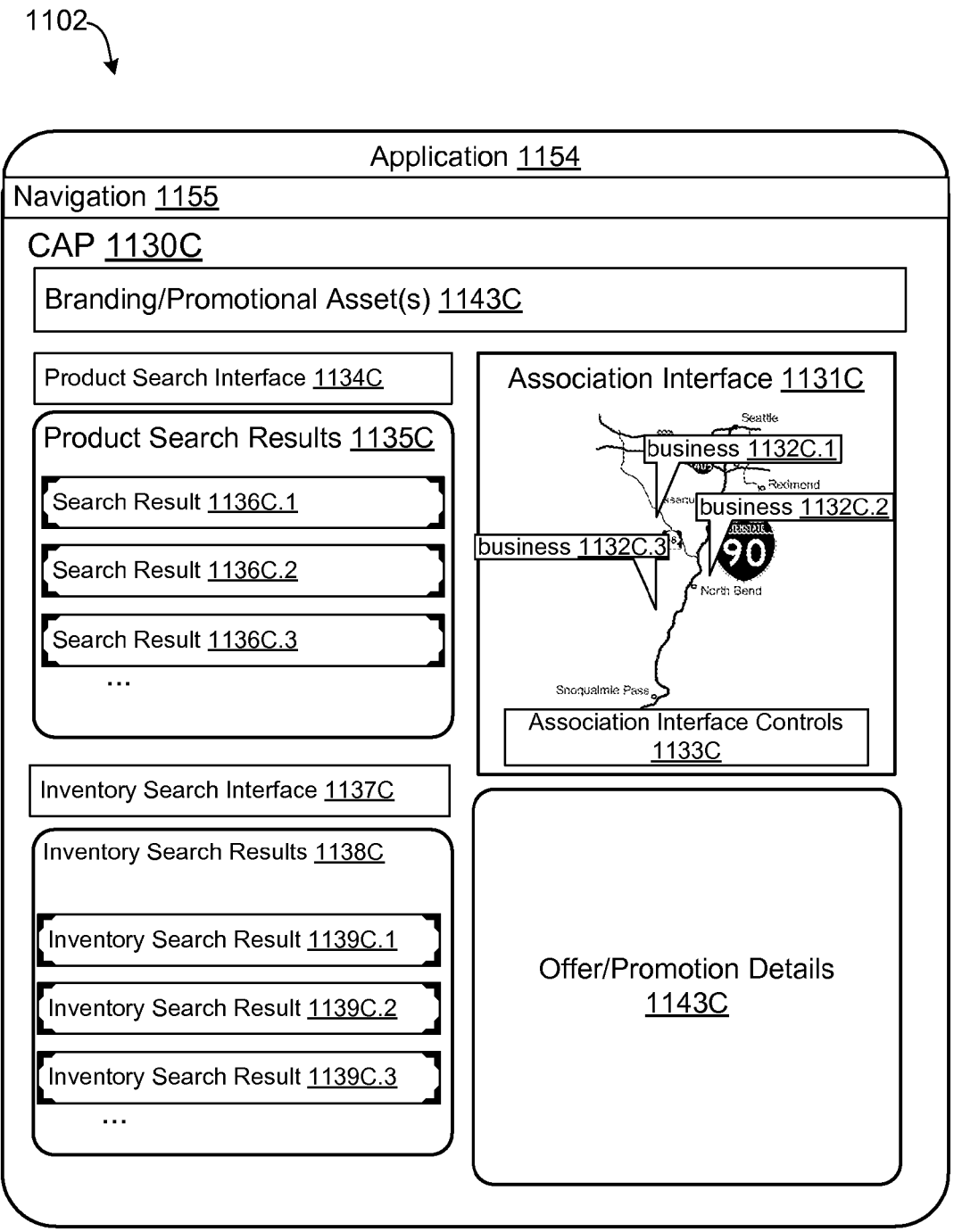
FIG. 11C depicts one embodiment of a CAP website interface configured to operate in a local advertising association mode.

FIG. 11C shows one embodiment of an CAP website interface 11012 configured to operate in a local advertising association mode. As discussed above, the CAP interface 1102 may be presented in an application 1154, such as a web browser, which may comprise a navigation control 1155. The CAP interface 1130C may comprise branding/promotional assets 1143C.

In local advertising association mode, the CAP interface 1130C may be configured to display content related to a sub-set of an advertising association and/or group of businesses participating in a particular offer and/or promotion. The sub-set displayed in the interface 1130C may be selected based on a locale of the businesses 1132C.1-1132C.3.

A product search interface 1134C may be provided to allow users to search for products and of services available from the businesses 1132C.1-1132C.3 displayed in an association interface 1131C. The product search results display 1135C may restrict the product search results 1136C.1-1136C.3 to those products and/or services available form the businesses 1132C.1-1132C.3 comprising the advertising association and/or to those products and/or services available from the businesses 1132C.1-1132C.3 under a particular offer or promotion.

An association interface 1131C may be provided, which may display a locale of the businesses 1132C.1-1132C.3. The association interface 1131C may comprise association interface controls 1133C, which may change a scale, position, and the like of the map displayed in the association interface 1131C.

The CAP interface 1130C may further comprise an inventory search interface 1137C, which may provide search results 1138C comprising inventory 1139C.1-1139C.3 available from the businesses 1132C.1-1132C.3 displayed in the association interface 1131C. The inventory search results 1139C.1-1139C.3 may be restricted to actual inventory available at the businesses 1132C.1-1132C.3. Alternatively, or in addition, where the CAP interface 1130C is directed to a group ob businesses 1132C.1-1132C.3 participating in a particular offer or promotion, the inventory search results 1139C.1-1139C.3 may comprise actual inventory 1139C.1-1139C.3 available under the particular offer of promotion.

An offer/promotion details display 1143C may provide additional details and/or conditions relating to an offer or promotion highlighted in the CAP interface 1130C. For example, where the CAP interface 1130C is directed an offer or promotion, the display 1143C may provide the terms and conditions of the promotion, such as which customers are eligible to take advantage of the promotion and/or which products or services are available under the offer or promotion. Where the CAP interface 1130C is directed to an advertising association, the display 1143C may comprise information relating to the advertising directive of the advertising association, such as describing the constituent business' 1132C.1-1132C.3 commitment to "green" friendly products and services.

Selection of one of the businesses 1132C.1-1132C.3 displayed in the association interface and/or of a inventory search result 1139C.1-1139C.3 may cause the CAP website to operate in hyper-local mode. Similarly, selection of one of the businesses 1132B.1-1132B.3 of FIG. 11B may cause the CAP website to operate in hyper-local mode. The interface used for hyper-local mode under a advertising association and/or promotion/offer business hierarchy may be substantially similar to the hyper-local interface described above in conjunction with FIG. 9E.

The flow diagram of FIG. 8 shows depicts a method 800 for configuring a CAP website to operate in one of a plurality of operational modes, wherein the operational modes correspond to a geographical granularity within a business hierarchy, such as a franchise business hierarchy. The flow diagram of FIG. 10 depicts a method 1000 for configuring a website to operate in one of a plurality of operational modes, wherein the operational modes correspond to a one or more granularities within a business hierarchy defined by an advertising association and/or providers of a particular promotion or offer. In addition, FIGS. 9A-9E and FIGS. 11A-11C show examples of CAP website interfaces according to each of the respective operational modes.

It would be understood, however, that the teachings of this disclosure could be adapted to operate using any business structure and/or business hierarchy known in the art. For example, FIG. 1C shows a business hierarchy comprising one or more dealer groups (commonly owned businesses) and one or more industry directive groups. One skilled in the art would recognize that the operational modes of a CAP website discussed herein could be adapted to provide context aware web services for this type of business hierarchy. In addition, the interfaces associated with the various operational modes (e.g., shown in FIGS. 9A-9E and 11A-11C) could be adapted to provide information relevant to the operational modes. Accordingly, this disclosure should not be read as limited to any particular business hierarchy organization and/or structure.

Figure 12:
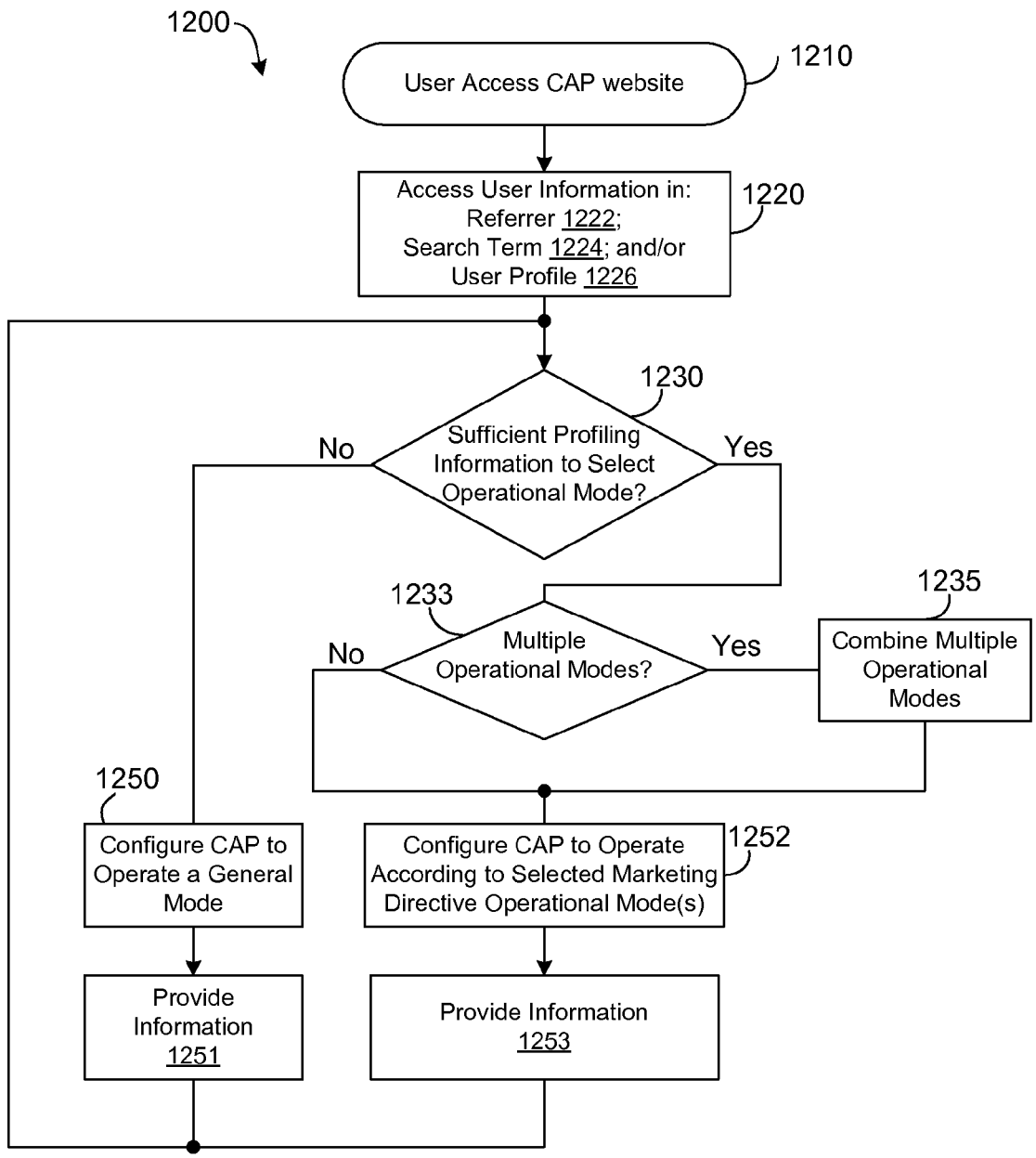
FIG. 12 is a flow diagram of one embodiment of a process for selecting an operational mode of a CAP website.

FIG. 12 is a flow diagram of one embodiment of a process 1200 for selecting an operational mode of a CAP website (e.g., website 232 of FIG. 2) from a plurality of operational modes related to a user profile of a visitor to the CAP website. As discussed above, a manufacturer and the franchises groups and franchises thereof may have a number of different, parallel marketing directives. The marketing directives may be related to any product and/or service provided by the manufacturer and/or the franchises. For example, a vehicle manufacturer may have an "affluent customer" marketing directive, a "green vehicle" marketing directive, "a working vehicles" marketing directive, and so on. Each of the marketing directives may define the content displayed to users visiting the website. For example, the website operating under the "affluent customer" marketing directive may display content related to luxury vehicle offerings from the manufacturer, may display a "sophisticated color scheme," and the like. In contrast, the website operating under a "working vehicles" marketing directive may display content related to work vehicles, such as pickup trucks, fleet vehicles and the like. In addition, the style of the "working vehicles" website may be a straight-forward, business-like style.

In this embodiment, the plurality of operation modes of a configurable website discussed above may correspond to the various marketing directives of the manufacturer and/or franchises of the manufacturer. Accordingly, the selection of one of the plurality of operational modes of the website may comprise selecting one or more of the operational modes and configuring the website to display content according to the selected operational mode (e.g., marketing directive).

At step 1210, a user may access the CAP website or one of the websites in a network of affiliated websites (e.g., websites 240A, 242A, and/or 244A of FIG. 2A). The access may be via an inbound HTTP link comprising an HTTP request or the like (e.g., from a search engine, a sponsored link, banner advertisement, third-party site, blog, online marketing campaign, email, or the like).

At step 1220, user profiling information associated with the incoming request may be obtained. The user profile information accessed at step 1220 (including steps 1222-1226) may be used to select an appropriate operational mode of the CAP website.

Obtaining user profiling information may comprise obtaining a user identifier associated with inbound request (e.g., in a cookie or the like), and/or may comprise reading information from the HTTP request itself (e.g., a URL parameter, HTTP header, or the like). This information may be used to identify one or more user attributes, which may be used to profile the user for the selection of an operational mode of the CAP website. This information may be provided via a third-party referring site, such as a search engine and/or banner advertising provider (e.g., embedded within the link which directed the user to the website). In addition, the profiling information may be taken from a user profile discussed above.

At step 1222, the referring website and/or referring banner of the incoming user may be determined. As discussed above, the incoming user may be referred (e.g., linked) to the CAP website in a number of different ways and/or from one of a plurality of different sources, such as a third-party website, an affiliated website, a search engine, a banner advertisement, a sponsored link or the like. In many cases, an identifier of the referring site may be embedded in the request as a HTTP REF, a URL parameter, an HTTP header value, a cookie, or the like. At step 1222, these various sources may be inspected to determine a referrer of the incoming user.

As will be discussed below, the identifier of the referrer obtained at step 1222 may be used in selecting the operational mode of the CAP website. For instance, the incoming user may have linked to the CAP website from a website directed to a particular interest area (e.g., green technology). This context information may allow the method 1200 to determine that the user would likely be interested in a "green vehicles" operational mode. Similarly, the method 1200 may determine that a user linked from an investment website or a lifestyle website (e.g., the New Yorker), may be interested in the "affluent user" marketing directive, and so on.

In addition to a referring site and/or banner identifier, the incoming HTTP request may comprise a search term or other identifier which directed the user to the CAP website. For example, a search engine may embed the search terms used to produce a link to the CAP website in the HTTP request to the website. For example, the user may enter the search term "plug-in hybrid vehicles." The search engine may return the CAP website as a search result. The link to the CAP website associated with the result may comprise the search term "plug-in hybrid vehicles." The search term may provide context information to allow the method 1200 to select an operational mode (e.g., marketing directive) tailored to the user's interests (e.g., a "green vehicles" operational mode). Similarly, a sponsored link displayed in association with a search request or other third-party website may include any terms used to cause the sponsored link to be displayed. At step 1224, the method 1200 may access any search term and/or sponsored link related information for use in selecting an operational mode for the CAP website.

At step 1226, a user identifier in the request may be accessed. The user identifier accessed at step 1226 may allow the method 1200 to access a user profile of the incoming user. As discussed above, the CAP website disclosed herein may comprise a user profile aggregation module configured to monitor and/or aggregate user profile information related to user activity on the CAP website, on other affiliated websites, and/or on third-party websites. The user interaction data may be aggregated into a user profile comprising one or more user preferences (e.g., by a user profile aggregation module 214 of FIGS. 2A and 2B). Links to the CAP website may include a reference to a user profile identifier, which may allow the method 1200 to access a user profile for the users. In other embodiments, the CAP website may maintain a cookie or other identifying information on the user's browser, which may allow the method 1200 to lookup a user profile of the incoming user.

At step 1230, the method 1200 may determine whether step 1220 obtained sufficient user profiling information (e.g., the referring website at 1222, a search term at 1224, and/or user profile 1226) to allow the method 1200 to identify one or more operational modes (e.g., marketing directives), in which the user may be interested. If insufficient user profiling information was obtained at step 1220, the flow may continue to step 1250, where the CAP website may be configured to operate in a "general mode;" otherwise, the flow may continue to step 1233.

At step 1233, the user profiling information may be compared to one or more operational modes (e.g., marketing directives). As discussed above, the user profiling information obtained at step 1220 may allow the system 1200 to determine a "context" and/or other profiling information about the user. This contextual information may allow the method 1200 to determine whether the user would be particularly interested in one or more operational modes (e.g., marketing directives) available at the CAP website. For example, as discussed above, the CAP website may include an operational mode directed to an "affluent user" marketing directive, an operational mode directed to a "green vehicles" marketing directive, an operational mode directed to a "working vehicles" marketing directive, and so on.

At step 1230, the method 1200 may compare the user profiling information of step 1220 to the plurality of operational modes. The comparison may yield a match to one or more operational modes. The match may be based on behavioral modeling of the user profiling data to user characteristics embodied by the various marketing directive operational modes (e.g., the user profiling information may be consistent with a user demographic and/or user preference covered by a particular marketing directive). In some cases, the user profiling information may return with multiple matches. For example, the user profiling information of an "affluent user" may also indicate that the user is interested in "green vehicles." Alternatively, the user profiling information may match only a single operational mode and/or may predominantly match a single operational mode of the CAP website. If a single operational mode is matched at step 1230 (e.g., of predominates the comparison of step 1230), the flow may continue at step 1252; otherwise the flow may continue to step 1235.

At step 1235, multiple operational modes (e.g., marketing directives) matching the user's profiling information may be combined. In some embodiments, operational modes of the CAP website may be combinable. Combining various operational modes may comprise merging the styles and/or content defined for the various operational modes. For example, the "affluent user" and "green vehicles" operational modes discussed above may be combined the "look and feel" (e.g., font, graphical assets and the like) of the "affluent user" operational mode, while highlighting "green vehicles" products, such as hybrid vehicles. In the combined operational mode, the featured green vehicles may be selected from a luxury line of vehicles and/or the featured green vehicles may be displayed with luxury options. After combining the selected operational modes, the flow may continue at step 1252.

Although method 1200 describes a particular operational mode combination (comprising a particular combination of marketing directives), one skilled in the art would recognize that virtually any marketing directive operational mode combination could be provided under the teachings of this disclosure.

At step 1252, the CAP website may be configured to operate under the selected operational mode and/or the selected operational mode combination. As discussed above, configuring the CAP website may comprise selecting to display a particular set of content, in a particular style. This may comprise highlighting a particular set of products and/or services provided by the manufacturer (e.g., "green vehicles," "working vehicles," or the like).

The various interfaces provided on the configured CAP website may be selected according to the operational mode. For example, a map interface, such as the map interface shown in FIGS. 9A-9C may be configured to only show those franchises or other service provides that provide a particular type of product (e.g., fleet vehicles, green vehicles, or the like). For instance, configuring a CAP website to operate in a "green vehicles" operational mode at step 1252 may comprise configuring the CAP website to only display franchises that have a particular "green certification" or the like. Similarly, configuring a CAP website to operate in a "working vehicles" operational mode at step 1252 may comprise configuring the CAP website to only display franchises that offer fleet vehicle service, utility vehicles, or the like.

At step 1253, the user may interact with the website. As discussed above, the CAP website may be configured to monitor the user's interactions. Responsive to the user's interactions, additional user profiling information may be obtained (e.g., the user may show interest in a particular vehicle type, marketing directive or the like). Upon receiving such information, the flow may continue to step 1230, where the method 1200 may select a different operational mode for the user substantially as described above. As such, the CAP website may be capable of reconfiguring the CAP website into a different operational mode (or a combination thereof) responsive to user interaction on the CAP website.

At step 1250, the CAP website may be configured to operate in a "general" operational mode. In some embodiments, the general operational mode may not highlight any particular marketing directive of the manufacturer (e.g., may not be customized according to user profiling information). However, as discussed above, the CAP website may be configured to monitor user interactions on the CAP website at step 1252. The user's interactions may allow the method 1200 to select an appropriate operational mode for the user. Upon receiving sufficient information to make such a determination, the flow may continue at step 1230, where an operational mode of the CAP website may be selected according to the user profiling information substantially as described above.

Although the method 1200 is described as a separate process from the process 800 of FIG. 8 describing selection of an operational mode according to geographical granularity of a franchise business hierarchy, and the process 1000 describing the selection of an operational mode according to an advertising group business hierarchy, the marketing directive operational mode selection of method 1200 could be practiced in parallel with any of the method 800 and/or the method 1000.

In some embodiments, the method 1200 could be used to refine the information displayed on the various operational mode interfaces shown in FIGS. 9A-9E and/or 11A-11C. For instance, the marketing directive operational mode selected using method 1200 may be used to customize the interfaces of FIGS. 9A-9E and/or 11A-11C. For example, the franchise map interface of FIG. 9C and FIG. 11C would be customized to only show franchises conforming to a particular marketing directive (e.g., that provide "green vehicles" and/or are "green certified.") Similarly, the product search interfaces (e.g., 934C of FIG. 9C and/or 1134C of FIG. 11C) could be refined to only show vehicles within a particular marketing directive related operational mode (e.g., only "affluent user" vehicles, "working vehicles," or the like). As one skilled in the art would recognize, any of the other exemplary interfaces of FIGS. 9A-9E and/or FIGS. 11A-11C could refined in this manner. Accordingly, this disclosure should not be read as limited to the selection of a single operational mode and/or a single type of operational mode.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory and/or other data storage device. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

We claim:

1. A system for aggregating user profile information, comprising:
a profile aggregation module; and
a network of affiliated websites comprising a plurality of websites, wherein each of the plurality of websites in the network of affiliated websites is resident on a respective non-transitory computer-readable storage media and comprises;
a user identification module to identify users accessing the respective website,
a user interaction monitor to monitor and to record user interactions on the respective website into one or more user interaction records, wherein each of the user interaction records includes one or more user interactions and a user identifier of a user associated with the one or more user interactions, and a communication module to transmit the user interaction records to the profile aggregation module;

wherein the profile aggregation module is configured to receive a plurality of user interaction records from the plurality of websites in the network of affiliated websites and to generate a user profile of a particular user of the plurality of websites using the plurality of user interactions.

2. The system of claim 1, wherein each of the plurality of user identification modules is configured such that a first user identifier assigned to a first user by a first one of the plurality of user identification modules may be correlated to a second user identifier assigned to the first user by a second one of the plurality of user identification modules.

3. The system of claim 1, wherein the profile aggregation module comprises an interaction correlation module to correlate a plurality of user interaction records of the particular user in the plurality of user interaction records using the user identifiers in each of the plurality of interaction records.

4. The system of claim 3, wherein the interaction correlation module is configured to correlate the plurality of user interactions in the plurality of user interaction records with respective users using the user identifiers in each of the plurality of user interaction records.

5. The system of claim 1, wherein the user profile of the particular user comprises a content type preference of the particular user.

6. The system of claim 5, wherein the content type preference of the particular user is determined by one or more user interactions of the particular user indicating access by the particular user to the content type on one or more of the plurality of websites in the network of affiliated websites.

7. The system of claim 1, wherein the user profile of the particular user comprises an interface type preference of the particular user.

8. The system of claim 7, wherein the interface type preference of the particular user is determined by one or more user interactions of the particular user indicating use of the interface type by the particular user on one or more of the plurality of websites in the network of affiliated websites.

9. The system of claim 1, wherein the user profile of the particular user comprises a ripeness of the user to make a purchase of a product or service offered by one or more of the plurality of websites in the network of affiliated websites.

10. The system of claim 9, wherein the ripeness of the particular user is determined by one selected from the group consisting of the frequency of user interactions and the nature of the user interactions of the particular user on one or more of the plurality of websites in the network of affiliated websites.

11. The system of claim 1, wherein the plurality of websites are affiliated in a business hierarchy.

12. The system of claim 11, wherein the franchise business hierarchy is a vehicle dealer franchise hierarchy.

13. The system of claim 12, wherein the user profile of a particular user comprises a content preference related to a particular vehicle type available from one or more vehicle dealers in the business hierarchy.

14. The system of claim 12, wherein the user profile of a particular user comprises a content preference related to a particular vehicle option available from one or more vehicle dealers in the business hierarchy.

15. The system of claim 12, wherein the user profile of a particular user comprises a content preference related to a particular vehicle configuration available from one or more vehicle dealers in the business hierarchy.

16. The system of claim 12, wherein the user profile of a particular user comprises a ripeness of the particular user to purchase a vehicle from one or more of the vehicle dealers in the business hierarchy.

17. The system of claim 1, wherein the profile aggregation module is configured to receive one or more logs from one or more third-party websites, wherein the third-party websites are outside of the network of affiliated websites.

18. The system of claim 17, wherein one or more of the one or more third-party websites is a search engine.

19. The system of claim 17, wherein the plurality of websites are affiliated in a vehicle dealer franchise hierarchy, and wherein one or more of the third-party websites is related to a vehicle available from one or more of the plurality of websites affiliated in the vehicle dealer franchise hierarchy.

20. The system of claim 1, wherein the user identification module identifies users using a browser cookie.

21. The system of claim 1, wherein the user identification module identifies users using one selected from the group consisting of an Internet protocol address, a media access control value, and a hardware identifier.

22. A method for aggregating user interactions into a user profile, comprising:

logging a plurality of user interactions at a plurality of websites in a network of affiliated websites;

associating each of the plurality of user interactions logged at each of the plurality of websites with a respective user identifier;

combining the plurality of logged user interactions from the plurality of websites in the network of affiliated websites;

correlating the combined user interactions logged by the plurality of websites in the network of affiliated websites with respective users using the user identifiers associated with each of the logged user interactions; and generating a plurality of user profiles using the plurality of correlated user interactions.

23. The method of claim 22, wherein combining the plurality of logged interactions from the plurality of websites in the network of affiliated websites comprises each of the plurality of websites in the network of affiliated websites transmitting the logged user interactions to a common profile aggregation service.

24. The method of claim 22, wherein the user identifiers associated with the user interactions logged at the plurality of websites are such that a first user identifier assigned to a first user interaction by a first one of the plurality of websites is capable of being correlated with a second user identifier assigned to the first user by a second one of the plurality of websites.

25. The method of claim 22, wherein a user profile of a particular user comprises a content type preference of the particular user.

26. The method of claim 25, wherein the content type preference of the particular user is determined by one or more user interactions of the particular user indicating access by the particular user to the content type on one or more of the plurality of websites in the network of affiliated websites.

27. The method of claim 22, wherein the user profile of the particular user comprises an interface type preference of the particular user.

28. The method of claim 27, wherein the interface type preference of the particular user is determined by one or more user interactions of the particular user indicating use of the interface type by the particular user on one or more of the plurality of websites in the network of affiliated websites.

29. The method of claim 22, wherein the user profile of the particular user comprises an indication of a ripeness of the user to make a purchase of a product or service offered by one or more of the plurality of websites in the network of affiliated websites.

30. The method of claim 29, wherein the indication of the ripeness of the particular user is determined by one selected from the group consisting of a frequency of user interactions and the nature of the user interactions of the particular user on one or more of the plurality of websites in the network of affiliated websites.

31. The method of claim 22, wherein the plurality of websites are affiliated in a business hierarchy.

32. The method of claim 31, wherein the franchise business hierarchy is a vehicle dealer franchise hierarchy.

33. The method of claim 32, wherein the user profile of a particular user comprises a content preference related to a particular vehicle type available from one or more vehicle dealers in the business hierarchy.

34. The method of claim 22, wherein the user profile of a particular user comprises a content preference related to a particular vehicle option available from one or more vehicle dealers in the business hierarchy.

35. The method of claim 34, wherein the user profile of a particular user comprises a content preference related to a particular vehicle configuration available from one or more vehicle dealers in the business hierarchy.

36. The method of claim 22, wherein the user profile of a particular user comprises a ripeness of the particular user to purchase a vehicle from one or more of the vehicle dealers in the business hierarchy.

37. The method of claim 22, further comprising combining a plurality of user interactions logged by one or more third-party websites with the plurality of logged interactions from the plurality of websites in the network of affiliated websites, wherein the third-party websites are outside of the network of affiliated websites.

38. The method of claim 37, wherein one of the one or more third-party websites is a search engine.

39. The method of claim 37, wherein the plurality of websites are affiliated in a vehicle dealer franchise hierarchy, and wherein one or more of the third-party websites is a website related to vehicles available from one or more of the plurality of affiliated vehicle dealer franchises.

40. The method of claim 22, wherein the user identifier comprises a browser cookie.

41. The method of claim 22, wherein the user identifier comprises one selected from the group consisting of an Internet protocol address, a media access control value, and a hardware identifier.

42. A non-transitory computer readable storage medium comprising instructions to cause a computing device to perform a method for aggregating user interactions into a user profile, the method comprising:
    logging a plurality of user interactions at a plurality of websites in a network of affiliated websites, wherein the plurality of websites are affiliated in a vehicle dealer business hierarchy;
    associating each of the plurality of user interactions logged at each of the plurality of websites with a respective user identifier;
    combining the plurality of logged user interactions from the plurality of websites at a user profile aggregation service;
    correlating the combined user interactions logged by the plurality of websites in the network of affiliated websites with respective users using the user identifiers associated with each of the logged user interactions;
    generating a plurality of user profiles using the plurality of correlated user interactions;
    providing the plurality of user profiles to the plurality of websites in the network of affiliated websites.

* * * * *

UNITED STATES PATENT AND TRADEMARK OFFICE
CERTIFICATE OF CORRECTION

PATENT NO. : 7,870,253 B2
APPLICATION NO. : 12/243855
DATED : January 11, 2011
INVENTOR(S) : Matt Muilenburg et al.

It is certified that error appears in the above-identified patent and that said Letters Patent is hereby corrected as shown below:

Column 2, Line 13 reads, "...depicts one embodiment of a CAP..." which should read, "...depicts one embedment of a CAP..."

Column 3, Lines 1-2 read, "...such as a accounting services provider..." which should read, "...such as an accounting services provider..."

Column 3, Line 38 reads, "On example of such a..." which should read, "One example of such a..."

Column 3, Line 66 reads, "...as limited to any as limited to any particular..." which should read, "...as limited to any particular..."

Column 5, Line 28 reads, "...131G be franchises of the manufacturer..." which should read, "...131G may be franchises of the manufacturer..."

Column 6, Line 40 reads, "...Protocol network (TC/PIP) network,..." which should read, "...Protocol (TC/PIP) network,..."

Column 16, Line 51 reads, "...operating in any it is operational modes..." which should read, "...operating in any of its operational modes..."

Column 18, Line 29 reads, "...website components..." which should read, "...and website components..."

Column 18, Line 31 reads, "...may be applied to one of more..." which should read, "...may be applied to one or more..."

Signed and Sealed this
Twenty-second Day of March, 2011

David J. Kappos
*Director of the United States Patent and Trademark Office*

CERTIFICATE OF CORRECTION (continued)
U.S. Pat. No. 7,870,253 B2

Column 18, Lines 40-41 read, "(e.g., interfaces that allow a user to "build up" a vehicle into a particular configuration." which should read, "(e.g., interfaces that allow a user to "build up" a vehicle into a particular configuration)."

Column 18, Line 59 reads, "...faces, as such,..." which should read, "...faces; as such,..."

Column 20, Line 61 reads, "...m4anufacturer website..." which should read, "...manufacturer website..."

Column 22, Line 15 reads, "...may be adapted to according to..." which should read, "...may be adapted according to..."

Column 24, Line 26 reads, "...the website may be may be..." which should read, "...the website may be..."

Column 27, Line 35 reads, "...user-entered searched, sponsored links,..." which should read, "...user-entered searches, sponsored links,..."

Column 30, Line 7 reads, "...a user may select of one of the interfaces..." which should read, "...a user may select one of the interfaces..."

Column 31, Line 4 reads, "...one skilled in the art that any layout..." which should read, "...one skilled in the art would recognize that any layout..."

Column 31, Line 38 reads, "...may comprise controls (not show) to..." which should read, "...may comprise controls (not shown) to..."

Column 31, Line 49 reads, "...according the user usability..." which should read, "according to the user usability..."

Column 32, Line 53 reads, "...may comprise controls (not show) to..." which should read, "...may comprise controls (not shown) to..."

Column 32, Lines 62-63 read, "(e.g., the region displayed in the map interface 931B." which should read, "(e.g., the region displayed in the map interface 931B)."

Column 35, Line 43 reads, "...may allow uses to search for..." which should read, "...may allow users to search for..."

Column 39, Line 27 reads, "...of an CAP..." which should read, "...of a CAP..."

Column 39, Line 34 reads, "...a Locale offer..." which should read, "...a locale offer..."

CERTIFICATE OF CORRECTION (continued)
U.S. Pat. No. 7,870,253 B2

Column 39, Line 43 reads, "...within the pacific northwest..." which should read, "...within the Pacific Northwest..."

Column 39, Line 66 reads, "...of an CAP..." which should read, "...of a CAP..."

Column 40, Line 9 reads, "...one or more business..." which should read, "...one or more businesses..."

Column 40, Line 38 reads, "...is directed an offer..." which should read, "...is directed to an offer..."

Column 40, Line 49 reads, "...of an CAP..." which should read, "...of a CAP..."

Column 40, Line 63 reads, "...search for products and of services available..." which should read, "...search for products and services available..."

Column 40, Line 67 reads, "...available form the..." which should read, "...available from the..."

Column 41, Line 19 reads, "...group ob businesses..." which should read, "...group of businesses..."

Column 41, Line 26 reads, "...is directed an offer..." which should read, "...is directed to an offer..."

Column 41, Line 47 reads, "...FIG. 8 shows depicts a..." which should read, "...FIG. 8 shows a..."

Column 41, Line 54 reads, "...correspond to a one or more..." which should read, "...correspond to one or more..."

Column 43, Line 2 reads, "...requests a HTTP..." which should read, "...requests an HTTP..."

Column 44, Line 36 reads, "...may be combined the "look and feel"..." which should read, "...may be combined with the "look and feel"..."

Column 44, Line 62 reads, "...franchises or other service provides that provide..." which should read, "...franchises or other service that provides..."

Column 45, Line 54 reads, "...could refined in this manner." which should read, "...could be refined in this manner."